US011909451B2

(12) United States Patent
Noh et al.

(10) Patent No.: US 11,909,451 B2
(45) Date of Patent: Feb. 20, 2024

(54) ERROR CORRECTION WHILE MAINTAINING BOSONIC NATURE OF THE SYSTEM

(71) Applicant: Yale University, New Haven, CT (US)

(72) Inventors: Kyungjoo Noh, New Haven, CT (US); Steven M. Girvin, Hamden, CT (US); Liang Jiang, Guilford, CT (US)

(73) Assignee: Yale University, New Haven, CT (US)

( * ) Notice: Subject to any disclaimer, the term of this patent is extended or adjusted under 35 U.S.C. 154(b) by 323 days.

(21) Appl. No.: 17/598,148

(22) PCT Filed: Mar. 27, 2020

(86) PCT No.: PCT/US2020/025204
§ 371 (c)(1),
(2) Date: Sep. 24, 2021

(87) PCT Pub. No.: WO2020/198581
PCT Pub. Date: Oct. 1, 2020

(65) Prior Publication Data

US 2022/0190933 A1 Jun. 16, 2022

Related U.S. Application Data

(60) Provisional application No. 62/825,615, filed on Mar. 28, 2019.

(51) Int. Cl.
*G06N 10/70* (2022.01)
*H04B 10/70* (2013.01)
*G06N 10/40* (2022.01)

(52) U.S. Cl.
CPC ............ *H04B 10/70* (2013.01); *G06N 10/70* (2022.01); *G06N 10/40* (2022.01)

(58) Field of Classification Search
None
See application file for complete search history.

(56) References Cited

U.S. PATENT DOCUMENTS 5,323,344 A * 6/1994 Katayama .............. G11C 11/44 365/210.11
6,128,764 A 10/2000 Gottesman
(Continued)

FOREIGN PATENT DOCUMENTS

CN 102498496 A 6/2012
CN 104881268 A 9/2015
(Continued)

OTHER PUBLICATIONS

Kitaev, Quantum error correction with imperfect gates. Quantum Communication, Computing, and Measurement. Jul. 1997;181-8.
(Continued)

*Primary Examiner* — Mujtaba M Chaudry
(74) *Attorney, Agent, or Firm* — Wolf, Greenfield & Sacks, P.C.

(57) ABSTRACT

Systems and methods for performing bosonic quantum error correction (QEC) using Gottesman-Kitaev-Preskill (GKP) states are provided. An ancilla quantum mechanical oscillator is used to probe Gaussian noise experienced by a data quantum mechanical oscillator without disturbing the state of the data quantum mechanical oscillator. The ancilla quantum mechanical oscillator is initialized with a GKP state and entangled with the state of a data quantum mechanical oscillator to correlate any noise experienced by the data state with the state of the ancilla quantum mechanical oscillator. The states are then disentangled, and momentum and position quadrature operators of the ancilla quan- (Continued)

tum mechanical oscillator are measured and used to perform QEC on the information stored in the data quantum mechanical oscillator.

20 Claims, 15 Drawing Sheets

(56) References Cited

U.S. PATENT DOCUMENTS

| | | | |
|---|---|---|---|
| 7,498,832 B2 | 3/2009 | Baumgardner et al. | |
| 8,242,799 B2 | 8/2012 | Pesetski et al. | |
| 8,294,138 B2 | 10/2012 | Farinelli et al. | |
| 8,508,280 B2 | 8/2013 | Naaman et al. | |
| 9,152,924 B2 | 10/2015 | Bonderson et al. | |
| 10,885,459 B2 * | 1/2021 | Biamonte | G06N 10/00 |
| 11,037,068 B2 | 6/2021 | Girvin et al. | |
| 2010/0295598 A1 | 11/2010 | Darabi et al. | |
| 2012/0033697 A1 * | 2/2012 | Goyal | H01S 5/3402 372/45.01 |
| 2012/0204296 A1 * | 8/2012 | Prater | G01N 21/3563 850/6 |
| 2014/0059099 A1 | 2/2014 | Liberty et al. | |
| 2014/0365843 A1 | 12/2014 | Ashikhmin | |
| 2015/0358022 A1 * | 12/2015 | McDermott, III | H03K 19/1958 326/5 |
| 2016/0233965 A1 | 8/2016 | Medford | |
| 2016/0254646 A1 | 9/2016 | Li et al. | |
| 2017/0104493 A1 | 4/2017 | Goto | |
| 2018/0032895 A1 * | 2/2018 | Jiang | H04B 10/70 |
| 2018/0241408 A1 * | 8/2018 | Hayashi | G01K 7/245 |
| 2018/0247217 A1 * | 8/2018 | Heeres | H03K 19/195 |
| 2018/0314969 A1 * | 11/2018 | Thornton | G06N 10/00 |
| 2019/0020346 A1 * | 1/2019 | Wang | G06N 10/00 |
| 2020/0242500 A1 * | 7/2020 | Girvin | G06F 11/322 |
| 2020/0334101 A1 | 10/2020 | Albert et al. | |

FOREIGN PATENT DOCUMENTS

| | | |
|---|---|---|
| JP | 2014-090341 A | 5/2014 |
| JP | 2015-534410 A | 11/2015 |
| WO | WO 2016/138378 A1 | 9/2016 |
| WO | WO 2017/065856 A1 | 4/2017 |
| WO | WO 2017/139683 A1 | 8/2017 |
| WO | WO 2018/089850 A1 | 5/2018 |
| WO | WO 2020/198581 A1 | 10/2020 |

OTHER PUBLICATIONS

Shapiro et al., Optical communication with two-photon coherent states-part II: Photoemissive detection and structured receiver performance. IEEE Transactions on Information Theory. Mar. 1979;25(2):179-92.

Zak, Finite translations in solid-state physics. Physical Review Letters. Dec. 11, 1967;19(24):1385.

Albert et al., Techniques for error correction of a logical qubit and related systems and methods. Co-pending U.S. Appl. No. 16/959,209, filed Jun. 30, 2020.

International Search Report and Written Opinion for International Application No. PCT/US2016/064609 dated Jul. 31, 2017.

International Preliminary Report on Patentability for International Application No. PCT/US2016/064609 dated Jun. 14, 2018.

Extended European Search Report for European Application No. 16892925.5, dated Jun. 28, 2019.

International Search Report and Written Opinion for International Application No. PCT/US2019/012438, dated Aug. 12, 2019.

International Preliminary Report on Patentability for International Application No. PCT/US2019/012438, dated Jul. 16, 2020.

Extended European Search Report for European Application No. 19756883.5, dated Aug. 6, 2021.

International Search Report and Written Opinion in International Application No. PCT/US2020/025204, dated Jun. 23, 2020.

International Preliminary Report on Patentability in International Application No. PCT/US2020/025204, dated Oct. 7, 2021.

Extended European Search Report for European Application No. 20776963.9, dated Nov. 25, 2022.

International Search Report and Written Opinion for International Application No. PCT/US2022/053675, dated Apr. 6, 2023.

Aaronson et al., BosonSampling with lost photons. Phys. Rev. A. Jan. 21, 2016; 93:012335.

Aaronson et al., The computational complexity of linear optics. Proceedings of the 43rd Annual ACM Symposium on Theory of Computing, STOC. Jun. 2011; 333-42.

Agarwal et al., Generation of pair coherent states and squeezing via the competition of four-wave mixing and amplified spontaneous emission. Physical review letters. Aug. 18, 1986;57(7):827.

Albert et al., Performance and structure of single-mode bosonic codes. Physical Review A. Mar. 30, 2018;97(3):032346.

Albert, Lindbladians with multiple steady states: theory and applications. Yale University Dissertation. May 2017, 134 pages.

Albert, Proposal for a Logical Qubit Encoded into a Stabilized Manifold in Two Bosonic Modes. APS March Meeting 2018. Abstract ID V33.007, 1 page.

Andrews et al., Bidirectional and efficient conversion between microwave and optical light. Nature Physics. Apr. 2014;10(4):321-6.

Aoki et al., Quantum error correction beyond qubits. Nature Physics. Aug. 2009;5(8):541-6.

Arrazola et al., Machine learning method for state preparation and gate synthesis on photonic quantum computers. Quantum Science and Technology. Jan. 22, 2019;4:024004.

Baragiola et al., All-Gaussian universality and fault tolerance with the Gottesman-Kitaev-Preskill code. Physical review letters. Nov. 13, 2019;123(20):200502.

Barends et al., Coherent Josephson qubit suitable for scalable quantum integrated circuits. Physical review letters. Aug. 22, 2013;111(8):080502.

Barends et al., Superconducting quantum circuits at the surface code threshold for fault tolerance. Nature. Apr. 2014;508(7497):500-3.

Barut et al., New "coherent" states associated with non-compact groups. Communications in Mathematical Physics. Mar. 1, 1971;21(1):41-55.

Bennet et al., Mixed-state entanglement and quantum error correction. Physical Review A. Nov. 1, 1996;54(5):3824-51.

Bény et al., General conditions for approximate quantum error correction and near-optimal recovery channels. Physical review letters. Mar. 23, 2010;104(12):120501.

Bény, Perturbative quantum error correction. Physical review letters. Aug. 16, 2011;107(8):080501.

Bergmann et al., Quantum error correction against photon loss using NOON states. Phys. Rev. A. Jul. 7, 2016; 94:012311. https://doi.org/10.1103/PhysRevA.94.012311.

Bertet et al., Direct measurement of the Wigner function of a one-photon Fock state in a cavity. Physical Review Letters. Oct. 28, 2002;89(20):200402.

BØrkje et al., Observability of radiation-pressure shot noise in optomechanical systems. Physical Review A. Jul. 15, 2010;82(1):013818.

BØrkje et al., Signatures of nonlinear cavity optomechanics in the weak coupling regime. Physical review letters. Aug. 2, 2013;111(5):053603.

Boulant et al., Experimental implementation of a concatenated quantum error-correcting code. Physical review letters. Apr. 8, 2005;94(13):130501.

Bradley et al., Microwave cavity searches for dark-matter axions. Reviews of Modern Physics. Jun. 12, 2003;75(3):777-817.

Braunstein et al., Quantum information with continuous variables. Reviews of Modern Physics. Jun. 29, 2005;77(2):513-77.

Braunstein Quantum error correction for communication with linear optics. Nature. Jul. 2, 1998; 394:47-9.

Braunstein, Error Correction for Continuous Quantum Variables. Phys. Rev. Lett. May 4, 1998;80(18):4084-7.

(56) References Cited

OTHER PUBLICATIONS

Brecht et al., Multilayer microwave integrated quantum circuits for scalable quantum computing. NPJ Quantum Information. Feb. 23, 2016;2:16002.
Cai et al., Bosonic quantum error correction codes in superconducting quantum circuits. Fundamental Research. Jan. 1, 2021;1(1):50-67.
Campagne-Ibarq et al., Quantum error correction of a qubit encoded in grid states of an oscillator. Nature. Aug. 20, 2020;584(7821):368-72.
Chembo et al., Modal expansion approach to optical-frequency-comb generation with monolithic whispering-gallery-mode resonators. Physical Review A. Sep. 7, 2010;82(3):033801.
Chembo et al., Spatiotemporal Lugiato-Lefever formalism for Kerr-comb generation in whispering-gallery-mode resonators. Physical Review A. May 31, 2013;87(5):053852.
Chen, Study of De-coherence of Coupled Systems of Charge Qubits and Nonlinear Nanomechanical Resonators. China Master's Thesis Full-Text Database (Basic Sciences Volume). Mar. 15, 2014;3:1-48.
Chiaverini et al., Realization of quantum error correction. Nature. Dec. 2004;432(7017):602-5.
Chiorescu et al., Coherent dynamics of a flux qubit coupled to a harmonic oscillator. Nature. Sep. 2004;431(7005):159-62.
Chuang et al., Bosonic quantum codes for amplitude damping. Physical Review A. Aug. 1, 1997;56(2):1114.
Cirac et al., Enforcing coherent evolution in dissipative quantum dynamics. Science. Aug. 30, 1996;273(5279):1207-10.
Cirac et al., Quantum state transfer and entanglement distribution among distant nodes in a quantum network. Physical Review Letters. Apr. 21, 1997;78(16):3221-4.
Clerk et al., Introduction to quantum noise, measurement, and amplification. Reviews of Modern Physics. Apr. 15, 2010;82(2):1155-208.
Cochrane et al., Macroscopically distinct quantum-superposition states as a bosonic code for amplitude damping. Phys. Rev. 23 A. Apr. 1, 1999;59(4):2631-4. arXiv.quant-ph/9809037v2.
Coen et al., Modeling of octave-spanning Kerr frequency combs using a generalized mean-field Lugiato-Lefever model. Optics letters. Jan. 1, 2013;38(1):37-9.
Córcoles et al., Demonstration of a quantum error detection code using a square lattice of four superconducting qubits. Nature communications. Apr. 29, 2015;6:6979.
Cory et al., Experimental quantum error correction. Physical Review Letters. Sep. 7, 1998;81(10):2152-5.
Crépeau et al., Approximate quantum error-correcting codes and secret sharing schemes. Advances in Cryptology: Lecture Notes in Computer Science. 2005;3494:285-301.
De Neeve et al., Error correction of a logical grid state qubit by dissipative pumping. Nature Physics. Mar. 2022;18(3):296-300.
Devoret et al., Superconducting circuits for quantum information: an outlook. Science. Mar. 8, 2013;339(6124):1169-74.
Dong, The q-Deformed Superposition States and Their Properties. Acta Optica Sinica. 1999;19(11):1452-8.
Duivenvoorden et al., Single-mode displacement sensor. Physical Review A. Jan. 5, 2017;95(1):012305. arXiv:1603.02242v4 [quant-ph].
Eaton et al., Gottesman-Kitaev-Preskill State Preparation by Photon Catalysis. New Journal of Physics. Nov. 18, 2019;21:113034.
Eisert et al. Distilling Gaussian states with Gaussian operations is impossible. Phys. Rev. Lett. Sep. 4, 2002;89:137903. https://doi.org/10.1103/PhysRevLett.89.137903.
Faist et al., Continuous symmetries and approximate quantum error correction. Phys. Rev. X. Oct. 26, 2020;10:041018. arXiv:1902.07714v1 [quant-ph].
Fletcher et al., Optimum quantum error recovery using semidefinite programming. Physical Review A. Jan. 31, 2007;75(1):012338.
Flühmann et al., Direct characteristic-function tomography of quantum states of the trapped-ion motional oscillator. Physical Review Letters. Jul. 21, 2020;125(4):043602.
Flühmann et al., Encoding a qubit in a trapped-ion mechanical oscillator. Nature. Feb. 27, 2019;566:513-7.
Flühmann et al., Sequential modular position and momentum measurements of a trapped ion mechanical oscillator. Phys. Rev. X. Apr. 2, 2018; 8:021001.
Flurin et al., Superconducting quantum node for entanglement and storage of microwave radiation. Physical review letters. Mar. 4, 2015;114(9):090503.
Fowler Surface codes: Towards practical large-scale quantum computation. Phys. Rev. A. Sep. 18, 2012; 86(032324): 48 pages.
Frattini et al., 3-wave mixing Josephson dipole element. Applied Physics Letters. May 29, 2017;110(22):222603.
Fukui et al., Analog quantum error correction with encoding a qubit into an oscillator. Phys. Rev. Lett. Nov. 10, 2017;119:180507.
Gao et al., Noise properties of superconducting coplanar waveguide microwave resonators. Applied Physics Letters. Mar. 5, 2007;90(10):102507.
Girvin, Basic concepts in quantum information. Strong Light-Matter Coupling: From Atoms to Solid-State Systems. 2013:155-206.
Girvin, Wiring up Quantum Systems: Circuit QED with Artificial Atoms and Microwave Photons. Conference on Coherence and Quantum Optics. Jun. 17, 2013:M4B-1.
Gottesman et al., Encoding a qubit in an oscillator. Physical Review A. Jun. 11, 2001;64(1):012310.
Gottesman Stabilizer codes and quantum error correction. Ph.D. Thesis, California Institute of Technology. May 21, 1997; 122 pages.
Gottesman, An introduction to quantum error correction and fault-tolerant quantum computation. Quantum information science and its contributions to mathematics, Proceedings of Symposia in Applied Mathematics Apr. 2010;68:13-58.
Grassl et al., Quantum error-correcting codes for qudit amplitude damping. IEEE Transactions on Information Theory. Jun. 2018;64(6):4674-85.
Hachohen-Gourgy et al.. Cooling and autonomous feedback in a bose-hubbard chain with attractive interactions. Physical review letters. Dec. 9, 2015;115(24):240501.
Hafezi et al., Chemical potential for light by parametric coupling. Physical Review B. Nov. 19, 2015;92(17):174305.
Harrington et al., Achievable rates for the Gaussian quantum channel. Phys. Rev. A. May 17, 2001;64:062301. https://doi.org/10.1103/PhysRevA.64.062301.
Hatridge et al., Quantum back-action of an individual variable-strength measurement. Science. Jan. 11, 2013;339(6116):178-81.
Hayden et al., Error Correction of Quantum Reference Frame Information. PRX Quantum. Feb. 18, 2021;2:010326. arXiv:1709.04471v1 [quant-ph].
Hayden et al., Spacetime replication of continuous variable quantum information. New J. Phys. Aug. 24, 2016;18(8):083043.
Heeres et al., Cavity state manipulation using photon-number selective phase gates. Physical review letters. Sep. 22, 2015;115(13):137002.
Helmer et al., Quantum nondemolition photon detection in circuit QED and the quantum Zeno effect. Physical Review A. May 20, 2009;79(5):052115.
Hofheinz et al., Synthesizing arbitrary quantum states in a superconducting resonator. Nature. May 2009;459(7246):546.
Holevo One-mode quantum Gaussian channels: Structure and quantum capacity. Problems of Information Transmission. Mar. 2007;43(1):1-11.
Home et al., Complete methods set for scalable ion trap quantum information processing. Science. Sep. 4, 2009;325(5945):1227-30.
Houck et al., Generating single microwave photons in a circuit. Nature. Sep. 2007;449(7160):328-31.
Hu et al., Demonstration of quantum error correction and universal gate set operation on a binomial bosonic logical qubit. Nature Physics. Feb. 11, 2019; 15:503-8.
Huh et al., Boson sampling for molecular vibronic spectra. Nature Photonics. Aug. 24, 2015;9:615-20.
Ince et al., The case for open computer programs. Nature. Feb. 2012;482(7386):485-8.

(56) References Cited

OTHER PUBLICATIONS

Kelly et al., State preservation by repetitive error detection in a superconducting quantum circuit. Nature. Mar. 2015;519(7541):66.
Kienzler et al., Quantum harmonic oscillator state synthesis by reservoir engineering. Science. Jan. 2, 2015;347(6217):53-6.
Kirchmair et al., Observation of quantum state collapse and revival due to the single-photon Kerr effect. Nature. Mar. 2013;495(7440):205-9.
Knill et al. A scheme for efficient quantum computation with linear optics. Nature, Jan. 4, 2001;409(6816):46-52.
Knill et al., Theory of quantum error-correcting codes. Physical Review A. Feb. 1, 1997;55(2):900.
Koch et al., Charge-insensitive qubit design derived from the Cooper pair box. Physical Review A. Oct. 12, 2007;76(4):042319.
Korotkov, Flying microwave qubits with nearly perfect transfer efficiency. Physical Review B. Jul. 25, 2011;84(1):014510.
Krastanov et al., Universal control of an oscillator with dispersive coupling to a qubit. Physical Review A. Oct. 21, 2015;92(4):040303.
Laflamme et al., Perfect quantum error correcting code. Physical Review Letters. Jul. 1, 1996;77(1):198-201.
Lamont et al., Route to stabilized ultrabroadband microresonator-based frequency combs. Optics letters. Sep. 15, 2013;38(18):3478-81.
Lamoreaux et al., Analysis of single-photon and linear amplifier detectors for microwave cavity dark matter axion searches. Physical Review D. Aug. 23, 2013;88(3):035020.
Lassen et al., Quantum optical coherence can survive photon losses using a continuous-variable quantum erasure-correcting code. Nature Photonics. Oct. 2010;4(10):700-5.
Leghtas et al., Confining the state of light to a quantum manifold by engineered two-photon loss. Science. Feb. 20, 2015;347(6224):853-7.
Leghtas et al., Hardware-efficient autonomous quantum memory protection. Physical Review Letters. Sep. 20, 2013;111(12):120501.
Leghtas et al., Stabilizing a Bell state of two superconducting qubits by dissipation engineering. Physical Review A. Aug. 27, 2013;88(2):023849.
Leung et al., Approximate quantum error correction can lead to better codes. Physical Review A. Oct. 1, 1997;56(4):2567-73.
Lidar et al., Decoherence-free subspaces for quantum computation. Physical Review Letters. Sep. 21, 1998;81(12):2594.
Lloyd et al., Analog quantum error correction. Physical Review Letters. May 4, 1998;80(18):4088-91.
Lloyd et al., Quantum computation over continuous variables. Phys. Rev. Lett. Feb. 22, 1999;82(8):1784-7.
Mabuchi et al., Inversion of quantum jumps in quantum optical systems under continuous observation. Physical review letters. Apr. 22, 1996;76(17):3108-11.
Marquardt et al., Optomechanics. Physics. 2009;2:40.
Marquardt et al., Quantum theory of cavity-assisted sideband cooling of mechanical motion. Physical review letters. Aug. 28, 2007;99(9):093902.
McKay et al., High-contrast qubit interactions using multimode cavity QED. Physical review letters. Feb. 27, 2015;114(8):080501.
Meier et al., Signatures of quantum phase transitions in the dynamic response of fluxonium qubit chains. Physical Review B. Aug. 24, 2015;92(6):064516.
Michael et al., New class of quantum error-correcting codes for a bosonic mode. Physical Review X. Jul. 14, 2016;6(3):031006.
Mirrahimi et al., Dynamically protected cat-qubits: a new paradigm for universal quantum computation. New Journal of Physics. Apr. 22, 2014;16(4):045014.
Morin et al., Shining light into black boxes. Science. Apr. 13, 2012;336(6078):159-60.
Motes et al., Encoding qubits into oscillators with atomic emsembles and squeezed light. Phys. Rev. A. May 8, 2017;95(5):053819.
Moussa et al., Demonstration of sufficient control for two rounds of quantum error correction in a solid state ensemble quantum information processor. Physical review letters. Oct. 10, 2011;107(16):160501.
Mundhada et al., Generating higher-order quantum dissipation from lower-order parametric processes. Quantum Science and Technology. May 24, 2017;2(2):024005.
Murch et al., Cavity-assisted quantum bath engineering. Physical review letters. Oct. 31, 2012;109(18):183602.
Nakamura et al., Coherent control of macroscopic quantum states in a single-Cooper-pair box. Nature. Apr. 1999;398(6730):786-8.
Nandkishore et al., Many-body localization and thermalization in quantum statistical mechanics. Annu. Rev. Condens. Matter Phys.. Mar. 10, 2015;6(1):15-38.
Ng, Simple approach to approximate quantum error correction based on the transpose channel. Physical Review A. Jun. 28, 2010;81(6):062342.
Nielsen et al., Quantum Computation and Quantum Information. Cambridge Series on Information and the Natural Sciences; Cambridge University Press. First published Oct. 23, 2000; 10th anniversary edition published Dec. 9, 2010:1-676.
Nigg et al., Stabilizer quantum error correction toolbox for superconducting qubits. Physical Review Letters. Jun. 14, 2013;110(24):243604.
Nigg et al., Black-box superconducting circuit quantization. Physical Review Letters. Jun. 12, 2012;108(24):240502.
Nigg et al., Quantum computations on a topologically encoded qubit. Science. Jul. 18, 2014;345(6194):302-5.
Niset et al., Experimentally feasible quantum erasure-correcting code for continuous variables. Physical review letters. Sep. 26, 2008;101(13):130503.
Niset et al., No-go theorem for Gaussian quantum error correction. Phys. Rev. Lett. Mar. 24, 2009;102:120501.
Niu et al., Hardware-efficient bosonic quantum error-correcting codes based on symmetry operators. Phys. Rev. A. Mar. 27, 2018;97:032323.
Noh et al., Encoding an oscillator into many oscillators. Phys. Rev. Lett. Aug. 18, 2020;125:080503.
Noh et al., Fault-tolerant bosonic quantum error correction with the surface-Gottesman-Kitaev-Preskill code. Physical Review A. Jan. 13, 2020;101(1):012316.
Noh et al., Quantum capacity bounds of Gaussian thermal loss channels and achievable rates with Gottesman-Kitaev-Preskill codes. IEEE Transactions on Information Theory. Apr. 2019;65(4):2563-82.
Ofek et al., Demonstrating quantum error correction that extends the lifetime of quantum information. arXiv preprint arXiv:1602.04768. Feb. 15, 2016, 44 pages.
Ofek et al., Extending the lifetime of a quantum bit with error correction in superconducting circuits. Nature. Aug. 2016;536(7617):441-5.
Paik et al., Observation of high coherence in Josephson junction qubits measured in a three-dimensional circuit QED architecture. Physical Review Letters. Dec. 5, 2011;107(24):240501.
Peng, Reproducible research in computational science. Science. Dec. 2, 2011;334(6060):1226-7.
Pirandola et al. Constructing finite-dimensional codes with optical continuous variables. Europhys. Lett. Oct. 1, 2004;68(323):0402202.
Pirandola et al. Generating continuous variable quantum codewords in the near-field atomic lithography. Journal of Physics B: Atomic, Molecular and Optical Physics. Feb. 1, 2006;39(4):997.
Plenio et al., Quantum error correction in the presence of spontaneous emission. Physical Review A. Jan. 1, 1997;55(1):67-71.
Reagor et al., Quantum memory with near-millisecond coherence in circuit QED. Phys Rev B. 2016;94:014506.
Reagor et al., Reaching 10 ms single photon lifetimes for superconducting aluminum cavities. Applied Physics Letters. May 13, 2013;102(19):192604.
Reed et al., Realization of three-qubit quantum error correction with superconducting circuits. Nature. Feb. 2012;482(7385):382-5.
Rigetti et al., Superconducting qubit in a waveguide cavity with a coherence time approaching 0.1 ms. Physical Review B. Sep. 24, 2012;86(10):100506.
Riste et al., Detecting bit-flip errors in a logical qubit using stabilizer measurements. Nature Communications. Apr. 29, 2015;6:6983.
Romero et al., Microwave photon detector in circuit QED. Physical review letters. Apr. 29, 2009;102(17):173602.

(56) References Cited

OTHER PUBLICATIONS

Royer et al. Stabilization of finite-energy Gottesman-Kitaev-Preskill states. Physical Review Letters. Dec. 31, 2020;125(26):260509.
Royer et al.. Encoding qubits in multimode grid states. PRX Quantum. Mar. 7, 2022;3(1):010335.
Sayrin et al., Real-time quantum feedback prepares and stabilizes photon number states. Nature. Sep. 2011;477(7362):73-7.
Schindler et al., Experimental repetitive quantum error correction. Science. May 27, 2011;332(6033):1059-61.
Schoelkopf et al., Wiring up quantum systems. Nature. Feb. 6, 2008;451(7179):664-9.
Schuster et al., Resolving photon number states in a superconducting circuit. Nature. Feb. 2007;445(7127):515-18.
Sete et al., Robust quantum state transfer using tunable couplers. Physical Review B. Apr. 22, 2015;91(14):144509.
Shankar et al., Autonomously stabilized entanglement between two superconducting quantum bits. Nature. Dec. 2013;504(7480):419.
Shor, Scheme for reducing decoherence in quantum computer memory. Physical review A. Oct. 1, 1995;52(4):R2493-6.
Silveri et al., New class of photonic quantum error correction codes. APS March Meeting 2016, Abstract ID K44.005, 1 page.
Silveri et al., Theory of remote entanglement via quantum-limited phase-preserving amplification. Physical Review A. Jun. 7, 2016;93(6):062310.
Smith et al., Many-body localization in a quantum simulator with programmable random disorder. Nature Physics. Oct. 2016;12(10):907-10.
Sparrow et al., Simulating the vibrational quantum dynamics of molecules using photonics. Nature. May 2018;557(7707):660-7.
Srinivasan et al., Time-reversal symmetrization of spontaneous emission for quantum state transfer. Physical Review A. Mar. 31, 2014;89(3):033857.
Srinivasan et al., Tunable coupling in circuit quantum electrodynamics using a superconducting charge qubit with a V-shaped energy level diagram. Physical review letters. Feb. 22, 2011;106(8):083601.
Steane, Error correcting codes in quantum theory. Physical Review Letters. Jul. 29, 1996;77(5):793-7.
Su et al., Conversion of Gaussian states to non-Gaussian states using photon-number-resolving detectors. Phys. Rev. A. Nov. 1, 2019; 100:052301.
Sun et al., Tracking photon jumps with repeated quantum non-demolition parity measurements. Nature. Jul. 2014;511(7510):444-8.
Sundaresan et al., Beyond strong coupling in a multimode cavity. Physical Review X. Jun. 29, 2015;5(2):021035.
Taminiau et al., Universal control and error correction in multi-qubit spin registers in diamond. Nature nanotechnology. Mar. 2014;9(3):171-6.
Terhal et al., Encoding a qubit into a cavity mode in circuit QED using phase estimation. Physical Review A. Jan. 11, 2016;93(1):012315.
Terhal, Quantum error correction for quantum memories. Reviews of Modern Physics. Apr. 7, 2015;87(2):307-46.
Touzard et al., Coherent oscillations inside a quantum mani-fold stabilized by dissipation. Phys. Rev. X. Apr. 4, 2018; 8:021005 (7 pages).
Touzard et al., Grid states for encoding and stabilizing a logical qubit in superconducting circuits (Part 2). APS March Meeting Abstracts 2019. Mar. 7, 2019:S27-005, 1 page. https://meetings.aps.org/Meeting/MAR19/Session/S27.5.
Travaglione et al. Preparing encoded states in an oscillator. Phys. Rev. A. Nov. 22, 2002;66:052322.
Underwood et al., Measurement of the motional sidebands of a nanogram-scale oscillator in the quantum regime. Physical Review A. Dec. 2, 2015;92(6):061801.
Vasconcelos et al., All-optical generation of states for "encoding a qubit in an oscillator". Opt. Lett. Oct. 1, 2010;35(19):3261-3.
Vlastakis et al., Deterministically encoding quantum information using 100-photon Schrödinger cat states. Science. Nov. 1, 2013;342(6158):607-10.
Vlastakis et al., Violating Bell's inequality with an artificial atom and a cat state in a cavity. arXiv preprint arXiv:1504.02512. Apr. 9, 2015.
Vuillot et al., Quantum Error Correction with the toric Gottesman-Kitaev-Preskill Code. Phys. Rev. A. Mar. 29, 2019;99:032344. arXiv:1810.00047v2 [quant-ph].
Waldherr et al., Quantum error correction in a solid-state hybrid spin register. Nature. Feb. 2014;506(7487):204-7.
Wang et al., A Schrödinger cat living in two boxes. Science. May 27, 2016;352(6289):1087-91.
Weedbrook et al., Gaussian quantum information. Rev. Mod. Phys. May 1, 2012;84:621-69.
Weigand et al., Generating Grid States From Schrödinger Cat States Without Postselection. Phys. Rev. A. Feb. 28, 2018;97:022341.
Wenner et al., Catching time-reversed microwave coherent state photons with 99.4% absorption efficiency. Physical Review Letters. May 28, 2014;112(21):210501.
Wilson-Rae et al., Theory of ground state cooling of a mechanical oscillator using dynamical backaction. Physical Review Letters. Aug. 28, 2007;99(9):093901.
Yin et al., Catch and release of microwave photon states. Physical review letters. Mar. 4, 2013;110(10):107001.
Yurke et al., SU (2) and SU (1, 1) interferometers. Physical Review A. Jun. 1, 1986;33(6):4033-54.
Yurke et al., The dynamic generation of Schrödinger cats and their detection. Physica B. Jul. 1, 1988;151(1-2):298-301.
Zanardi et al., Noiseless quantum codes. Physical Review Letters. Oct. 27, 1997;79(17):3306.
Zhang et al., Experimental implementation of encoded logical qubit operations in a perfect quantum error correcting code. Physical review letters. Sep. 6, 2012;109(10):100503.
Zheng et al., Demonstrating non-Abelian statistics of Majorana fermions using twist defects. Physical Review B. Dec. 31, 2015;92(24):245139.
Zueco et al., Qubit-oscillator dynamics in the dispersive regime: analytical theory beyond rotating-wave approximation. Physical Review A. 2009;80:033846.

* cited by examiner

ERROR CORRECTION WHILE MAINTAINING BOSONIC NATURE OF THE SYSTEM

CROSS-REFERENCE TO RELATED APPLICATIONS

The present application is a national stage filing under 35 U.S.C. 371 of International Patent Application Serial No. PCT/US2020/025204, filed Mar. 27, 2020, entitled "Error Correction While Maintaining Bosonic Nature Of The System", which claims the benefit under 35 U.S.C. § 119(e) of U.S. Provisional Patent Application No. 62/825,615, filed Mar. 28, 2019, and titled "Error Correction while Maintaining Bosonic Nature of the System". The contents of these applications are hereby incorporated by reference in their entirety.

FEDERALLY SPONSORED RESEARCH

This invention was made with government support under FA9550-15-1-0015 awarded by the United States Air Force Office of Scientific Research and under W911NF-18-1-0212 awarded by the United States Army Research Office. The government has certain rights in the invention.

BACKGROUND

Communication channels and data memory systems are often subject to sources of noise, which can introduce errors into the stored or transmitted data. Classical error detection and correction schema add redundancy to the transmitted or stored information to enable reliable delivery or recovery of digital data. Such classical schema can sample the transmitted or stored information to determine if the data has been corrupted and/or to correct the corrupted data.

However, quantum information processing uses quantum mechanical phenomena, such as energy quantization, superposition, and entanglement, to encode and process information in a way not utilized by conventional information processing. For example, it is known that certain computational problems may be solved more efficiently using quantum computation rather than conventional classical computation. Such quantum information processing cannot utilize classical error correction procedures because measuring the state of the quantum information system will collapse any superposition and/or entangled states, per the Heisenberg uncertainty principle. Scalable quantum computation will ultimately require quantum error correction schemes to provide fault-tolerant quantum information processing.

SUMMARY

The following is a non-limiting summary of some embodiments of the present application.

Some embodiments are directed to a quantum information device. The quantum information device comprises a plurality of quantum mechanical oscillators, comprising: a first data quantum mechanical oscillator configured to store information representing a first data state; and a first ancilla quantum mechanical oscillator coupled to the first data quantum mechanical oscillator, the first ancilla quantum mechanical oscillator configured to store information representing a first ancilla state, wherein the first ancilla state is initialized as a first Gottesman-Kitaev-Preskill (GKP) state. The quantum information device further comprises at least one electromagnetic radiation source coupled to the plurality of quantum mechanical oscillators and configured to entangle and/or disentangle the information stored in the first data quantum mechanical oscillator and the information stored in the first ancilla quantum mechanical oscillator by applying one or more drive waveforms to one or more of the quantum mechanical oscillators of the plurality of quantum mechanical oscillators; and at least one measurement device coupled to the first ancilla quantum mechanical oscillator, the at least one measurement device configured to measure a position quadrature operator and/or a momentum quadrature operator of the first ancilla quantum mechanical oscillator.

Some embodiments are directed to a method of performing quantum error correction. The method comprises: initializing a first Gottesman-Kitaev-Preskill (GKP) state in a first ancilla quantum mechanical oscillator; entangling information stored in a first data quantum mechanical oscillator with information stored in the first ancilla quantum mechanical oscillator; disentangling the information stored in the first data quantum mechanical oscillator and the information stored in the first ancilla quantum mechanical oscillator; measuring position and momentum quadrature operators of the first ancilla quantum mechanical oscillator; determining information indicative of noise in the information stored in the first data quantum mechanical oscillator based on the measured position and momentum quadrature operators; and using the determined information indicative of noise to correct for noise in the information stored in the first data quantum mechanical oscillator.

Some embodiments are directed to a quantum information device. The quantum information device comprises a plurality of quantum mechanical oscillators, comprising: one or more data quantum mechanical oscillators configured to store information representing one or more respective data states; and a plurality of ancilla quantum mechanical oscillators coupled to the one or more data quantum mechanical oscillators, the plurality of ancilla quantum mechanical oscillators configured to store information representing respective ancilla states, wherein the respective ancilla states are initialized as Gottesman-Kitaev-Preskill (GKP) states. The quantum information device further comprises at least one electromagnetic radiation source coupled to the one or more data quantum mechanical oscillators and to the plurality of ancilla quantum mechanical oscillators, the at least one electromagnetic radiation source being configured to entangle and/or disentangle the information stored in the one or more data quantum mechanical oscillators and the information stored in the plurality of first ancilla quantum mechanical oscillators by applying one or more drive waveforms to one or more of the quantum mechanical oscillators of the plurality of quantum mechanical oscillators; and at least one measurement device coupled to the plurality of ancilla quantum mechanical oscillators, the at least one measurement device configured to measure a position quadrature operator and/or a momentum quadrature operator of the first ancilla quantum mechanical oscillator.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
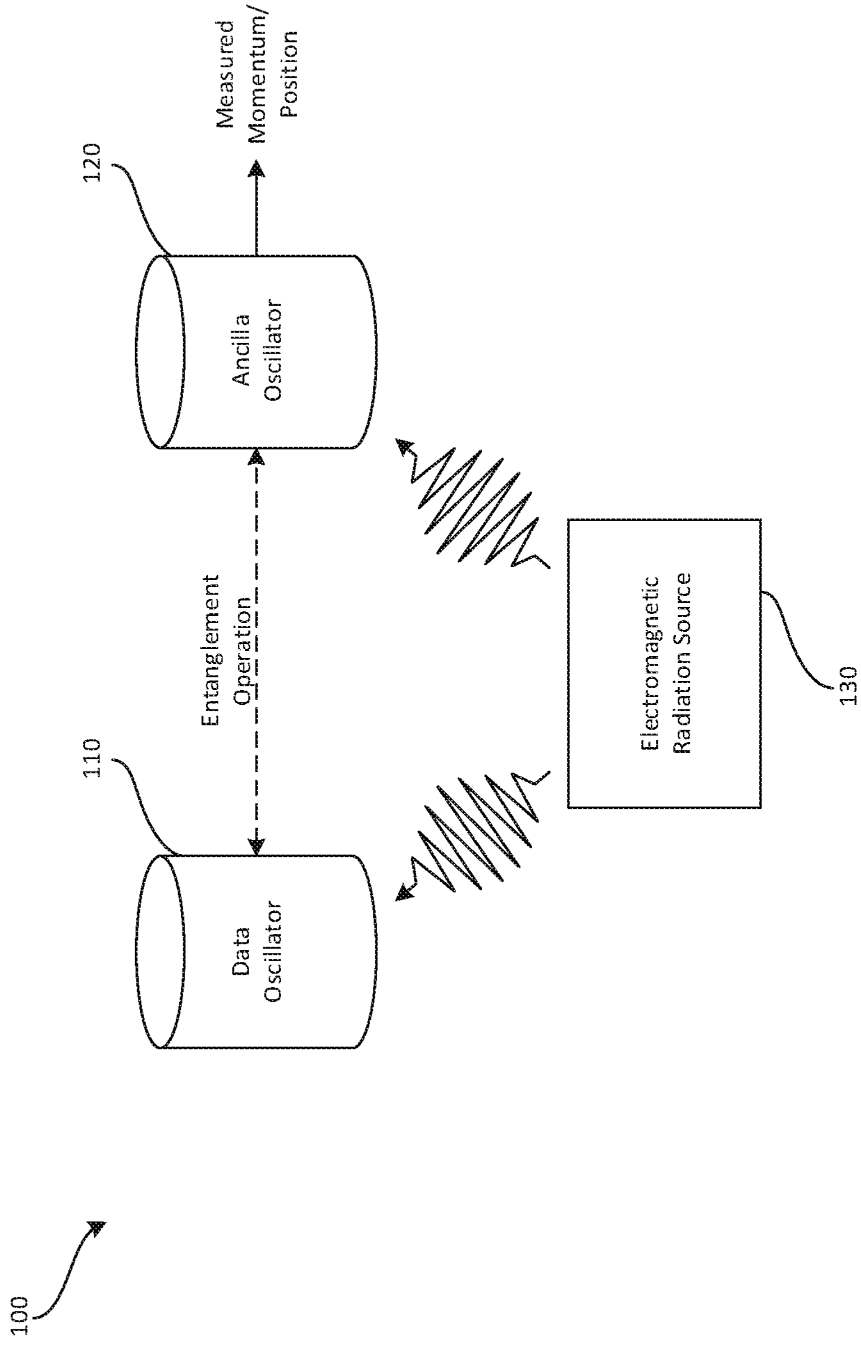
FIG. 1 illustrates an example of a bosonic system 100 configured for performing error correction, in accordance with embodiments described herein.

Continuous variable bosonic quantum systems are ubiquitous in various quantum computing and communication architectures and provide unique advantages to, for example, quantum simulation of bosonic systems such as boson sampling and vibrational quantum dynamics of molecules. Continuous variable bosonic quantum information processing may be implemented by using harmonic oscillator modes in a photonic system (e.g., quantum optics systems) or a phononic system (e.g., trapped ion systems). However, such harmonic oscillator modes may experience noise caused by, for example, excitation loss and/or thermal noise errors, which may alter or corrupt information stored in the quantum information system. Such noise sources can be challenges for realizing large-scale and fault-tolerant continuous variable quantum information processing.

Quantum error correction (QEC) schema, which may detect and/or correct for introduced errors caused by environmental noise, are therefore important for implementing scalable and fault-tolerant quantum information processing. In many bosonic QEC schemes, a finite-dimensional quantum system (e.g., a qubit) is encoded into an oscillator or into many oscillators. However, in such qubit-into-an-oscillator encoding schemes, the infinite-dimensional bosonic nature of the physical oscillator modes is lost at the logical level because the error-corrected logical system is described by discrete variables such as Pauli operators. Therefore, the error-corrected logical discrete variable system is not itself tailored to continuous-variable quantum information processing tasks.

The inventors have recognized and appreciated that if an infinite-dimensional oscillator mode is encoded into many noisy oscillator modes (e.g., oscillator-into-oscillators encoding), such an error-corrected oscillator mode will still be tailored to various continuous-variable quantum information processing tasks. In general, oscillator-into-oscillators bosonic QEC is more challenging than qubit-into-oscillators bosonic QEC because in the former, an infinite-dimensional bosonic Hilbert space is being protected against relevant errors, whereas in the latter only a finite-dimensional Hilbert space embedded in infinite-dimensional bosonic modes is being protected against relevant errors. For this reason, some qubit-into-oscillators QEC codes exist which can correct experimentally-relevant Gaussian errors such as excitation losses, thermal noise, and additive Gaussian noise errors. However, some previously-proposed oscillator-into-oscillators QEC codes cannot correct Gaussian errors because they rely on Gaussian QEC schemes, and established no-go theorems state that Gaussian errors cannot be corrected using only Gaussian resources because of the Heisenberg uncertainty principle.

The Heisenberg uncertainty principle states that the position and momentum operators $\hat{q}\equiv(\hat{a}^\dagger+\hat{a})/\sqrt{2}$ and $\hat{p}\equiv i(\hat{a}^\dagger-\hat{a})/\sqrt{2}$ cannot be measured simultaneously because they do not commute with each other (e.g., $[\hat{q}, \hat{p}]=i\neq0$). However, the following displacement operators do commute with each other:

$$\hat{S}_q\equiv e^{i\sqrt{2\pi}\hat{q}} \text{ and } \hat{S}_q\equiv e^{-i\sqrt{2\pi}\hat{p}}$$

and therefore can be measured simultaneously. Note that measuring $\hat{S}_q\equiv\exp[i\sqrt{2\pi}\hat{q}]$ and $\hat{S}_p=\exp[-i\sqrt{2\pi}\hat{p}]$ is equivalent to measuring their exponents (or phase angles) $i\sqrt{2\pi}\hat{q}$ and $i\sqrt{2\pi}\hat{p}$ modulo $2\pi i$. Thus, the commutativity of $\hat{S}_q$ and $\hat{S}_p$ implies that the position and momentum operators can be measured simultaneously if they are measured modulo $\sqrt{2\pi}$.

The inventors have recognized and appreciated that these no-go theorems can be circumvented by using non-Gaussian resources to perform bosonic QEC. Examples of non-Gaussian resources include the single-photon Fock state and photon-number-resolving measurements, Kerr nonlinearities, cubic phase state and gate, selective number-dependent arbitrary phase (SNAP) gate, Schrodinger cat states, and Gottesman-Kitaev-Preskill (GKP) states. The inventors have further recognized and appreciated that GKP states may be particularly useful for performing oscillator-into-oscillators QEC, enabling fault-tolerant, continuous-variable bosonic systems.

The canonical GKP state (or the grid state) is defined as the unique (up to an overall phase) simultaneous eigenstate of the two commuting displacement operators $\hat{S}_q$ and $\hat{S}_p$ with unit eigenvalues. Explicitly, the canonical GKP state is given by:

$$|GKP\rangle \propto \sum_{n\in\mathbb{Z}} |\hat{q}=\sqrt{2\pi}\,n\rangle \propto \sum_{n\in\mathbb{Z}} |\hat{p}=\sqrt{2\pi}\,n\rangle$$

and thus has no definite values for both the position and momentum operators modulo $\sqrt{2\pi}$ (e.g., $\hat{q}=\hat{p}=0 \bmod \sqrt{2\pi}$).

Figure 4A:
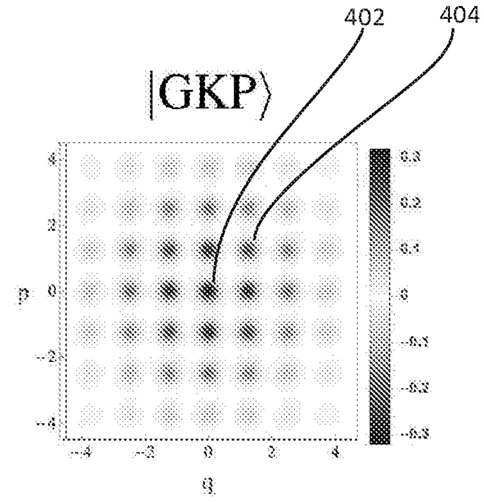
FIG. 4A illustrates an approximate Gottesman-Kitaev-Preskill (GKP) state with an average photon number $\bar{n}=5$, in accordance with some embodiments described herein.

The canonical GKP state has an infinite average photon number because it comprises superpositions of infinitely many ($\Sigma_{n\in\mathbb{Z}}$) infinitely squeezed states ($|\hat{q}=\sqrt{2\pi}n\rangle$ or $|\hat{p}=\sqrt{2\pi}n\rangle$). However, an approximate GKP state with a finite average photon number can be defined by applying a non-unitary operator $\exp[-\Delta\hat{n}]$ to the canonical GKP state and then normalizing the output state: $|GKP_\Delta\rangle \propto \exp[-\Delta\hat{n}]|GKP\rangle$. FIG. 4A illustrates the Wigner function of the canonical GKP state with an average photon number $\bar{n}=5$. Negative peaks (e.g., peak 404) in the Wigner function in addition to positive peaks (e.g., peak 402) indicate that the canonical GKP state is a non-Gaussian state.

Accordingly, the inventors have developed systems and methods for performing QEC using one or more GKP states. Some embodiments are directed to a quantum information device. The quantum information device comprises a plurality of quantum mechanical oscillators (e.g., microwave resonator cavities, trapped ion oscillators, or any suitable quantum oscillator). The plurality of quantum mechanical oscillators comprises a first data quantum mechanical oscillator configured to store information representing a first data state and a first ancilla quantum mechanical oscillator coupled to the first data quantum mechanical oscillator. The first ancilla quantum mechanical oscillator is configured to store information representing a first ancilla state, wherein the first ancilla state may be initialized as a first GKP state.

In some embodiments, the quantum information device further comprises at least one electromagnetic radiation source coupled to the plurality of quantum mechanical oscillators. For example, the at least one electromagnetic radiation source may include a microwave source. The at least one electromagnetic radiation source may be configured to entangle and/or disentangle the information stored in the first data quantum mechanical oscillator and the information stored in the first ancilla quantum mechanical oscillator by applying one or more drive waveforms to one or more of the quantum mechanical oscillators of the plurality of quantum mechanical oscillators.

In some embodiments, at least one measurement device may be coupled to the first ancilla quantum mechanical oscillator. The at least one measurement device may be configured to measure a position operator and/or a momentum operator of the first ancilla quantum mechanical oscillator in order to detect error in the first data quantum mechanical oscillator. For example, the at least one measurement device may be at least one homodyne detector configured to perform homodyne detection to measure a position and/or a momentum operator of the first ancilla quantum mechanical oscillator.

Some embodiments are directed to a method of performing QEC. The method comprises initializing a first GKP state in a first ancilla quantum mechanical oscillator. For example, the first GKP state may be initialized using a drive waveform (e.g., a microwave signal) or any other suitable technique. Then, information stored in a first data quantum mechanical oscillator may be entangled with information stored in the first ancilla quantum mechanical oscillator by using an entangling operation (e.g., a SUM gate, a squeezing operation). The first data quantum mechanical oscillator and first ancilla quantum mechanical oscillator may then be disentangled by using a disentangling operation (e.g., an inverse SUM gate, an inverse squeezing operation). The position and momentum quadrature operators of the first ancilla quantum mechanical oscillator may be measured using any suitable method, including, for example, homodyne detection. From the measured position and momentum quadrature operators, information indicative of noise in the information stored in the first data quantum mechanical oscillator may be determined. This determined information indicative of noise may be used to correct for noise in the information stored in the first data quantum mechanical oscillator. For example, error correction may be performed by applying a displacement operation (e.g., using a drive waveform) to the first data quantum mechanical oscillator.

Following below are more detailed descriptions of various concepts related to, and embodiments of quantum error correction techniques. It should be appreciated that various aspects described herein may be implemented in any of numerous ways. Examples of specific implementations are provided herein for illustrative purposes only. In addition, the various aspects described in the embodiments below may be used alone or in any combinations and are not limited to the combinations explicitly described herein.

FIG. 1 illustrates an example of a bosonic system 100 configured for performing error correction, in accordance with embodiments described herein. Bosonic system 100 includes data oscillator 110 and ancilla oscillator 120 coupled to electromagnetic radiation source 130. Data oscillator 110 and ancilla oscillator 120 may be any suitable bosonic quantum mechanical oscillator. For example, data oscillator 110 and ancilla oscillator 120 may be resonator cavities (e.g., microwave resonator cavities) or trapped ion oscillators. In some embodiments, data oscillator 110 and ancilla oscillator 120 may be coaxial resonator cavities formed from, for example, aluminum.

Electromagnetic radiation source 130 may be configured to apply one or more electromagnetic signals to drive data oscillator 110 and/or ancilla oscillator 120. Such electromagnetic signals may be, for example, microwave signals or laser-generated signals. The choice of electromagnetic signals used to drive data oscillator 110 and/or ancilla oscillator 120 may be determined based on the types of quantum mechanical oscillators used in bosonic system 100, in some embodiments.

In some embodiments, the ancilla oscillator 120 may be put into an initial GKP state by an electromagnetic signal from electromagnetic radiation source 130. The initial GKP state of the ancilla oscillator 120 may then be entangled with the state of the data oscillator 110. Such entanglement may be performed by one or more electromagnetic signals from electromagnetic radiation source 130. For example, a SUM gate or a squeezing operation may be used to entangle the states of the data oscillator 110 and the ancilla oscillator 120. A squeezing operation may be, for example, an operation configured to produce a squeezed state (e.g., wherein the squeezed state comprises a quantum uncertainty smaller than that of a coherent state).

In some embodiments, after the entangled states of the data oscillator 110 and the ancilla oscillator 120 have encountered a source of noise such that both states include a correlated noise error (e.g., both states include the same error), the entangled states may be disentangled and the error may be detected and corrected. Disentangling of the states may be performed by one or more electromagnetic signals from electromagnetic radiation source 130. For example, an inverse SUM gate or an inverse squeezing operation may be used to disentangle the states of the data oscillator and the ancilla oscillator 120.

In some embodiments, the correlated noise error may be detected by measuring position and momentum operators of the ancilla oscillator 120 so as to not disturb the state of the data oscillator 110. The position and momentum operators of the ancilla oscillator 120, in some embodiments, may be measured modulo $\sqrt{2\pi}$. In some embodiments, the position and momentum operators of the ancilla oscillator 120 may be measured, for example, using a homodyne detection measurement. Such homodyne detection measurements may be performed, in some embodiments, by a homodyne detector (e.g., an integrated photonic homodyne detector, or any suitable homodyne detector).

In some embodiments, the measured position and momentum operators of the ancilla oscillator 120 may be used to correct the error present in the state of the data oscillator 110. For example, displacement operations may be applied to the state of the data oscillator 110. In some embodiments, such displacement operations may be applied to the state of the data oscillator 110 by applying one or more electromagnetic signals from electromagnetic radiation source 130.

In some embodiments, the state of the data oscillator 110 may be detected after performing a QEC procedure by readout resonator (not pictured) coupled to the data oscillator 110. For example, in embodiments where the data oscillator 110 comprises a microwave resonator cavity, the readout resonator may include a stripline resonator that may be coupled to the data oscillator 110.

Figure 2:
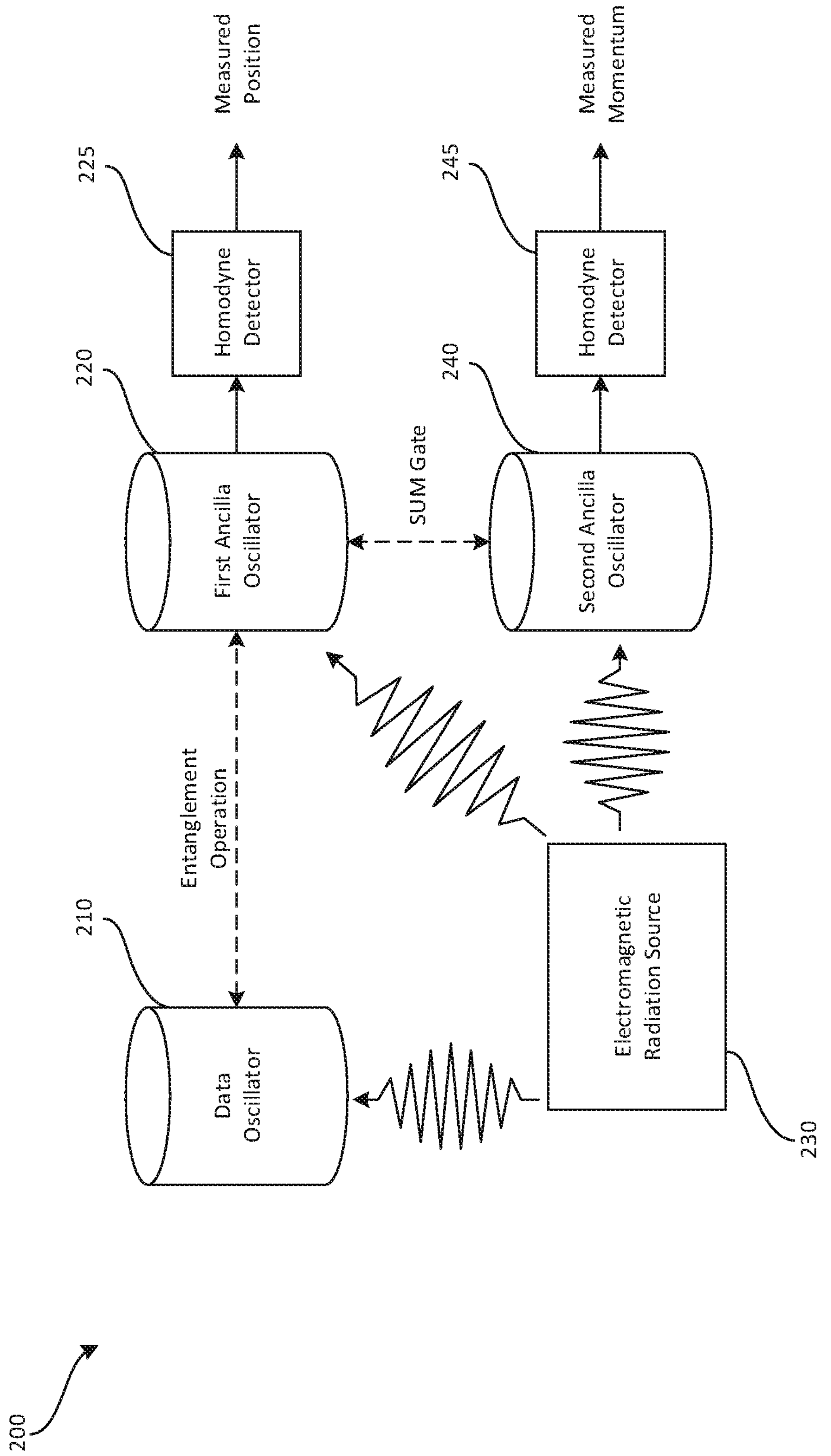
FIG. 2 illustrates an example of a bosonic system 200 configured for performing error correction, in accordance with embodiments described herein.

FIG. 2 illustrates an additional example of a bosonic system 200 configured for performing error correction, in accordance with embodiments described herein. Bosonic system 200 includes data oscillator 210, first ancilla oscillator 220, and second ancilla oscillator 240 coupled to electromagnetic radiation source 230. Data oscillator 210, first ancilla oscillator 220, and second ancilla oscillator 240 may be any suitable bosonic quantum mechanical oscillator, including those discussed in connection with the example of FIG. 1. It may be appreciated that the embodiment of FIG. 2 presents an example, and that additional embodiments may include any number of data and/or ancilla oscillators (e.g., greater than two data and/or ancilla oscillators, three data and/or ancilla oscillators, up to 15 data and/or ancilla oscillators, etc.).

Electromagnetic radiation source 230 may be configured to apply one or more electromagnetic signals to drive data oscillator 210, first ancilla oscillator 220, and/or second ancilla oscillator 240. Such electromagnetic signals may be, for example, microwave signals or laser-generated signals. The electromagnetic signals may be configured to, for example, initialize states within the oscillators, perform operations on the states within the oscillators, and/or entangle states of one or more of the oscillators of bosonic system 200.

In some embodiments, the first ancilla oscillator 220 and the second ancilla oscillator 240 may be put into initial GKP states by electromagnetic signals from electromagnetic radiation source 230. The initial GKP state of the first ancilla oscillator 220 may then be entangled with the state of the data oscillator 210. Such entanglement may be performed by one or more electromagnetic signals from electromagnetic radiation source 230. For example, a SUM gate or a squeezing operation may be used to entangle the states of the data oscillator 210 and the first ancilla oscillator 220.

In some embodiments, after the entangled states of the data oscillator 210 and the first ancilla oscillator 220 have encountered a source of noise such that both states include a correlated noise error (e.g., both states include the same error), the entangled states may be disentangled and the error may be detected and corrected. Disentangling of the states may be performed by one or more electromagnetic signals from electromagnetic radiation source 230. For example, an inverse SUM gate or an inverse squeezing operation may be used to disentangle the states of the data oscillator 210 and the first ancilla oscillator 220.

In some embodiments, after disentangling the state of the first ancilla oscillator 220 from the state of the data oscillator 210, the state of the first ancilla oscillator may be entangled with the state of the second ancilla oscillator 240. Such entanglement may be performed by one or more electromagnetic signals from electromagnetic radiation source 230. For example, a SUM gate may be used to entangle the states of the first ancilla oscillator 210 and the second ancilla oscillator 240.

In some embodiments, the correlated noise error may be detected by measuring the position operator of the first ancilla oscillator 220 and the momentum operator of the second ancilla oscillator 240. The position and momentum operators of the first ancilla oscillator 220 and the second ancilla oscillator 240, in some embodiments, may be measured modulo $\sqrt{2\pi}$. In some embodiments, the position and momentum operators of the first ancilla oscillator 220 and the second ancilla oscillator 240 may be measured, for example, using a homodyne detection measurement. Such homodyne detection measurements may be performed, in some embodiments, by homodyne detectors 225 and 245. Homodyne detectors 225 and 245 may be, for example, an integrated photonic homodyne detector, or any suitable homodyne detector.

In some embodiments, the measured position and momentum operators of the first ancilla oscillator 220 and the second ancilla oscillator 240 may be used to correct the error present in the state of the data oscillator 210. For example, displacement operations may be applied to the state of the data oscillator 210. In some embodiments, such displacement operations may be applied to the state of the data oscillator 210 by applying one or more electromagnetic signals from electromagnetic radiation source 230.

In some embodiments, the state of the data oscillator 210 may be detected after performing a QEC procedure by readout resonator (not pictured) coupled to the data oscillator 210. For example, in embodiments where the data oscillator 110 comprises a microwave resonator cavity, the readout resonator may include a stripline resonator that may be coupled to the data oscillator 210.

Figure 3:
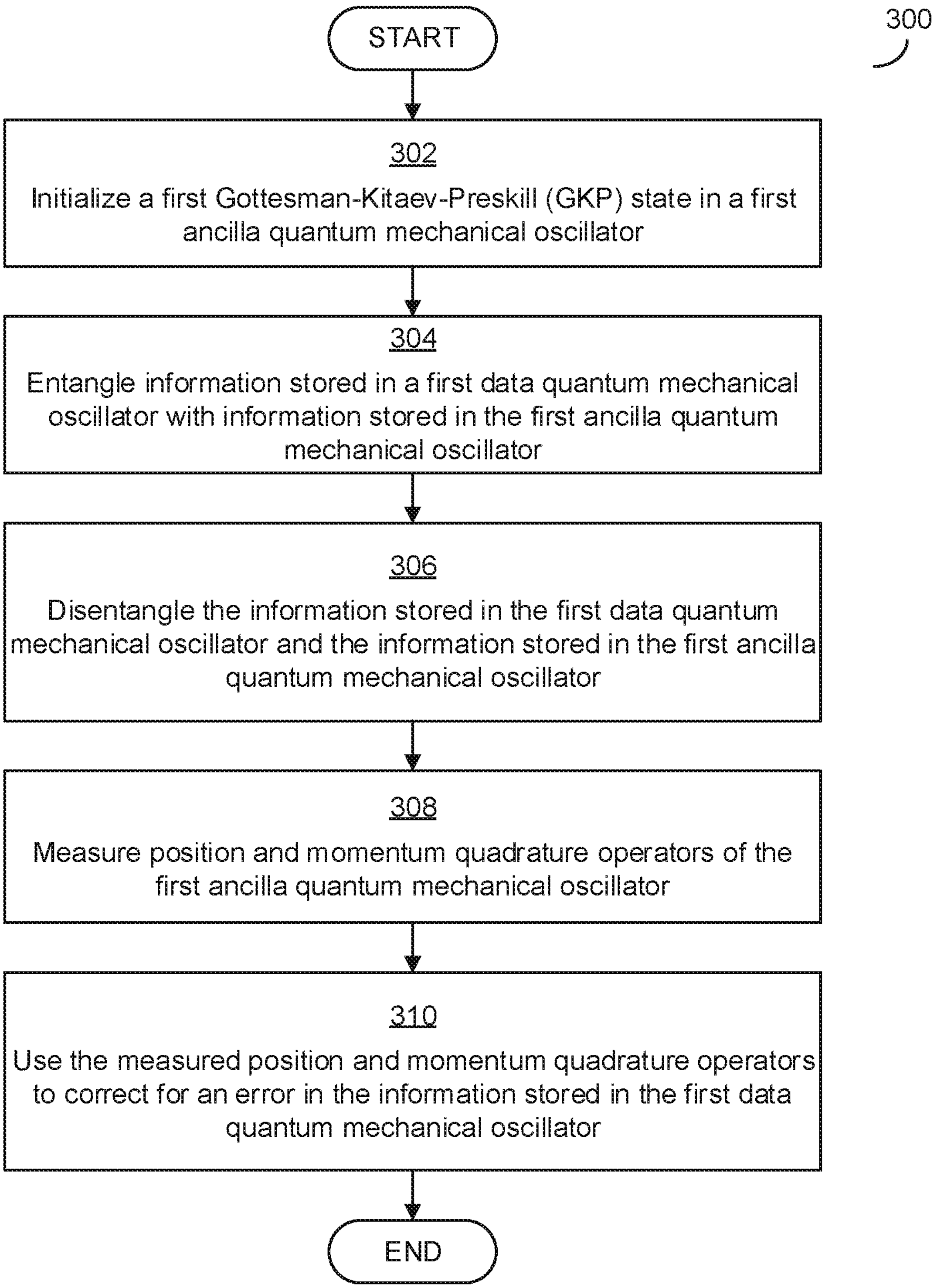
FIG. 3 is a flowchart illustrating a process 300 for performing quantum error correction, in accordance with embodiments described herein.

FIG. 3 is a flowchart illustrating a process 300 for performing QEC, in accordance with embodiments described herein. Process 300 may start at act 302, in which a first GKP state may be initialized in a first ancilla quantum mechanical oscillator. For example, as described in connection with FIGS. 1 and 2, the first ancilla quantum mechanical oscillator may be any suitable bosonic quantum mechanical oscillator (e.g., a resonator cavity, a trapped ion oscillator, etc.). The first GKP state may be initialized in the first ancilla quantum mechanical oscillator using one or more electromagnetic signals (e.g., microwave signals, laser-generated signals).

In act 304, the information (e.g., data) stored in a first data quantum mechanical oscillator may be entangled with the information (e.g., the first GKP state) stored in the first ancilla quantum mechanical oscillator. In some embodiments, the entangling may be performed using a SUM gate or a squeezing operation implemented by, for example, one or more electromagnetic signals sent to the first data quantum mechanical oscillator and/or the first ancilla quantum mechanical oscillator.

After exposure to a source of noise, in act 308 the information stored in the first data quantum mechanical oscillator and the information stored in the first ancilla quantum mechanical oscillator may be disentangled. In some embodiments, the disentangling may be performed using an inverse SUM gate or an inverse squeezing operation implemented by, for example, one or more electromagnetic signals sent to the first data quantum mechanical oscillator and/or the first ancilla quantum mechanical oscillator.

In act 308, position and momentum quadrature operators of the first ancilla quantum mechanical oscillator may be measured. The position and momentum quadrature operators of the first ancilla quantum mechanical oscillator may be measured, in some embodiments, using one or more homodyne detectors to perform homodyne detection. The position and momentum quadrature operators may be measured, for example, modulo $\sqrt{2\pi}$ using homodyne detection.

In act 310, the measured position and momentum quadrature operators of the first quantum mechanical oscillator may be used to correct for an error in the information stored in the first data quantum mechanical oscillator. For example, in some embodiments, displacement operations based on the measured position and momentum quadrature operators may be applied to the first data quantum mechanical oscillator to correct for an error in the stored information. The displacement operations may be applied, for example, by driving the first data quantum mechanical oscillator with one or more electromagnetic signals.

Turning back to FIG. 4A, which depicts the Wigner function of the canonical GKP state with an average photon number $\bar{n}=5$, there have been many proposals for preparing an approximate GKP state in various experimental platforms. Notably an approximate GKP state has been realized in a trapped ion system and a variation of an approximate GKP state has been realized in a circuit quantum electrodynamics (QED) system. For the discussion herein in connection with FIGS. 4A-10B, the use of the ideal canonical GKP state is considered. The use of approximate GKP states will be discussed in connection with FIGS. 11A-14C.

Figure 4B:
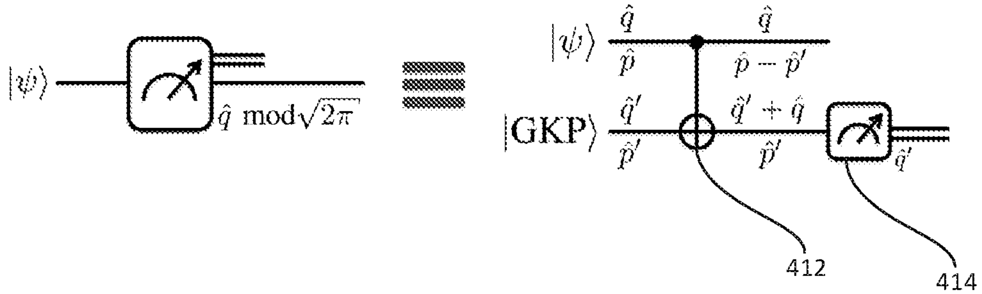
FIGS. 4B and 4C illustrate measurement of the position and momentum operators, respectively, modulo $\sqrt{2\pi}$, in accordance with some embodiments described herein.
Figure 4C:
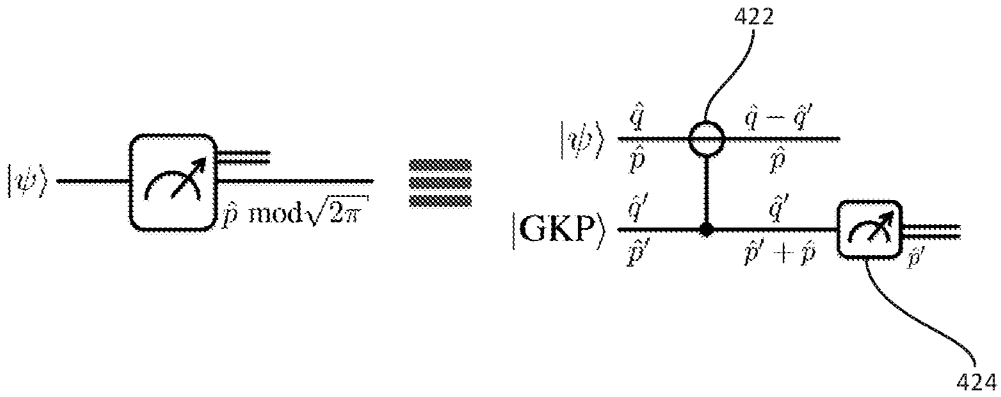

The ability to measure the position and momentum operators modulo $\sqrt{2\pi}$ allows for the preparation of the canonical GKP state. Additionally, the converse is also true. That is, the quadrature operators can be measured modulo $\sqrt{2\pi}$ given GKP states and Gaussian operations as resources. As shown in FIGS. 4B and 4C, the position and momentum operators of a data state lip $|\psi\rangle$ can be measured modulo $\sqrt{2\pi}$ using a canonical GKP state, the SUM gate 412 or inverse SUM gate 422, and a homodyne measurement 414 of the position operator and a homodyne measurement 424 of the momentum operator, respectively. In some embodiments, the SUM gate 412 is a Gaussian operation and is defined as $\mathrm{SUM}_{j\to k}\equiv\exp[-i\hat{q}_j\hat{p}_k]$ which maps $\hat{q}_k$ to $\hat{q}_k+\hat{q}_j$. The inverse SUM gate is defined as the inverse of the SUM gate, as defined herein. The canonical GKP state and the modulo simultaneous quadrature measurement are the non-Gaussian resources of the oscillator-into-oscillators encoding schemes, introduced below.

Figure 5A:
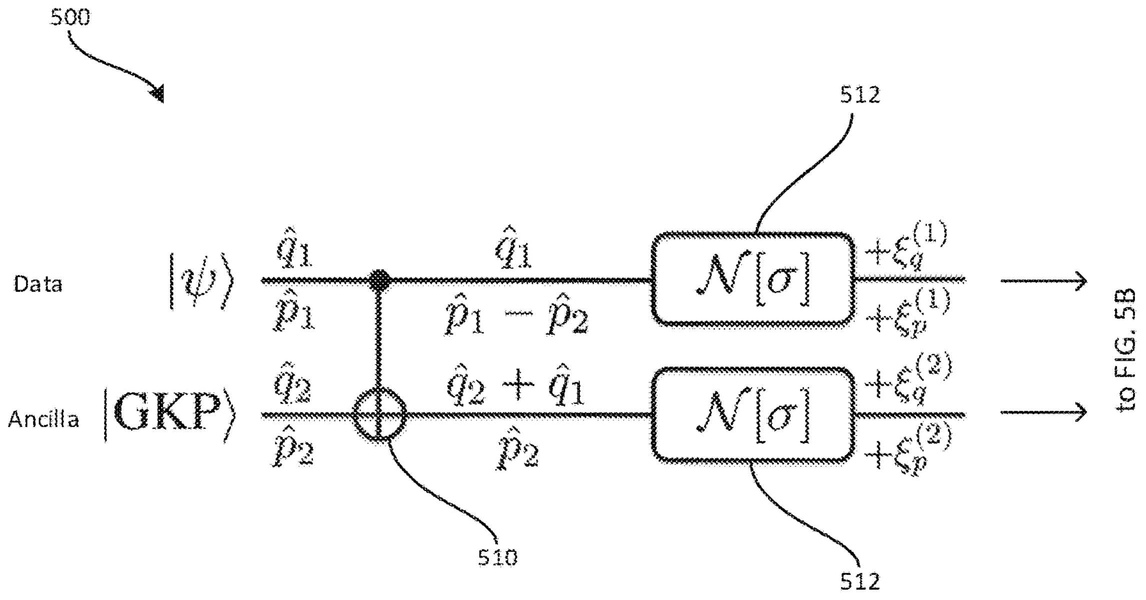
FIG. 5A illustrates an example of a two-mode bosonic system 500 performing entangling using a two-mode GKP-repetition code and subject to Gaussian noise errors after entangling of the two modes, in accordance with some embodiments described herein.

From these non-Gaussian resources, a non-Gaussian oscillator-into-oscillators code may be constructed. This code may be, in some embodiments, the two-mode GKP-repetition code, which may be used to correct additive Gaussian noise errors. FIG. 5A illustrates an example of a two-mode bosonic system 500 performing encoding ("entangling") of a data state, $|\psi\rangle$, and an ancilla state initialized in a GKP state, $|\mathrm{GKP}\rangle$, using a two-mode GKP-repetition code, in accordance with some embodiments described herein. The data state and the ancilla state may be entangled using a SUM gate 510. The two-mode bosonic system 500 may be subject to correlated Gaussian noise errors 512 after entangling of the two modes.

Quantum error-correcting codes function by hiding the quantum information from the environment by storing the logical state in a non-local entangled state of the physical components. In the case of the scheme presented in connection with FIGS. 5A and 5B, a data oscillator state is entangled via a Gaussian operation with an ancillary oscillator mode, which is initially in the canonical GKP state, in a manner that prevents the environment from learning about the logically encoded state. Like qubit-into-an-oscillator GKP codes, this oscillator-into-oscillators code is specifically designed to protect against random displacement errors. Additionally, this scheme succeeds because of the assumption of access to non-Gaussian resources (e.g., GKP states, modular quadrature measurements) that are unavailable to the environment.

An arbitrary bosonic data state, $|\psi\rangle=\int dq\psi(q)|\hat{q}_1=q\rangle$, may be encoded into two oscillator modes such that:

$$|\psi_L\rangle=\mathrm{SUM}_{1\to 2}|\psi\rangle\otimes|GKP\rangle,$$

where $|\text{GKP}\rangle$ is the canonical GKP state in the second mode, or ancilla state. This encoding process is the two-mode GKP-repetition code described in connection with FIG. 5A. After entangling the data state and the ancilla state through the encoding process, the information of the data state may be stored in both the data state and the ancilla state. Further, the SUM gate, $\text{SUM}_{j\to k}\equiv\exp[-i\hat{q}_j\hat{p}_k](j\neq k)$, is a continuous variable analog of the CNOT gate, which, in the Heisenberg regime, transforms $\hat{q}_k$ into $\hat{q}_k+\hat{q}_j$ and $\hat{p}_j$ into $\hat{p}_j-\hat{p}_k$ while leaving all other quadrature operators unchanged. The quadrature operators are transformed by the encoding circuit into the following:

$$\hat{q}_1\to q'_1\equiv\hat{q}_1$$

$$\hat{p}_1\to p'_1\equiv\hat{p}_1-\hat{p}_2$$

$$\hat{q}_2\to q'_2\equiv\hat{q}_2-\hat{q}_1$$

$$\hat{p}_2\to p'_2\equiv\hat{p}_2.$$

Note that the SUM gate in the encoding circuit is analogous to the CNOT gate in the encoding circuit of the two-bit repetition code for qubit bit-flip errors. Additionally, the two-mode GKP-repetition code can be considered as a non-Gaussian modification of the two-mode Gaussian-repetition code.

The performance of the two-mode GKP-repetition code can be analyzed by assuming that the data and ancilla states undergo independent and identically distributed (iid) additive Gaussian noise errors (or Gaussian random displacement errors): $\mathcal{N}^{(1)}[\sigma]\otimes\mathcal{N}^{(2)}[\sigma]$. Here, $\mathcal{N}^{(k)}[\sigma]$ is an additive Gaussian noise error acting on the $k^{th}$ mode which, in the Heisenberg regime, adds Gaussian random noise $\xi_q^{(k)}$ and $\xi_p^{(k)}$ to the position and momentum operators of the $k^{th}$ mode, e.g.:

$$\hat{q}'_k\to\hat{q}''_k\equiv\hat{q}'_k+\xi_q^{(k)} \text{ and } \hat{p}'_k\to\hat{p}''_k\equiv\hat{p}'_k+\xi_p^{(k)}$$

where $k\in(1,2)$. Also, $\xi_q^{(k)}$ and $\xi_p^{(k)}$ are independent Gaussian random variables with zero mean and variance $\sigma^2$. That is, $(\xi_q^{(1)}, \xi_p^{(1)}, \xi_q^{(2)}, \xi_p^{(2)})\sim_{iid}\mathcal{N}(0,\sigma^2)$. Such additive Gaussian noise errors may be generic in the sense that any excitation loss and/or thermal noise errors can be converted into an additive Gaussian noise error by applying a suitable quantum-limited amplification channel. For example, a pure excitation loss error with loss probability $\gamma$ can be converted into an additive Gaussian noise error $\mathcal{N}[\sigma]$ with $\sigma=\sqrt{\gamma}$.

Figure 5B:
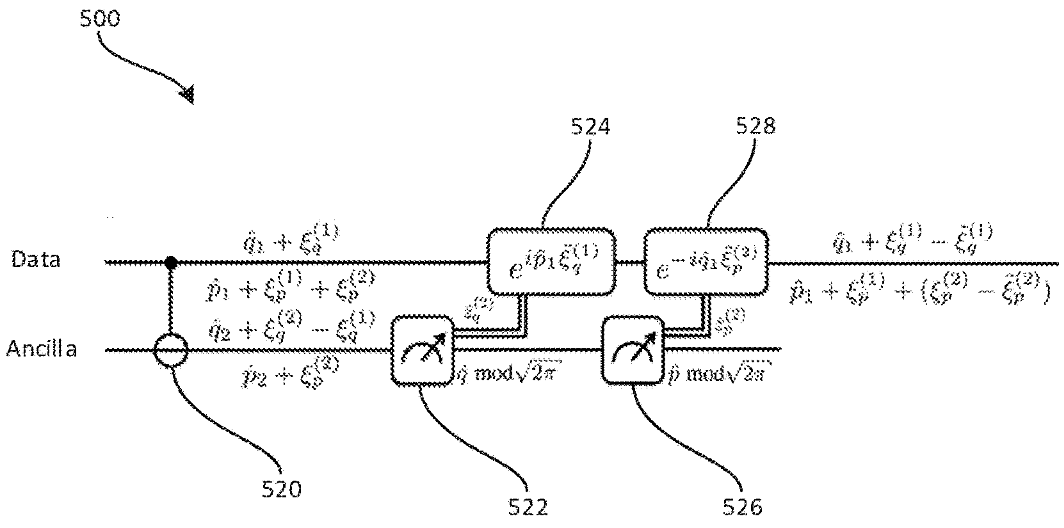
FIG. 5B illustrates an example of a two-mode bosonic system 500 performing disentangling using a two-mode GKP-repetition code and error correction, in accordance with some embodiments described herein.

FIG. 5B illustrates an example of the two-mode bosonic system 500 performing a decoding operation ("disentangling") using a two-mode GKP-repetition code, in accordance with some embodiments described herein. The data state and the ancilla state may be disentangled using an inverse SUM gate 520 (e.g., $\text{SUM}_{1\to 2}^{\dagger}=\exp[i\hat{q}_1\hat{p}_2]$). Upon the inverse SUM gate, the transformed quadrature operators are transformed back to the original quadrature operators but the added quadrature noise $\xi_{q/p}^{(1)}$ and $\xi_{q/p}^{(2)}$ may be reshaped, e.g., $$\hat{q}''_k\to\hat{q}_k+z_q^{(k)}$$

$$\hat{p}''_k\to\hat{p}_k+z_p^{(k)}$$

for $k\in\{1, 2\}$, where the reshaped quadrature noise $z_q^{(k)}$ and $z_p^{(k)}$ are given by:

$$z_q^{(1)}\equiv\xi_q^{(1)},$$

$$z_p^{(1)}\equiv\xi_p^{(1)}+\xi_p^{(2)},$$

$$z_q^{(2)}\equiv\xi_q^{(2)}-\xi_q^{(1)},$$

$$z_p^{(2)}\equiv\xi_p^{(2)}.$$

The position quadrature noise of the data mode, $\xi_q^{(1)}$, may be transferred to the position quadrature of the ancilla mode (see $-\xi_q^{(1)}$ in $z_q^{(2)}$).

Thereafter, momentum and position quadrature operators of the ancilla state may be measured modulo $\sqrt{2\pi}$ by measurement devices 522 and 526 of FIG. 5B. In some embodiments, measurement devices 522 and 526 may be homodyne detectors and measurement of the momentum and position quadrature operators may be performed using a homodyne detection. By performing such measurements, both $\hat{q}'''_2\equiv\hat{q}_2+z_q^{(2)}$ and $\hat{p}'''_2\equiv\hat{p}_2+z_p^{(2)}$ are measured modulo $\sqrt{2\pi}$. Such measurements of $\hat{q}'''_2$ and $\hat{p}'''_2$ are equivalent to measurements of the reshaped ancilla quadrature noise $z_q^{(k)}$ and $z_p^{(k)}$ modulo $\sqrt{2\pi}$ because the ancilla state was initially in the canonical GKP state such that $\hat{q}=\hat{p}=0 \bmod \sqrt{2\pi}$ holds. The extracted information about $z_q^{(2)}\equiv\xi_q^{(2)}-\xi_q^{(1)}$ and $z_p^{(2)}\equiv\xi_p^{(2)}$ may then be used to estimate the data position quadrature noise $\xi_q^{(1)}$ and the ancilla momentum quadrature noise $\xi_p^{(2)}$ such that the uncertainty of the data position quadrature noise is reduced while the ancilla momentum quadrature noise (transferred to the data momentum quadrature) does not degrade the momentum quadrature of the data mode.

From the outcomes of the measurements of $z_q^{(2)}$ and $z_p^{(2)}$ modulo $\sqrt{2\pi}$, the true values) of $z_q^{(2)}$ and $z_p^{(2)}$ may be assumed to be the ones with the smallest length among the candidate values that are compatible with the modular measurement outcomes. That is, $$\bar{z}_q^{(2)}=R_{\sqrt{2\pi}}(z_q^{(2)}) \text{ and } \bar{z}_p^{(2)}=R_{\sqrt{2\pi}}(z_p^{(2)})$$

where $R_s(z)\equiv z-n^*(z)s$ and $n^*(z)\equiv \operatorname{argmin}_{n\in\mathbb{Z}}|z-ns|$. More concretely, $R_s(z)$ equals a displaced sawtooth function with an amplitude and period s that is given by $R_s(z)=z$ if $z\in[-s/2, s/2]$. Then, based on these estimates, it can be further estimated that the position quadrature noise of the data mode $\xi_q^{(1)}$ and the momentum quadrature noise of the ancilla mode $\xi_q^{(2)}$ are given by:

$$\tilde{\xi}_q^{(1)}=-\frac{\bar{z}_q^{(1)}+\bar{z}_q^{(2)}}{2} \text{ and } \tilde{\xi}_p^{(2)}=\bar{z}_p^{(2)}.$$

The former estimate may be based on a maximum likelihood estimation, in some embodiments, and as described in Appendix A herein.

In some embodiments, the noise error in the data state may be corrected based on the estimates of $\xi_q^{(1)}$ and $\xi_q^{(2)}$. This correction may be performed, for example, by applying counter displacement operators, $\exp[i\hat{p}_1\tilde{\xi}_q^{(1)}]$ and $\exp[-i\hat{p}_1\tilde{\xi}_p^{(2)}]$, to the data state. The counter displacement operators may be momentum and position displacement operators 524 and 528. In some embodiments, the displacement operators 524 and/or 528 may be applied to the data state using an electromagnetic signal (e.g., a microwave signal, a laser-generated photonic signal).

After applying the counter displacement operations to the data state, the logical position and momentum quadrature noise may then be given by:

$$\xi_q\equiv z_q^{(1)}-\tilde{\xi}_q^{(1)}=\xi_q^{(1)}+1/2R_{\sqrt{2\pi}}(\xi_q^{(2)}-\xi_q^{(1)}),$$

$$\xi_p\equiv z_p^{(1)}-\tilde{\xi}_p^{(2)}=\xi_p^{(1)}+\xi_p^{(2)}-R_{\sqrt{2\pi}}(\xi_p^{(2)}).$$

Explicit expressions for the probability density functions of $\xi_q$ and $\xi_p$ are provided in Appendix B herein. In the case where a is much smaller than $\sqrt{2\pi}$, the reshaped ancilla quadrature noise $z_q^{(2)}=\xi_q^{(2)}-\xi_q^{(1)}$ and $z_p^{(2)}=\xi_p^{(2)}$ lie in the range $[-\sqrt{\pi/2}, \sqrt{\pi/2}]$ with a very high probability. Thus, $R_{\sqrt{2\pi}}(\xi_q^{(2)}-\xi_q^{(1)})=\xi_q^{(2)}-\xi_q^{(1)}$ and $R_{\sqrt{2\pi}}(\xi_p^{(2)})=\xi_p^{(2)}$, and the logical position and momentum quadrature noise may be given by:

$$\xi_q \xrightarrow{\sigma\ll\sqrt{2\pi}} \frac{\xi_q^{(1)}+\xi_q^{(2)}}{2} \sim \mathcal{N}\left(0, \sigma_q^2 = \frac{\sigma^2}{2}\right),$$

$$\xi_p \xrightarrow{\sigma\ll\sqrt{2\pi}} \xi_p^{(1)} \sim \mathcal{N}(0, \sigma_p^2 = \sigma^2).$$

That is, the variance of the logical position quadrature noise may be reduced by a factor of 2 by performing QEC using the two-mode GKP-repetition codes. This is due to the syndrome measurement of the reshaped ancilla position quadrature noise $z_q^{(2)}=\xi_q^{(2)}-\xi_q^{(1)}$ modulo $\sqrt{2\pi}$ which may be used to reduce the uncertainty of the data position quadrature noise $\xi_q^{(1)}$. Moreover, the variance of the logical momentum quadrature noise may remain unchanged despite the temporary increase ($\xi_p^{(1)}\rightarrow z_p^{(1)}=\xi_p^{(1)}+\xi_p^{(2)}$) during the decoding procedure. Again, this may be due to the syndrome measurement of the reshaped ancilla momentum quadrature noise $z_p^{(2)}=\xi_p^{(2)}$ modulo $\sqrt{2\pi}$ which may fully capture the transferred ancilla momentum quadrature noise $\xi_p^{(2)}$ if $\sigma<<\sqrt{2\pi}$.

Figure 6:
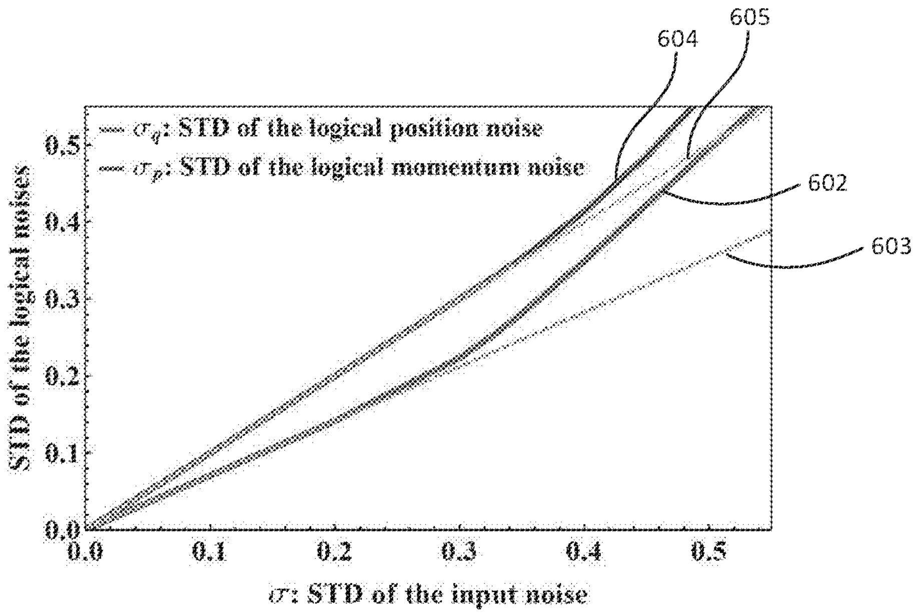
FIG. 6 illustrates standard deviations of the logical quadrature noise $\sigma_q$ and $\sigma_p$ as a function of the input standard deviation for the two-mode GKP-repetition code error correction of FIGS. 5A and 5B.

FIG. 6 is a plot of the standard deviations of the output logical quadrature noise, $\sigma_q$ 602 and $\sigma_p$ 604, for the two-mode GKP-repetition code as a function of the input standard deviation, $\sigma$, in accordance with some embodiments. The dashed line 603 represents $\sigma_q=\sigma/\sqrt{2}$ and the dashed line 605 represents $\gamma_p=\sigma$, respectively. The standard deviation of the output logical position quadrature noise 602 is reduced by a factor of $\sqrt{2}$ (e.g., $\sigma_q=\sigma/\sqrt{2}$), while the standard deviation of the output logical momentum quadrature noise 604 remains unchanged (e.g., $\sigma_p=\sigma$) for $\sigma\leq 0.3$. Note that the condition $\sigma\geq 0.3$ is translated to $\gamma=\sigma^2\leq 0.1$ in the case of pure excitation losses, where $\gamma$ is the pure-loss probability. Thus, if the standard deviation of an additive Gaussian noise error is sufficiently small, the two-mode GKP-repetition coding scheme can reduce the noise of the position quadrature, while keeping the momentum quadrature noise unchanged. That is, the non-Gaussian GKP-repetition codes can correct additive Gaussian noise errors.

In an analogous two-mode Gaussian-repetition coding scheme, as described in Appendix A herein, the variance of the position quadrature noise is reduced by a factor of 2 (e.g., $\sigma_q^2=\sigma^2/2$) similarly as for the two-mode GKP-repetition coding scheme. However, the variance of the momentum quadrature noise is increased by the same factor (i.e., $\sigma_p^2=2\sigma^2$). This demonstrates that, in the case of Gaussian-repetition codes, the position and momentum quadrature noises are only squeezed ($\sigma_q\sigma_p=\sigma^2$) instead of being corrected ($\sigma_q\sigma_p<\sigma^2$), reaffirming the previous no-go results for Gaussian QEC schemes.

An important difference between the two-mode GKP-repetition code and previous Gaussian repetition codes is that in the latter case the ancilla momentum quadrature noise that is transferred to the data mode (see $+\xi_p^{(2)}$ in $z_p^{(1)}$) is left completely undetected, whereas in the two-mode GKP-repetition code schema, the ancilla momentum quadrature noise is captured by measuring the ancilla momentum quadrature operator modulo $\sqrt{2\pi}$. Such a limitation of the Gaussian-repetition code is a general feature of any Gaussian QEC scheme which relies on homodyne measurements of ancilla quadrature operators. With homodyne measurements, one can only monitor the noise in one quadrature of a bosonic mode, while the noise in the other conjugate quadrature is left completely undetected.

The canonical GKP state presents a work-around for this barrier as a non-Gaussian resource which allows simultaneous measurements of both the position and momentum quadrature operators modulo $\sqrt{2\pi}$. Such non-Gaussian modular simultaneous measurements of both position and momentum quadrature operators performed by using canonical GKP states are accordingly fundamentally different from Gaussian heterodyne measurements where both quadrature operators are measured simultaneously but in a noisy manner.

The two-mode GKP-repetition code may further be compared to the conventional three-bit repetition code (e.g., $|0_L\rangle=|0\rangle^{\otimes 3}$ and $|1_L=|1\rangle^{\otimes 3}$) which can correct single bit-flip errors. First, in the GKP-repetition code, it is possible to use only two bosonic modes to reduce the variance of the position quadrature noise, whereas at least three qubits are needed to suppress qubit bit-flip errors in the case of multi-qubit repetition code. However, while the GKP-repetition code can be implemented in a more hardware-efficient way, it does not reduce the variance of the position quadrature noise quadratically but instead only reduce the variance by a constant factor (e.g., $\sigma 2\rightarrow\sigma_q^2=\sigma^2/2$ if $\sigma<<\sqrt{2\pi}$). On the other hand, the three-qubit repetition code can reduce the bit-flip error probability quadratically from p to $p_L\approx 3p^2$ if $p<<1$.

Such a quadratic (or even higher order) suppression of Pauli errors is a significant step towards qubit-based, fault-tolerant universal quantum computation. Thus, it is desirable in oscillator encoding schema to have such a quadratic suppression of additive Gaussian noise errors in order to go beyond the reduction by a constant factor described above.

Below, a two-mode GKP-squeezing code is introduced and shown to suppress both the position and momentum quadrature noise quadratically up to a small logarithmic correction. In particular, the proposed scheme can achieve such a quadratic noise suppression by using only two bosonic modes, including one data mode and one ancilla mode, and therefore is hardware-efficient. For example, as compared to qubit-based QEC, at least five qubits and high-weight multi-qubit gate operations are used to suppress both bit-flip and phase-flip errors quadratically.

Figure 7A:
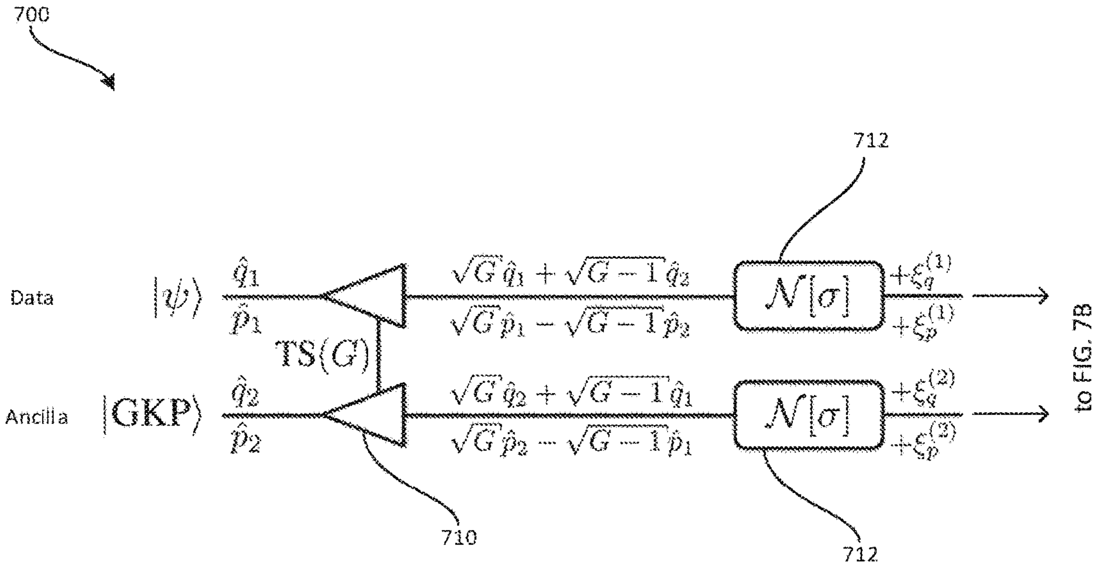
FIG. 7A illustrates an example of a two-mode bosonic system 700 performing entangling using a two-mode GKP-squeezing code and subject to Gaussian noise errors after entangling of the two modes, in accordance with some embodiments described herein.

FIG. 7A illustrates an example of a two-mode bosonic system 700 performing entangling using a two-mode GKP-squeezing code and subject to Gaussian noise errors after entangling of the two modes, in accordance with some embodiments described herein. The two-mode GKP-squeezing code may be defined as:

$$|\psi_L\rangle = TS_{1,2}(G)|\psi\rangle\otimes|GKP\rangle$$

where $|\psi\rangle=\int dq\psi(q)|q_1=q\rangle$ is an arbitrary bosonic state of the first data mode, and $|GKP\rangle$ is the canonical GKP state of the second, ancilla mode. Further, $TS_{1,2}(G)$ is the two-mode squeezing operation 710 acting on the data and ancilla states with a gain of $G\geq 1$. In the Heisenberg regime, the two-mode squeezing operation $TS_{1,2}(G)$ transforms the quadrature operators $x=(\hat{q}'_1, \hat{p}'_1, \hat{q}'_2, \hat{p}'_2)^T$ into $x'=(\hat{q}'_1, \hat{p}'_1, \hat{q}'_2, \hat{p}'_2)^T=S_{TS}(G)x$, where the 4×4 symplectic matrix $S_{TS}(G)$ associated with $TS_{1,2}(G)$ is given by:

$$S_{TS}(G) = \begin{bmatrix} \sqrt{G}\,I & \sqrt{G-1}\,Z \\ \sqrt{G-1}\,Z & \sqrt{G}\,I \end{bmatrix}$$

Here, I=diag(1,1) is the 2×2 identity matrix and Z=diag(1,−1) is the Pauli Z matrix.

In some embodiments, the two-mode squeezing operation $TS_{1,2}(G)$ 710 can be decomposed into a sequence of 50:50 beam splitter operations and single-mode squeezing operations, such as:

$$Tr_{1,2}(G) = BS_{1,2}\left(\frac{1}{2}\right)Sq_1\left(\frac{1}{\lambda}\right)Sq_2(\lambda)\left[BS_{1,2}\left(\frac{1}{2}\right)\right]^{\dagger}$$

where $\lambda=\sqrt{G}+\sqrt{G-1}$. Here, $Sq_k(\lambda)$ is the single-mode squeezing operation that transforms $\hat{q}_k$ and $\hat{p}_k$ into $\lambda\hat{q}_k$ and $\hat{p}_k/\lambda$, respectively. Also, $BS_{1,2}(\theta)$ is the beam splitter interaction between the modes 1 and 2 with a transmissivity $\eta\in[0,1]$ and is associated with a 4×4 symplectic matrix represented as:

$$S_{BS}(\eta) = \begin{bmatrix} \sqrt{\eta}\, I & \sqrt{1-\eta}\, I \\ \sqrt{1-\eta}\, I & \sqrt{\eta}\, I \end{bmatrix}$$

Note that the squeezing parameter $\lambda$ (or the gain G) may be chosen at will to optimize the performance of the error correction scheme.

Upon the addition of independent and identically distributed Gaussian noise errors 712, the quadrature operator $\hat{x}'$ may be further transformed into $\hat{x}'=\hat{x}'+\xi$, where $\xi=(\xi_q^{(1)}, \xi_p^{(1)}, \xi_q^{(2)}, \xi_p^{(2)})^T$ the quadrature noise vector obeying $(\xi_q^{(1)}, \xi_p^{(1)}, \xi_q^{(2)}, \xi_p^{(2)})\sim_{iid}\mathcal{N}(0, \sigma^2)$.

Figure 7B:
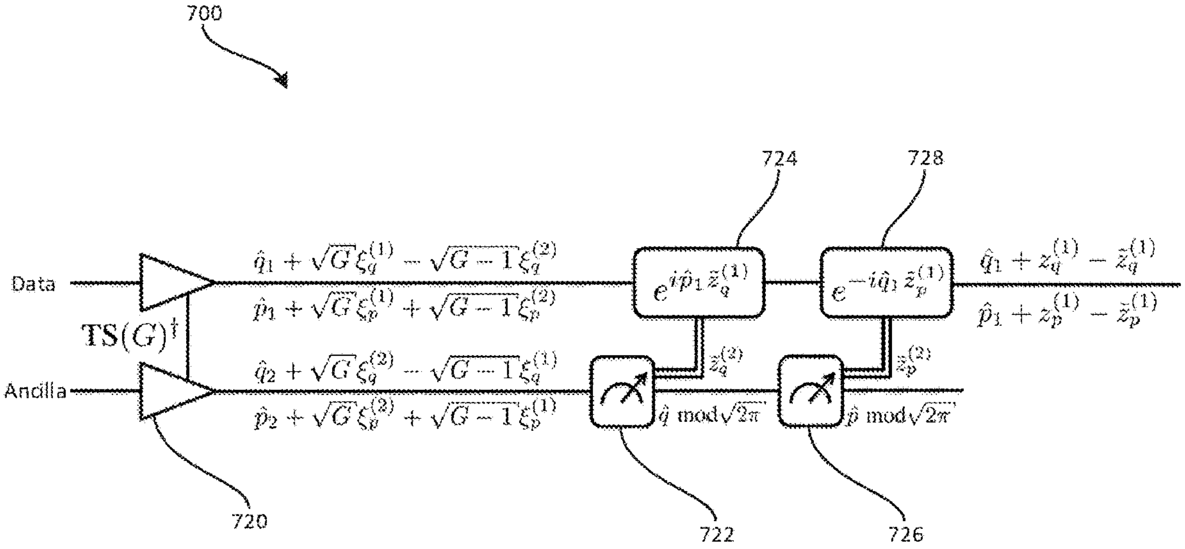
FIG. 7B illustrates an example of a two-mode bosonic system 700 performing disentangling using a two-mode GKP-squeezing code and error correction, in accordance with some embodiments described herein.

FIG. 7B illustrates an example of the two-mode bosonic system 700 performing a decoding operation and error correction using a two-mode GKP-squeezing code, in accordance with some embodiments described herein. The inverse squeezing operation 720 $(TS_{1,2}(G))^{\dagger}$ may transform the quadrature operator into $\hat{x}'''=(S_{TS}(G))^{-1}\hat{x}''=\hat{x}+z$, where $z\equiv(z_q^{(1)}, z_p^{(1)}, z_q^{(2)}, z_p^{(2)})^T$ is the reshaped quadrature noise vector which is given by:

$$z = (S_{TS}(G))^{-1}\xi = \begin{bmatrix} \sqrt{G}\,\xi_q^{(1)} - \sqrt{G-1}\,\xi_q^{(2)} \\ \sqrt{G}\,\xi_p^{(1)} - \sqrt{G-1}\,\xi_p^{(2)} \\ \sqrt{G}\,\xi_q^{(2)} - \sqrt{G-1}\,\xi_q^{(1)} \\ \sqrt{G}\,\xi_p^{(2)} - \sqrt{G-1}\,\xi_p^{(1)} \end{bmatrix} \equiv \begin{bmatrix} z_q^{(1)} \\ z_p^{(1)} \\ z_q^{(2)} \\ z_p^{(2)} \end{bmatrix}.$$

As in the case of the GKP-repetition code, information about the reshaped ancilla quadrature noise $z_q^{(2)}$ and $z_p^{(2)}$ may be extracted by simultaneously measuring the position and momentum quadrature operators of the ancilla mode modulo $\sqrt{2\pi}$ at points 722 and 726 of FIG. 7B. These modular measurement outcomes may then be used to estimate the reshaped data quadrature noise $z_q^{(1)}$ and $z_p^{(1)}$.

The bare quadrature noise $\xi=(\xi_q^{(1)}, \xi_p^{(1)}, \xi_q^{(2)}, \xi_p^{(2)})^T$ is uncorrelated and thus its covariance matriz is proportional to the 4×4 identity matrix: $V_\xi=\sigma^2\mathrm{diag}(1,1,1,1)$. Additionally, the covariance matrix of the reshaped quadrature noise, $z=(S_{TS}(G))^{-1}\xi$, may be given by:

$$V_z = (S_{TS}(G))^{-1}V_\xi((S_{TS}(G))^{-1})^T = \sigma^2\begin{bmatrix} (2G-1)I & -2\sqrt{G(G-1)}\,Z \\ -2\sqrt{G(G-1)}\,Z & (2G-1)I \end{bmatrix}.$$

Accordingly, the reshaped data and ancilla quadrature noise are correlated whenever G>1. That is, the inverse of the encoding circuit $(TS(G))^{554}$ may convert the uncorrelated quadrature noise into a correlated noise z. In particular, in the limit of G>>1, the covariance $V_z$ may be asymptotically given by:

$$V_z = \xrightarrow{G>>1} 2G\sigma^2\begin{bmatrix} I & -Z \\ -Z & 1 \end{bmatrix},$$

and therefore the data and ancilla position quadrature noise are anti-correlated (i.e., $z_q^{(1)}=-z_q^{(2)}$), and the data and ancilla momentum quadrature noise are correlated (i.e., $z_p^{(1)}=z_p^{(2)}$). These correlations in the G>>1 limit allow us to reliably estimate the data quadrature noise $z_q^{(1)}$ and $z_p^{(1)}$ based solely on the knowledge of the ancilla quadrature noise $z_q^{(2)}$ and $z_p^{(2)}$.

However, though a large gain G may be desirable to achieve such noise correlations, the gain G may not be increased indefinitely because then the reshaped ancilla quadrature noise $z_q^{(2)}$ and $z_p^{(2)}$ (whose variances are given by $(2G-1)\sigma^2$) may not be contained within the distinguishable range, $[-\sqrt{\pi}/2, \sqrt{\pi}/2]$. Therefore, the gain G may be chosen such that the reshaped ancilla quadrature noise lies mostly in this distinguishable range.

Based on the outcomes of the measurements 722, 726 of the ancilla quadrature operators modulo $\sqrt{2\pi}$, the reshaped ancilla noise $z_q^{(2)}$ and $z_p^{(2)}$ can be estimated to be the smallest noise values that are compatible with the modular measurement outcomes such that $$\bar{z}_q^{(2)}=R_{\sqrt{2\pi}}(z_q^{(2)}) \text{ and } \bar{z}_p^{(2)}=R_{\sqrt{2\pi}}(z_p^{(2)}).$$

Then, the reshaped data position and momentum quadrature noise $z_q^{(1)}$ and $z_p^{(1)}$ may be further estimated to be $$\tilde{z}_q^{(1)} = -\frac{2\sqrt{G(G-1)}}{2G-1}\bar{z}_q^{(2)},$$

$$\tilde{z}_p^{(1)} = -\frac{2\sqrt{G(G-1)}}{2G-1}\bar{z}_p^{(2)}.$$

The choice of these estimates is described in further detail in Appendix C herein. In the G>>1 limit, the above estimates $\tilde{z}_q^{(1)}$ and $\tilde{z}_p^{(1)}$ may be respectively reduced to $-\bar{z}_q^{(2)}$ and $\bar{z}_p^{(2)}$, which are reasonable because then the data and ancilla position quadrature noise may be anticorrelated whereas the data and ancilla momentum quadrature noise may be correlated.

Finally, the noise error in the data mode may be corrected by applying the counter displacement operations $\exp[i\hat{p}_1\tilde{z}_p^{(1)}]$ and $\exp[-i\hat{q}_1\tilde{z}_p^{(1)}]$, shown as elements 724 and 728 in FIG. 7B, respectively. The output logical quadrature noise may then be given by:

$$\xi_q \equiv z_q^{(1)} - \tilde{z}_q^{(1)} = z_q^{(1)} + \frac{2\sqrt{G(G-1)}}{2G-1}R_{\sqrt{2\pi}}(z_q^{(2)}),$$

-continued $$\xi_p \equiv z_p^{(1)} - \tilde{z}_p^{(1)} = z_p^{(1)} + \frac{2\sqrt{G(G-1)}}{2G-1} R_{\sqrt{2\pi}}(z_p^{(2)}).$$

As described in Appendix C herein, the probability density functions of the output logical quadrature noise $\xi_q$ and $\xi_p$ are identical to each other and are given by a mixture of Gaussian distributions:

$$Q(\xi) = \sum_{n \in \mathbb{Z}} q_n \cdot p\left[\frac{\sigma}{\sqrt{2G-1}}\right](\xi - \mu_n)$$

Here, $$p[\sigma](z) \equiv \frac{1}{\sqrt{2\pi\sigma^2}} \exp[-z^2/2\sigma^2]$$

is the probability density function of the Gaussian distribution $\mathcal{N}(0, \sigma^2)$ and $q_n$ and $\mu_n$ are given by $$q_n = \int_{\left(n-\frac{1}{2}\right)\sqrt{2\pi}}^{\left(n+\frac{1}{2}\right)\sqrt{2\pi}} dz p\left[\sqrt{2G-1}\,\sigma\right](z),$$

$$\mu_n = \frac{2\sqrt{G(G-1)}}{2G-1}\sqrt{2\pi}\, n.$$

Thus, the mixture probabilities, $q_n$, sum up to unity, i.e., $\sum_{n \in \mathbb{Z}} q_n = 1$, and $q_n$ represents the probability that the ancilla position quadrature noise $z_q^{(2)}$, whose standard deviation is given by $\sqrt{2G-1}\sigma$, lies in the range $[(n-1/2)\sqrt{2\pi}, (n+1/2)\sqrt{2\pi}]$. In this case, $R_{\sqrt{2\pi}}(z_q^{(2)}) = z_q^{(2)} - \sqrt{2\pi}n$, causing a misidentification of $z_q^{(2)}$ by a finite shift $\sqrt{2\pi}n$. Such a misidentification may result in an undesired shift, $\mu_n$, to the data mode through a miscalibrated counter displacement.

The variance $(\sigma_L)^2$ of the output logical quadrature noise may now be considered. By using the probability density function, $Q(\xi)$, the variance $(\sigma_L)^2$ may be described by:

$$(\sigma_L)^2 = \frac{\sigma^2}{2G-1} + \sum_{n \in \mathbb{Z}} q_n (\mu_n)^2$$

The gain G may be chosen to optimize the performance of the two-mode GKP-squeezing code. Here, G may be chosen such that the standard deviation of the output logical quadrature noise $\sigma_L$ is reduced.

Figure 8A:
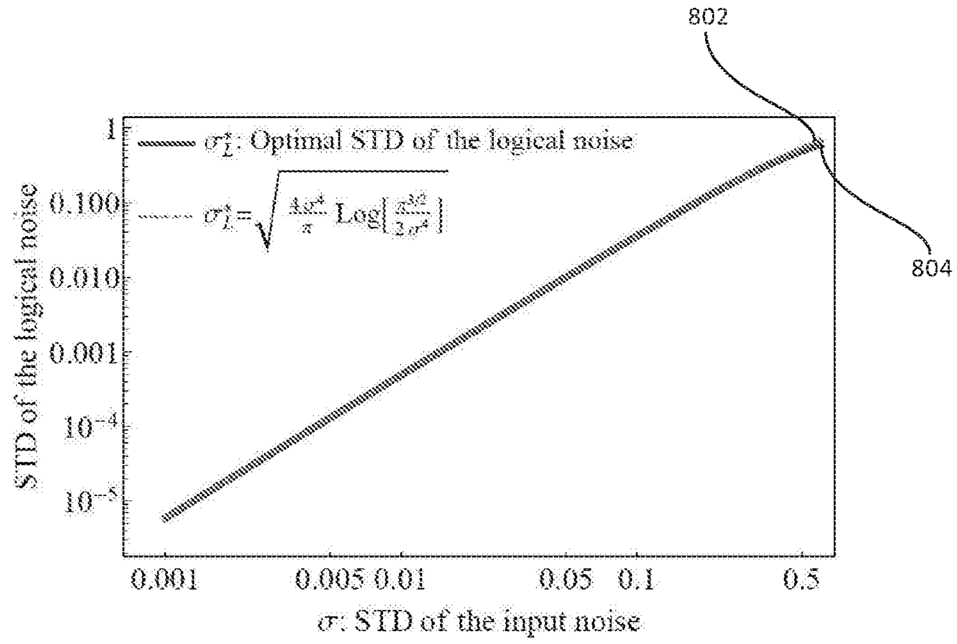
FIG. 8A illustrates standard deviations of the output logical quadrature noise $\sigma_q=\sigma_p=\sigma_L{}^*$ as a function of the input standard deviation for the two-mode GKP-squeezing code, in accordance with some embodiments described herein.

FIG. 8A illustrates the standard deviations of the output logical quadrature noise, $\sigma_q = \sigma_p = \sigma^*_L$, as a function of the input standard deviation a for the two-mode GKP-squeezing code in curve 804, in accordance with some embodiments described herein. The dashed curve 802 represents $$\sigma_L^* = \frac{2\sigma^2}{\sqrt{\pi}}\sqrt{\log_e\left[\frac{\pi^{3/2}}{2\sigma^4}\right]}.$$

Figure 8B:
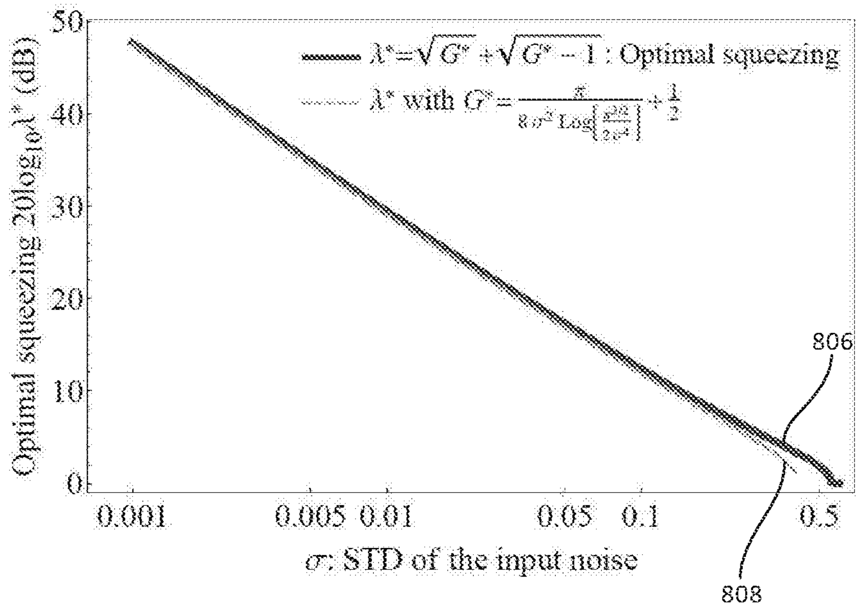
FIG. 8B illustrates two-mode squeezing gain as a function of the input standard deviation for the two-mode GKP-squeezing code, in accordance with some embodiments described herein.

Relatedly, FIG. 8B illustrates two-mode squeezing gain G* in curve 806 configured to achieve $\sigma^*_l$ as a function of the input standard deviation for the two-mode GKP-squeezing code, in accordance with some embodiments described herein. The curve 806 has been translated to single-mode squeezing in the units of decibel 20 $\log_{10} \lambda^*$ where $\lambda^* \equiv \sqrt{G^*} + \sqrt{G^*-1}$. The dashed curve 808 represents $$G^* = \frac{\pi}{8\sigma^2}\left(\log_e\left[\frac{\pi^{3/2}}{2\sigma^4}\right]\right)^{-1} + \frac{1}{2}.$$

For $\sigma \geq 0.558$, the gain G* is given by G*=1 and accordingly the two-mode GKP-squeezing code may not reduce the noise in the data state: $\sigma^*_L = \sigma$. However, if the standard deviation of the input noise is small enough, e.g., $\sigma < 0.558$, the gain G* may be strictly larger than 1 and the standard deviation of the output logical quadrature noise $\sigma_L$ may be made smaller than the standard deviation of the input quadrature noise $\sigma$: $\sigma^*_L < \sigma$. Note that the condition $\sigma < 0.558$ corresponds to $\gamma = \sigma^2 < 0.311$ for the pure excitation loss error where $\gamma$ is the loss probability. Below, asymptotic expressions for G* and $\sigma^*_L$ in the $\sigma \ll 1$ limit are provided and the two-mode GKP-squeezing code is shown to quadratically suppress additive Gaussian noise errors up to a small logarithmic correction.

Useful solutions may be found in the regime where $\sqrt{2G-1}\sigma \ll \sqrt{2\pi}$ holds and thus the ancilla quadrature noises $z_q^{(2)}$ and $z_p^{(2)}$ fall within the range $[-\sqrt{\pi/2}, \sqrt{\pi/2}]$ with a very high probability. In this regime, the variance, $(\sigma_L)^2$, is approximately given by:

$$(\sigma_L)^2 \simeq \frac{\sigma^2}{2G-1} + \frac{8\pi G(G-1)}{(2G-1)^2}\operatorname{erfc}\left(\frac{\sqrt{\pi}}{2\sqrt{2G-1}\,\sigma}\right), \text{ where}$$

$$\operatorname{erfc}(x) \equiv \frac{2}{\sqrt{\pi}}\int_x^\infty dz e^{-z^2}$$

is the complementary error function. Further assuming $\sigma \ll 1$, the variance $(\sigma_L)^2$ may be minimized when the gain G is given by:

$$G^* \xrightarrow{\sigma \ll 1} \frac{\pi}{8\sigma^2}\left(\log_e\left[\frac{\pi^{\frac{3}{2}}}{2\sigma^4}\right]\right)^{-1} + \frac{1}{2}$$

which is derived in Appendix C. Then, the standard deviation of the output logical quadrature noise $\sigma^*_L$ may be given by:

$$\sigma_L^* \xrightarrow{\sigma \ll 1} \frac{2\sigma^2}{\sqrt{\pi}}\sqrt{\log_e\left[\frac{\pi^{3/2}}{2\sigma^4}\right]}.$$

As can be seen from FIGS. 8A and 8B, these asymptotic expressions agree with the numerical results. In particular, the standard deviation of the logical quadrature noise $\sigma^*_L$ decreases quadratically as $\sigma$ decreases (i.e., $\sigma^*_L \propto \sigma^2$) up to a small logarithmic correction. For example, when $\sigma = 0.1$ (which corresponds to $\gamma = \sigma^2 = 0.01$ for the pure excitation loss error), the gain may be given by G*=4.806, which may need 20 $\log_{10} \lambda^* = 12.35$ dB single-mode squeezing operations. In this case, the resulting standard deviation of the output noise may be given by $\sigma^*_L = 0.036$ which corresponds to the loss probability 0.13%. This corresponds to a QEC "gain" for the protocol of 1/0.13≈7.7 in terms of the loss probability and 0.1/0.036≈2.8 in terms of displacement errors.

The two-mode bosonic system 700, using a two-mode GKP-squeezing code, is hardware-efficient because only two bosonic mode—one data mode and one ancilla mode—may be used to achieve the quadratic suppression of both momentum and position quadrature noise up to a small logarithmic correction. In contrast, in the case of multi-qubit QEC, at least five qubits and high-weight multi-qubit operations are needed to suppress both the bit-flip and phase-flip errors quadratically. While the two-mode GKP-squeezing code is relatively simple and achieves a quadratic noise suppression, it may be desirable to achieve higher order noise suppression. Below, having this in mind, the non-Gaussian quantum error correction codes are generalized to an even broader class of non-Gaussian quantum error-correcting codes.

The two-mode GKP-repetition code and the two-mode GKP-squeezing code may be generalized to an even broader class of non-Gaussian oscillator codes, or, GKP-stabilizer codes. Such GKP-stabilizer codes may be defined generally such that M oscillator modes are encoded into N oscillator modes as:

$$|\Psi_L\rangle = \hat{U}_G^{Enc}|\rangle\rangle \otimes |GKP\rangle^{\otimes N-M}$$

where $|\Psi\rangle$ is an arbitrary M-mode bosonic state in the first M modes (data modes) and $|GKP\rangle^{\otimes N-M}$ is the N−M copies of the canonical GKP states in the last N−M modes (ancilla modes) and $\hat{U}_G^{Enc}$ is an encoding Gaussian unitary operation. For example, the two-mode GKP-repetition code may be expressed generally as M=1, N=2, and $\hat{U}_G^{Enc}=SUM_{1\rightarrow 2}$. Similarly, the two-mode GKP-squeezing code may be expressed generally as M=1, N=2, and $\hat{U}_G^{Enc}=TS_{1,2}(G)$.

Since one can choose any Gaussian operation as an encoding circuit up $\hat{U}_G^{Enc}$, this GKP-stabilizer formalism is at least as flexible as the stabilizer formalism for qubit-based QEC which encompasses almost all conventional multi-qubit QEC schemes. Therefore, this GKP-stabilizer formalism has a great deal of potential. As an illustration, in Appendix D, we introduce a family of GKP-stabilizer codes, GKP-squeezed-repetition codes, and show that the N-mode GKP-squeezed-repetition code can suppress additive Gaussian noise errors to the $N^{th}$ order, as opposed to the second order for the two-mode GKP-squeezing code. In addition to the GKP-squeezed-repetition codes, there may be many other useful families of GKP-stabilizer codes.

Figure 9:
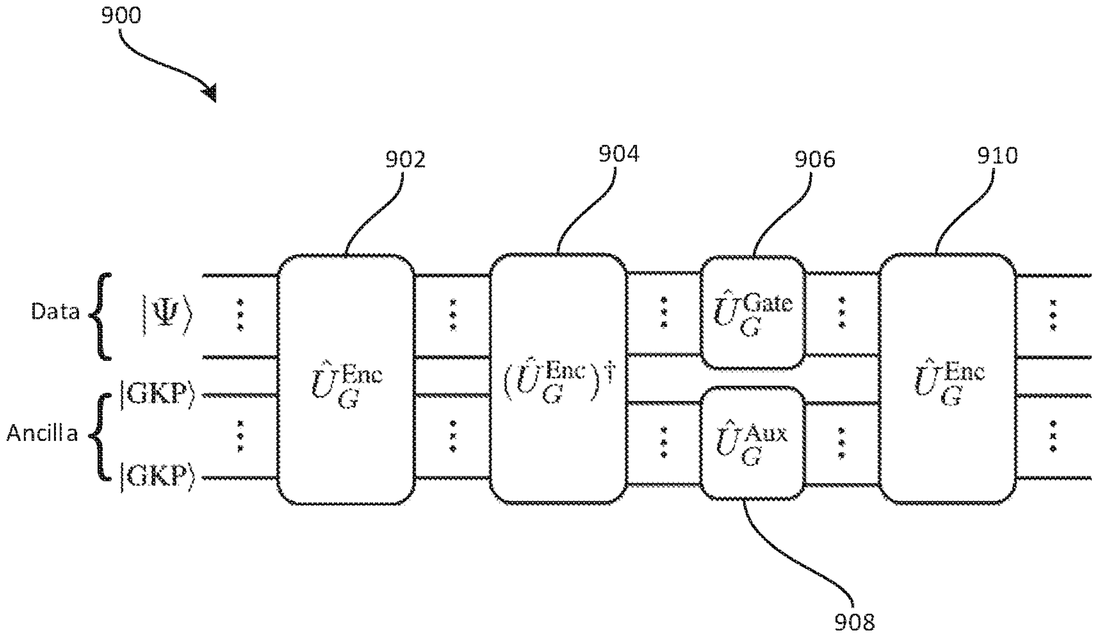
FIG. 9 illustrates an example of a generalized bosonic system 900 and an implementation of a general logical Gaussian operator, in accordance with some embodiments described herein.

FIG. 9 illustrates an example of a generalized encoding circuit 900 for use with a GKP-stabilizer stabilizer code and a general logic Gaussian operator $(\hat{U}_G^{Gate})_L$, in accordance with some embodiments described herein. The data states, $|\Psi\rangle$, and ancilla states, $|GKP\rangle$, may be encoded (e.g., may be entangled) using an encoding operation $\hat{U}_G^{Enc}$ in block 902. The states may then be disentangled in block 904 using an inverse encoding operation $(\hat{U}_G^{Enc})^\dagger$. A logical Gaussian operator $\hat{U}_G^{Gate}$ may be applied to one or more of the data states in block 906, and an auxiliary Gaussian operator $\hat{U}_G^{Aux}$ may be applied to one or more of the ancilla states in block 908. A final encoding operation $\hat{U}_G^{Enc}$ may be performed on the data and ancilla states in block 910 to correlate the results of the logical Gaussian operator $\hat{U}_G^{Gate}$ with the information stored in the ancilla states.

In general, for any GKP-stabilizer code with a Gaussian encoding circuit $\hat{U}_G^{Enc}$, a logical Gaussian operation $(\hat{U}_G^{Gate})_L$ may be implemented by using physical Gaussian operations, such as: $\hat{U}_G^{Enc}(\hat{U}_G^{Gate}\otimes\hat{U}_G^{Aux})(\hat{U}_G^{Enc})^\dagger$, where gate $\hat{U}_G^{Gate}$is the Gaussian operation to be applied to the data modes and $\hat{U}_G^{Aux}$ is an auxiliary Gaussian operation to the ancilla modes (see e.g., FIG. 9). Physical Gaussian operations may be sufficient for the implementation of logical Gaussian operations because the input ancilla GKP state $|GKP\rangle^{\otimes N-M}$ is the only non-Gaussian resource in the encoding scheme and the remaining circuit $\hat{U}_G^{Enc}$ is also Gaussian. Auxiliary Gaussian operations may be used to simplify the form of the physical Gaussian operation $\hat{U}_G^{Enc}(\hat{U}_G^{Gate}\otimes\hat{U}_G^{Aux})(\hat{U}_G^{Enc})^\dagger$.

Many interesting continuous variable quantum information processing tasks such as the KLM protocol, boson sampling, and simulation of vibrational quantum dynamics of molecules use Gaussian operations and, as non-Gaussian resources, input single- or multi-photon Fock states and photon number measurements of the output modes. Since the non-Gaussian resources are consumed locally only in the beginning and the end of the computation, any imperfections in these non-Gaussian resources may be addressed independently from the imperfections in the Gaussian operations. Below, improving the quality of Gaussian operations such as beam splitter interactions is described.

Returning to the two-mode GKP-squeezing code introduced previously herein. For simplicity, consider two logical oscillator modes encoded in four physical oscillator modes via the encoding Gaussian circuit $\hat{U}_G^{Enc}=TS_{1,3}(G)TS_{12,4}(G)$. Here, the modes 1, 2 are the data modes and the modes 3, 4 are the ancilla modes which are used for syndrome error detection. Note that the encoding Gaussian circuit of the GKP-two-mode-squeezing code has the following property:

$$BS_{1,2}(\eta)BS_{3,4}(\eta)=\hat{U}_G^{Enc}BS_{1,2}(\eta)(\hat{U}_G^{Enc})^\dagger,$$

where $\hat{U}_G^{Enc}=TS_{1,3}(G)TS_{2,4}(G)$. That is, by choosing $\hat{U}_G^{Aux}=BS_{3,4}(\eta)$, the logical beam splitter interaction can be implemented transversally by applying a pair of beam splitter interactions $BS_{1,2}(\eta)$ and $BS_{3,4}(\eta)$ to the data modes and the ancilla mode, as shown in FIG. 10A.

Figure 10A:
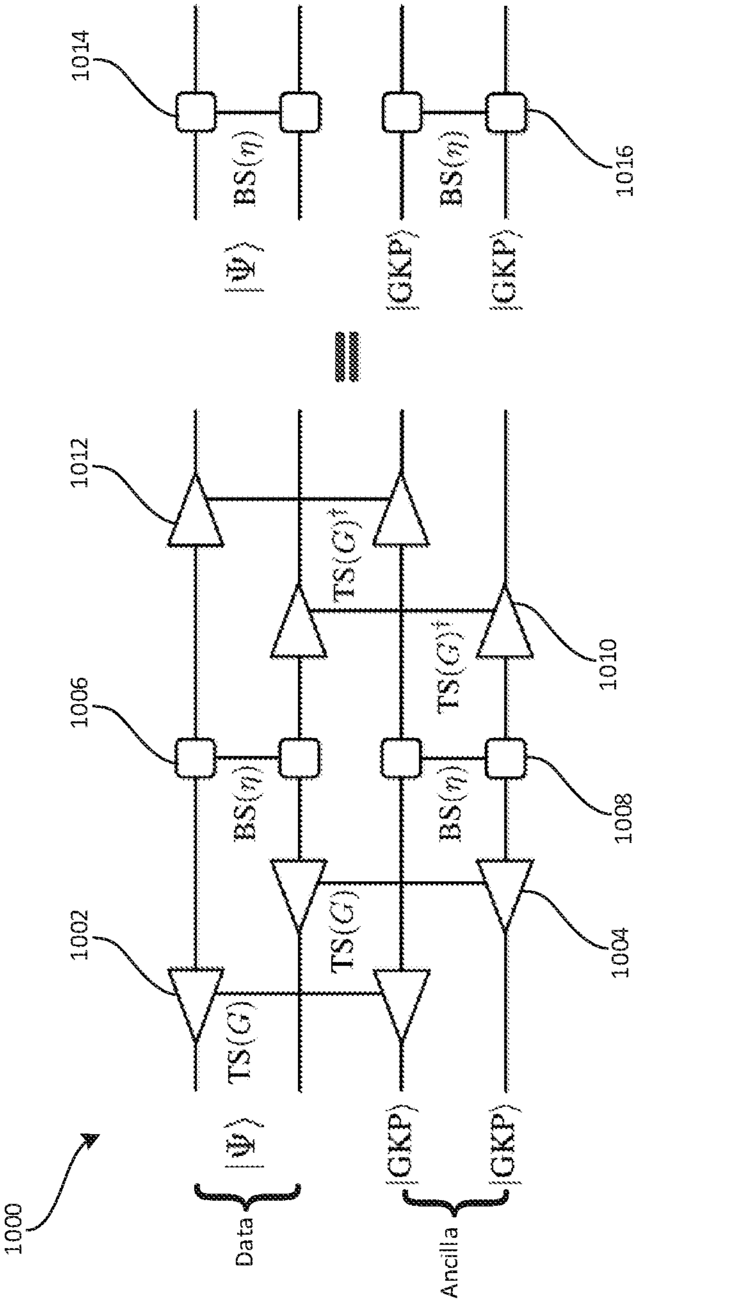
FIG. 10A illustrates an example of a multi-mode bosonic system 1000 performing a logical beam splitter operation in the absence of Gaussian noise error during the beam splitter interaction, in accordance with some embodiments described herein.

FIG. 10A illustrates an example of a multi-mode bosonic system 1000 performing a logical beam splitter operation in the absence of Gaussian noise error during the beam splitter interaction, in accordance with some embodiments described herein. Data states and ancilla states, initialized in GKP states, may be entangled by squeezing operations 1002 and 1004 prior to the logical beam splitter operations 1006 and 1008. Thereafter, the data and ancilla states may be disentangled by inverse squeezing operations 1010 and 1012.

The transversality in the equation describing $BS_{1,2}(\eta)BS_{3,4}(\eta)$ above may be used to correct additive Gaussian noise errors that occur during the implementation of a beam splitter interaction. Note that any passive beam splitter interactions commute with iid additive Gaussian noise errors (see Appendix E). Therefore, the beam splitter interaction $BS_{1,2}(\eta)BS_{3,4}(\eta)$ that are continuously corrupted by iid additive Gaussian noise errors can be understood as the ideal beam splitter interaction $BS_{1,2}(\eta)BS_{3,4}(\eta)$ followed by an iid additive Gaussian noise channel $\otimes_{k=1}^{4}\mathcal{N}^{(k)}[\sigma]$ where the variance of the additive noise $\sigma^2$ is proportional to the time needed to complete the beam splitter interaction.

Figure 10B:
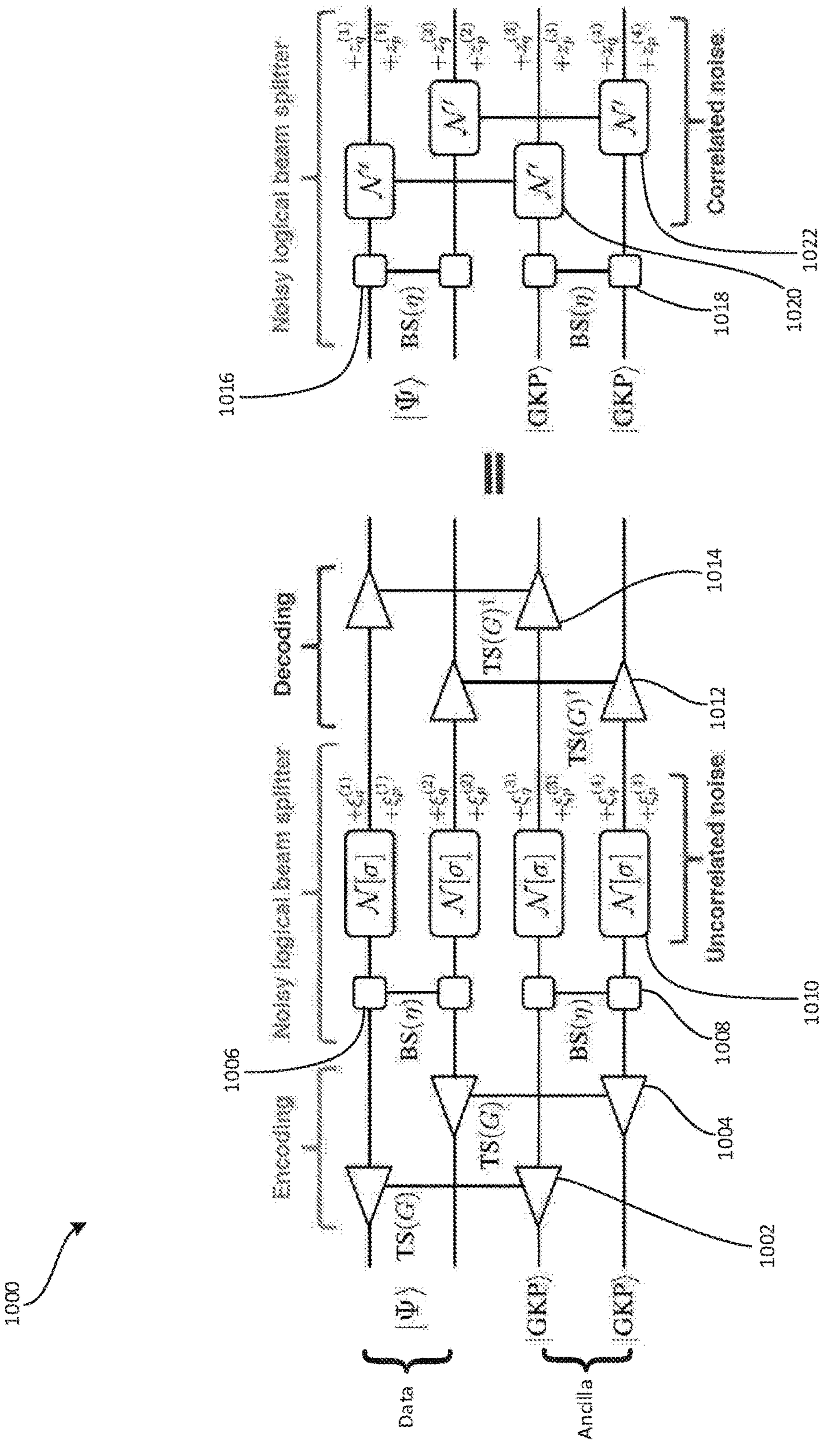
FIG. 10B illustrates an example of a multi-mode bosonic system 1000 performing a logical beam splitter operation in the presence of Gaussian noise error during the beam splitter interaction, in accordance with some embodiments described herein.

FIG. 10B illustrates an example of a multi-mode bosonic system 1000 performing a logical beam splitter operation in the presence of Gaussian noise error during the beam splitter interaction, in accordance with some embodiments described herein. In some embodiments, the data states and ancilla states, initialized in GKP states, may be entangled by squeezing operations 1002 and 1004 prior to the logical beam splitter interactions 1006 and 1008. The data and ancilla states may then be subject to uncorrelated Gaussian noise 1010. Thereafter, the data and ancilla states may be disentangled using inverse squeezing operations 1012 and 1014. Such a system may be more simply described by the system shown on the right, wherein data states and ancilla states, initialized as GKP states, may be subject to the logical beam splitter interactions 1016 and 1018 and then subject to correlated Gaussian noise 1020 and 1022.

As shown in FIG. 10B, the uncorrelated additive Gaussian noise error that has been accumulated during the logical beam splitter interaction may be converted into a correlated additive Gaussian noise error through the inverse of the encoding circuit $(\hat{U}_G^{Enc})^\dagger = TS_{1,3}(G)^\dagger TS_{2,4}(G)^\dagger$ in the decoding procedure. That is, after the noise reshaping, the quadrature noise in the data modes 1 and 2 are correlated with the ones in the ancilla modes 3 and 4, respectively. Because of the correlation between the data modes and the ancilla modes, information about the reshaped data quadrature noise $z_{q/p}^{(1)}$ and $z_{q/p}^{(2)}$ may be determined by extracting information about the reshaped ancilla quadrature noise $z_{q/p}^{(3)}$ and $z_{q/p}^{(4)}$. This information may then be used to suppress the additive Gaussian noise accumulated in the data mode quadratically up to a small logarithmic correction.

Note that so far ideal GKP states have been assumed to clearly demonstrate the error-correcting capability of GKP-stabilizer codes. In the following discussion, examples of experimental realization of GKP-stabilizer codes are described. Especially, issues related to the use of realistic noisy GKP states are discussed, as they may be an important factor in the design of practical GKP-stabilizer codes.

Experimental realization of GKP-stabilizer codes and the effects of realistic imperfections are discussed herein. Recall that the non-Gaussian resource used for implementing GKP-stabilizer codes is the preparation of a canonical GKP state. While Gaussian resources are readily available in many realistic bosonic systems, preparing a canonical GKP state is not strictly possible because it would require infinite squeezing of the state. Recently, however, finitely-squeezed approximate GKP states have been realized in a trapped ion system by using a preparation scheme with post-selection and in a circuit QED system by using a deterministic scheme. Thus, the two-mode GKP-squeezing code may, in principle, be implemented in the state-of-the-art quantum computing platforms using approximate GKP states.

Imperfections in realistic GKP states, such as finite squeezing, may add additional quadrature noise to the quantum information system. Therefore, the performance of the two-mode GKP-squeezing code will be mainly limited by the finite squeezing of the approximate GKP states. Indeed, a non-trivial QEC gain $\sigma^2/(\sigma^*_L)^2 > 1$, as shown below, may be achievable with the two-mode GKP-squeezing code when the supplied GKP states have a squeezing larger than 11.0 dB.

The squeezing achieved thus far in experimentally realized GKP states ranges from 5.5 dB to 9.5 dB. In this regard, the oscillator encoding schemes discussed herein are compatible with non-deterministic GKP state preparation schemes because the required GKP states can be prepared offline and then supplied to the error correction circuit in the middle of the decoding procedure. It may therefore be advantageous to sacrifice the probability of success of the GKP state preparation schemes to aim to prepare a GKP state of higher quality (e.g., with a squeezing value larger than 11.0 dB) by using post-selection.

In general, the imperfections in approximate GKP states may be especially detrimental to a GKP-stabilizer code involving a large squeezing parameter because noise and other imperfections may be significantly amplified by the large squeezing operations. With this concern in mind, turn back to the two-mode GKP-squeezing code and recall that the gain G* may be asymptotically given by $G^* \propto 1/\sigma^2$ in the $\sigma \ll 1$ limit. If the standard deviation of the input noise is very small, then a very large gain parameter $G^* \gg 1$ (or $\pi^* = \sqrt{G^*} + \sqrt{G^* - 1} \gg 1$). However, the two-mode GKP-squeezing code has been designed so that any imperfections in approximate GKP states may not be amplified by the large squeezing operations.

Recall that an approximate GKP state with a finite squeezing can be modeled by $|GKP_\Delta) \propto \exp[-\Delta\hat{n}]|GKP\rangle$. The finitely-squeezed GKP state $|GKP_\Delta\rangle$ may be converted via a noise twirling into $$\mathcal{N}[\sigma_{gkp}](|GKP\, \mathcal{N}\rangle\langle GKP|).$$

That is, for example, an ideal canonical GKP state may be corrupted by an incoherent random shift error, $\mathcal{N}[\sigma_{gkp}]$. Here, $\sigma_{gkp}^2 = (1-e^{-\Delta})/(1+e^{-\Delta})$ is the variance of the additive noise associated with the finite GKP squeezing. The noise standard deviation $\sigma_{gkp}^2$ characterizes the width of each peak in the Wigner function of an approximate GKP state. The GKP squeezing is then defined as $S_{gkp} \equiv -10 \log_{10}(2\sigma_{gkp}^2)$. The GKP squeezing $S_{gkp}$ quantifies how much an approximate GKP state is squeezed in both the position and the momentum quadrature in comparison to the vacuum noise variance 1/2.

Figure 11A:
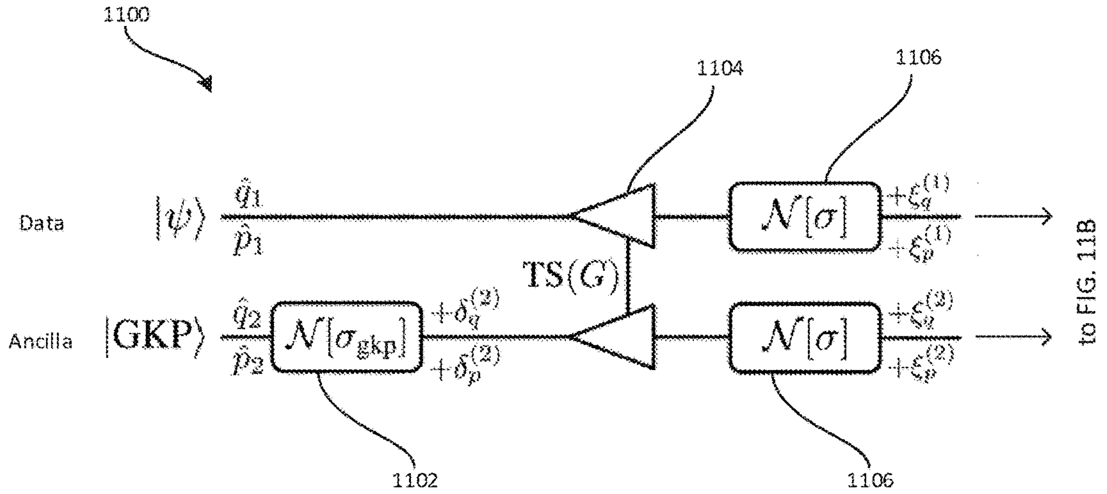
FIG. 11A illustrates an example of a multi-mode bosonic system 1100 performing entangling using a two-mode GKP-squeezing code and subject to Gaussian noise errors before and after entangling of the two modes, in accordance with some embodiments described herein.
Figure 11B:
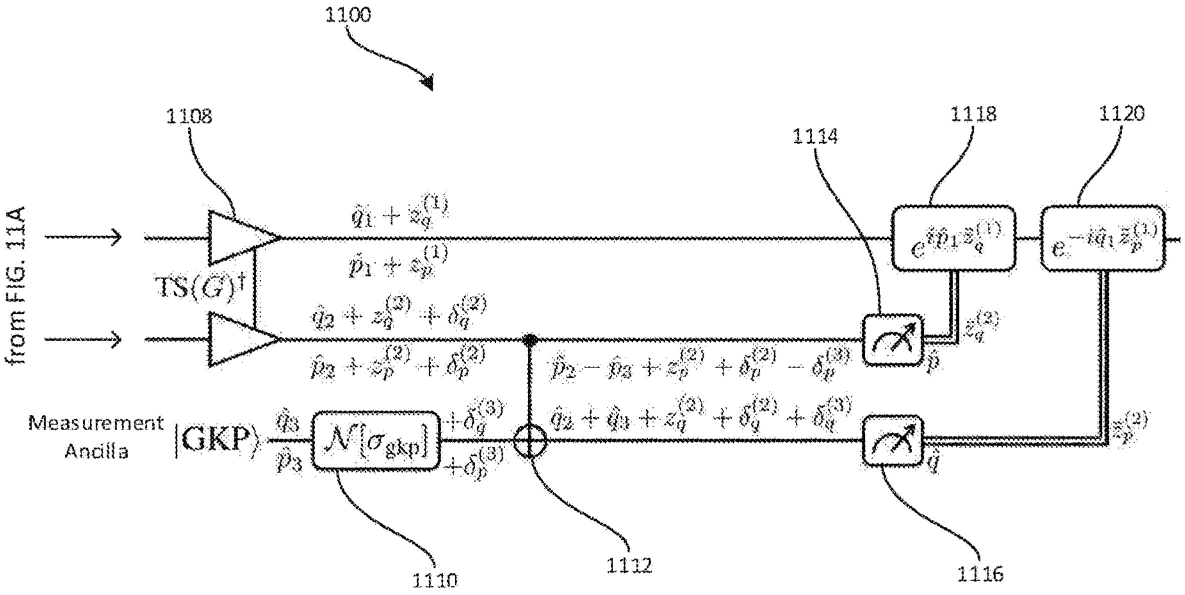
FIG. 11B illustrates an example of a multi-mode bosonic system 1100 performing disentangling using a two-mode GKP-squeezing code and performing error correction using an additional measurement ancilla mode, in accordance with some embodiments described herein.

FIGS. 11A and 11B present a multi-mode bosonic system 1100 for implementation of the two-mode GKP-squeezing code, in accordance with some embodiments described herein. FIG. 11A illustrates an example of a multi-mode bosonic system 1100 performing entangling using a two-mode GKP-squeezing code and subject to Gaussian noise errors before and after entangling of the two modes, in accordance with some embodiments described herein. The ancilla state may be subject to a Gaussian noise error 1102 before application of the squeezing operation 1104 to entangle the data and ancilla states. After the squeezing operation, the entangled states may be subject to a further Gaussian noise error 1106

FIG. 11B illustrates an example of a multi-mode bosonic system 1100 performing disentangling using a two-mode GKP-squeezing code and performing error correction using an additional measurement ancilla mode, in accordance with some embodiments described herein. In some embodiments, the data and ancilla states may be disentangled using an inverse squeezing operation 1108. An additional measurement ancilla state, initialized as a GKP state, may be introduced in the process of FIG. 11B to simultaneously measure the position and momentum operators of the ancilla mode modulo $\sqrt{2\pi}$. The measurement ancilla state may be subject to additional Gaussian errors 1110 and then may be entangled with the ancilla state through a SUM gate 1112. Thereafter, the position and momentum operators of the ancilla state may be measured by measurement 1114 of the ancilla state and measurement 1116 of the measurement ancilla state. The measured momentum and position operators may then be applied in the form of displacement operations 1118 and 1120 to correct the Gaussian errors in the data mode.

Note that, in the processes of FIGS. 11A and 11B, one GKP state may be consumed to perform the simultaneous and modular position and momentum measurements. In comparison, using the measurement circuits of FIGS. 4B and 4C may consume two GKP states for the simultaneous modular quadrature measurements because the measurement circuits of FIGS. 4B and 4C are configured for performing non-destructive measurements. While the first measurement of FIG. 11B (e.g., the modular position measurement) may be performed in a non-destructive manner, the following measurement (e.g., the modular momentum measurement) may be performed in a destructive manner since the quantum state in the ancilla mode is no longer needed. Rather, the classical measurement outcomes $\bar{z}_q^{(2)}$ and $\bar{z}_p^{(2)}$ desired. This is the reason why, in FIG. 11B, the momentum quadrature of the second mode (e.g., the ancilla mode) may be measured in a destructive way after the modular position measurement. Saving such non-Gaussian resources in this manner is particularly useful in the regime where the finite squeezing of an approximate GKP state is a limiting factor.

Because of such non-Gaussian resource saving described above, two GKP states may be supplied to implement the two-mode GKP-squeezing code, in some embodiments. One of the supplied GKP states may be used as the input of the ancilla mode and the other supplied GKP state may be for the simultaneous and modular ancilla quadrature measurements. Assuming that these two supplied GKP states are corrupted by an additive Gaussian noise channel $\mathcal{N}[\sigma_{gkp}]$, i.e. $(\delta_q^{(2)}, \delta_p^{(2)}, \delta_q^{(3)}, \delta_p^{(3)}) \sim_{iid} \mathcal{N}(0, \sigma_{gkp}^2)$, as shown in FIGS. 11A and 11B. Due to this additional noise associated with the finite squeezing of the GKP states, the estimated reshaped ancilla quadrature noise may be corrupted as follows:

$$\bar{z}_q^{(2)} = R_{\sqrt{2\pi}}(z_q^{(2)} + \xi_q^{(gkp)}),$$

$$\bar{z}_p^{(2)} = R_{\sqrt{2\pi}}(z_p^{(2)} + \xi_p^{(gkp)}),$$

Here, $\xi_q^{(gkp)} = \delta_q^{(2)} + \delta_q^{(3)}$ and $\xi_p^{(gkp)} = \delta_p^{(2)} + \delta_p^{(3)}$ are the additional noises caused by the finite GKP squeezing, and they follow $(\xi_q^{(gkp)}, \xi_p^{(gkp)}) \sim_{iid} \mathcal{N}(0, 2\sigma_{gkp}^2)$. Such additional noise may then be propagated to the data mode through the miscalibrated counter displacement operations based on noisy estimates. In the presence of additional GKP noise, the sizes of the counter displacements $\exp[i\hat{p}_1 \tilde{z}_q^{(1)}]$ and $\exp[i\hat{p}_1 \tilde{z}_p^{(1)}]$ are given by $$\tilde{z}_q^{(1)} = -\frac{2\sqrt{G(G-1)}\,\sigma^2}{(2G-1)\sigma^2 + 2\sigma_{gkp}^2}\bar{z}_q^{(2)} \xrightarrow{G \gg 1} -\bar{z}_q^{(2)},$$

$$\tilde{z}_p^{(1)} = \frac{2\sqrt{G(G-1)}\,\sigma^2}{(2G-1)\sigma^2 + 2\sigma_{gkp}^2}\bar{z}_p^{(2)} \xrightarrow{G \gg 1} \bar{z}_p^{(2)}$$

and do not explicitly depend on G in the limit of G>>1. Therefore, the additional GKP noise $\xi_q^{(gkp)}$ and $\xi_p^{(gkp)}$ may be added to the data quadrature operators without being amplified by the large gain parameter G>>1. This absence of the noise amplification is an important feature of the proposed error correction scheme described herein and is generally not the case for a generic GKP-stabilizer code involving large squeezing operations (see e.g., Appendix D for an illustration).

In Appendix C, an analysis of the adverse effects of the finitely-squeezed GKP states is provided. In particular, the variance of the output logical quadrature noise $(\sigma_L)^2$ is derived as a function of the input noise standard deviation σ, the GKP noise standard deviation $\sigma_{gkp}$, and the gain of the two-mode squeezing G. As described previously herein, the gain G of the two-mode squeezing is optimized to minimize the output logical noise standard deviation $\sigma_L$ for given σ and $\sigma_{gkp}$.

Figure 12A:
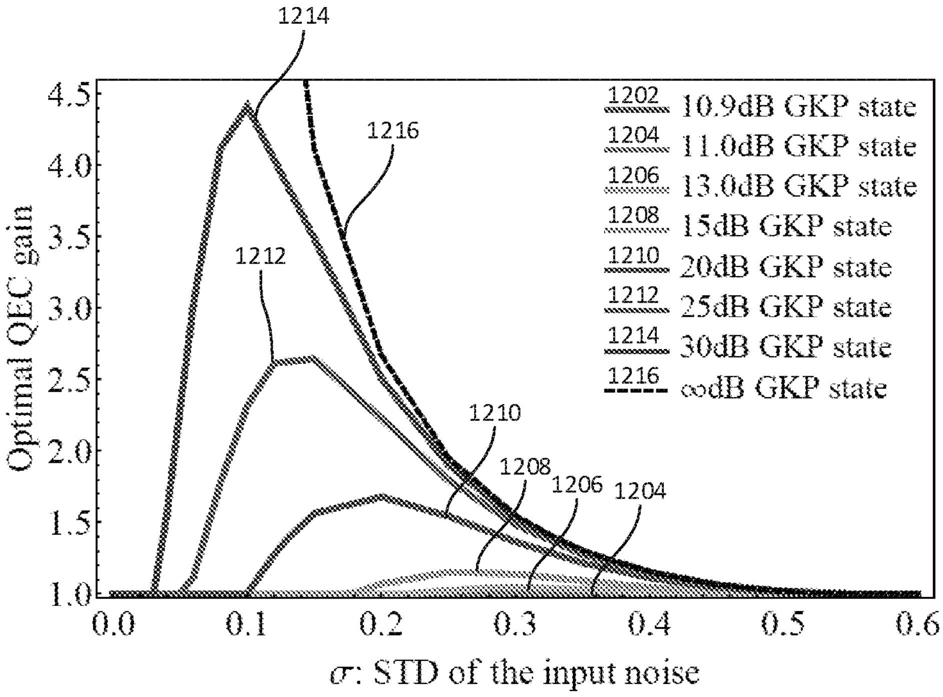
FIG. 12A illustrates quantum error correction (QEC) gain as a function of input noise standard deviation for different values of GKP squeezing, in accordance with some embodiments described herein.

FIG. 12A plots QEC gain, $\sigma^2/(\sigma^*_L)^2$, as a function of the input noise standard deviation for different values of GKP squeezing including: 10.9 dB in curve 1202 (not visible), 11.0 dB in curve 1204, 13.0 dB in curve 1206, 15 dB in curve 1208, 20 dB in curve 1210, 25 dB in curve 1212, and 30 dB in curve 1214, in accordance with some embodiments described herein. QEC gain for a GKP state with infinite squeezing is plotted in dashed curve 1216 for comparison.

Figure 12B:
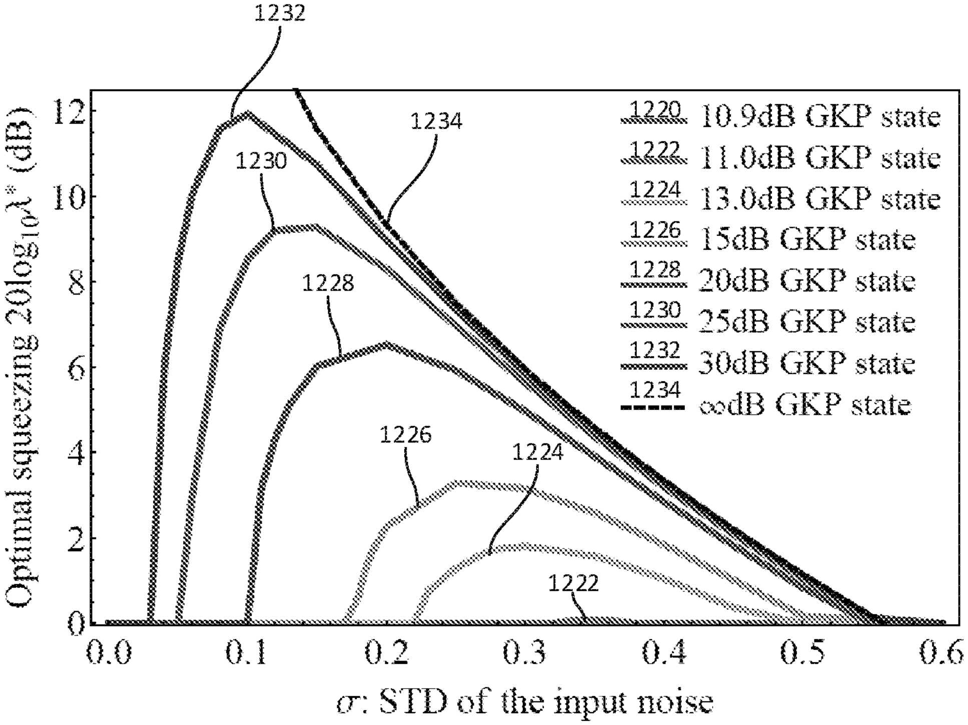
FIG. 12B illustrates two-mode squeezing gain as a function of input noise standard deviation for different values of GKP squeezing, in accordance with some embodiments described herein.

FIG. 12B plots gain, G*, of the two-mode squeezing as a function of input noise standard deviation for different values of GKP squeezing including: 10.9 dB in curve 1220 (not visible), 11.0 dB in curve 1222, 13.0 dB in curve 1224, 15 dB in curve 1226, 20 dB in curve 1228, 25 dB in curve 1230, and 30 dB in curve 1232, in accordance with some embodiments described herein. The gain of the two-mode squeezing for a GKP state with infinite squeezing is plotted in dashed curve 1234 for comparison.

The nontrivial QEC gain $\sigma^2/(\sigma^*_L)^2 > 1$ is observed to be achieved when the supplied GKP states have a squeezing larger than the critical value 11.0 dB. Also, when the supplied GKP states have a squeezing of 30 dB, the QEC gain is given by $\sigma^2/(\sigma^*_L)^2 = 4.41$, which is achieved when σ=0.1. For comparison, the QEC gain at the same input noise standard deviation σ=0.1 is given by $\sigma^2/(\sigma^*_L)^2 = 7.7$ when the ideal canonical GKP states are used to implement the two-mode GKP-squeezing code. These two values (4.41 and 7.7) being of the same magnitude indicates that the additional GKP noise is not significantly amplified by the large (e.g., 12.3 dB) single-mode squeezing operations used in this regime.

Appendix A

Here, the N-mode Gaussian-repetition code is introduced and analyzed, which is a generalization of the three-mode Gaussian-repetition code. In particular, we introduce the maximum likelihood estimation of the data position quadrature noise $\xi_q^{(1)}$ for the N-mode Gaussian-repetition code, which is a motivator behind our choice of the estimate $\xi_q^{(1)}$ in connection with the two-mode GKP-repetition code described herein.

Consider an arbitrary oscillator state $|\psi\rangle = \int dq\psi(q)|\hat{q}_1 = q\rangle$. The state $|\psi\rangle$ can be embedded in N oscillator modes via the N-mode Gaussian-repetition code as follows:

$$|\psi\rangle = \int dq\psi(q) \bigotimes_{k=1}^{N} |\hat{q}_k = q\rangle$$

where the first mode is the data mode and the rest are the ancilla modes. Note that the data position eigenstate $|\hat{q}_1 = q\rangle$ is mapped into $\otimes_{k=1}^{N}|\hat{q}_k - q\rangle$ through the encoding procedure. As shown in FIG. 10, this encoding can be realized by applying a sequence of Gaussian SUM gates $\text{SUM}_{1\to k} \equiv \exp[-i\hat{q}_j\hat{p}_k]$ where k∈{2, . . . , N}. Upon the encoding circuit, the quadrature operators are transformed into $$\hat{q}_1 \to \hat{q}'_1 \equiv \hat{q}_1$$

$$\hat{p}_1 \to \hat{p}'_1 \equiv \hat{p}_1 - \sum_{k=2}^{N} \hat{p}_k$$

$$\hat{q}_k \to \hat{q}'_k \equiv \hat{q}_k + \hat{q}_1$$

$$\hat{p}_k \to \hat{p}'_k \equiv \hat{p}_k$$

where $k \in \{2, \ldots, N\}$. The oscillator modes may be assumed to undergo independent and identically distributed additive Gaussian noise errors $\mathcal{N} = \otimes_{k=1}^{N} \mathcal{N}^{(k)}[\sigma]$, e.g., $$\hat{q}'_k \to \hat{q}''_k = \hat{q}'_k + \xi_q^{(k)} \text{ and } \hat{p}'_k \to \hat{p}''_k = \hat{p}'_k + \xi_p^{(k)}.$$

The added noise $\xi_{q/p}^{(1)}, \ldots, \xi_{q/p}^{(N)}$ follow an independent and identically distributed Gaussian random distribution $(\xi_q^{(1)}, \xi_p^{(1)}, \ldots, \xi_q^{(N)}, \xi_p^{(N)}) \sim_{iid} \mathcal{N}(0, \sigma^2)$.

Figure 13:
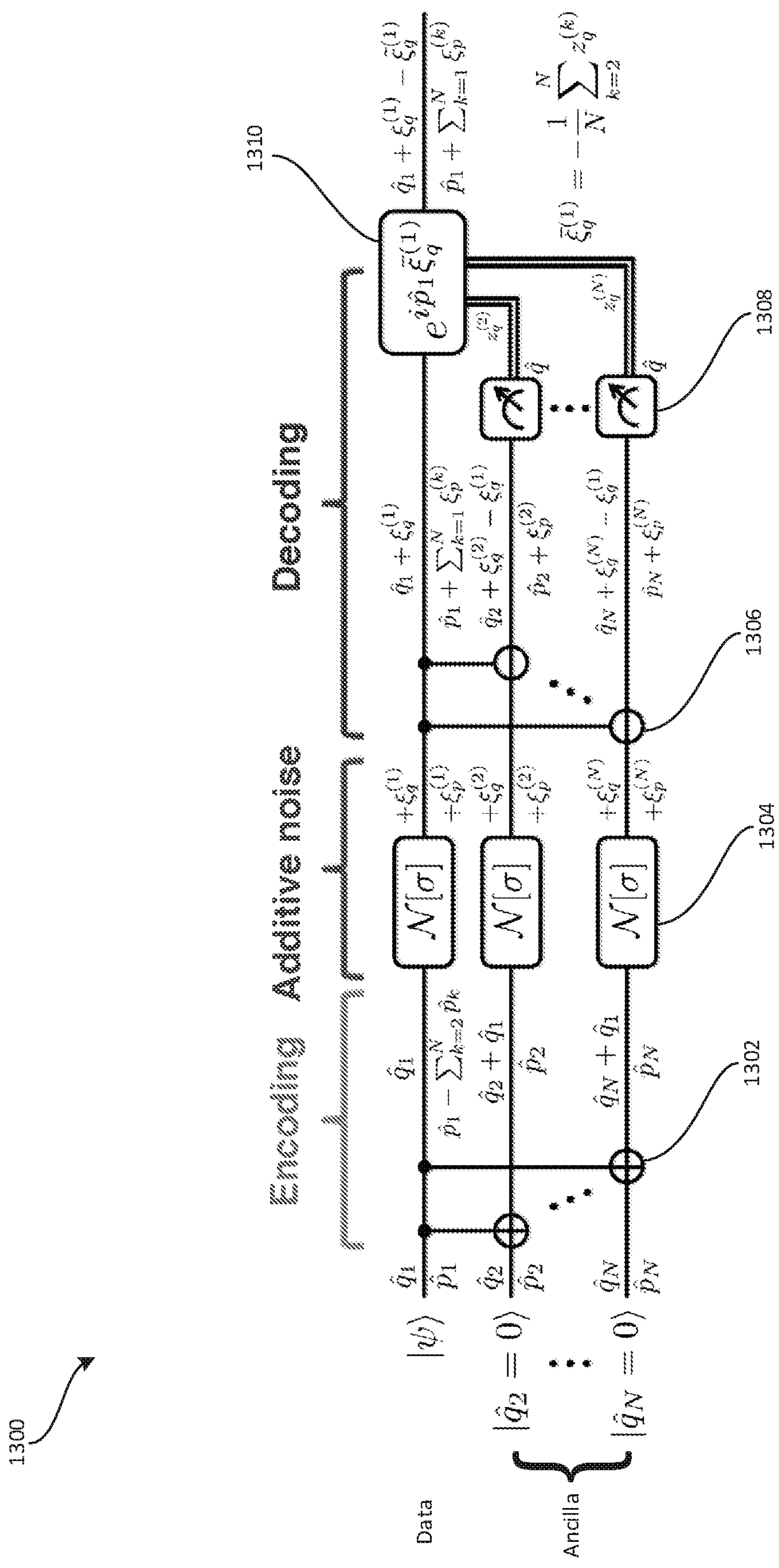
FIG. 13 illustrates an example of multi-mode bosonic system 1300 performing QEC using an N-mode Gaussian repetition code, in accordance with some embodiments described herein.

FIG. 13 illustrates an example of multi-mode bosonic system 1300 performing QEC using an N-mode Gaussian repetition code, in accordance with some embodiments described herein. The multi-mode bosonic system 1300 includes a data state and N ancilla states. The N ancilla states may be entangled with the data state through N SUM gates 1302, after which the data and ancilla states may be subject to correlated Gaussian noise errors 1304. To disentangle (e.g., to decode) the data and ancilla states, N inverse SUM gates 1306 may be applied, after which position quadrature operators of the ancilla states may be measured using N measurements 1308. In some embodiments, the measurements 1308 may be homodyne measurements. The data state may be error corrected using displacement operator 1310 based on the position quadrature operator measurements 1308.

The goal of the decoding procedure depicted in FIG. 13 is to extract information about the added noise $\xi_q^{(k)}$ and $\xi_p^{(k)}$ $(k \in \{1, \ldots, N\})$ through a set of syndrome measurements. The decoding procedure begins with the inverse of the encoding circuit, i.e., by a sequence of inverse-SUM gates $\mathrm{SUM}_{1\to k}^{\dagger} \equiv \exp[i\hat{q}_1\hat{p}_k]$ for $k \in \{2, \ldots, N\}$. Upon the inverse of the encoding circuit, the quadrature operators may be transformed into $\hat{q}''_k \to \hat{q}_k + z_q^{(k)}$ and $\hat{q}'_k \to \hat{p}_k + z_p^{(k)}$, where the reshaped quadrature noise is given by $$z_q^{(1)} \equiv \xi_q^{(1)}$$

$$z_p^{(1)} \equiv \sum_{k=1}^{N} \xi_p^{(k)}$$

$$z_q^{(k)} \equiv \xi_q^{(k)} - \xi_q^{(1)}$$

$$z_p^{(k)} \equiv \xi_p^{(k)}$$

where k Å {2, . . . , N}. Then, by performing measurements 1308 of the ancilla position quadrature operators, the values of $$z_q^{(k)} = \xi_q^{(k)} - \xi_q^{(1)}$$

can be extracted for all $k \in \{2, \ldots, N\}$. This is because the ancilla modes may be initially in the position eigenstates $|\hat{q}_k = 0)$ and thus measuring $\hat{q}'''_k = \hat{q}_k + z_q^{(k)}$ is equivalent to measuring $z_q^{(k)}$ for all $k \in \{2, \ldots, N\}$. Note, however, that information about the reshaped momentum quadrature noise $z_p^{(1)}, \ldots, z_p^{(N)}$ may not be extracted, which is an important limitation of Gaussian-repetition codes.

From the extracted values of $z_q^{(k)} = \xi_q^{(k)} - \xi_q^{(1)}$, the position quadrature noise may be inferred to be given by $\vec{\xi}_q \equiv (\xi_q^{(1)}, \xi_q^{(2)}, \ldots, \xi_q^{(N)}) = (\xi_q^{(1)}, \xi_q^{(1)} + z_q^{(2)}, \ldots, \xi_q^{(1)} + z_q^{(N)})$. Then, the undetermined data position quadrature $\xi_q^{(1)}$ may be estimated using a maximum likelihood estimation. Since noise errors with smaller $|\vec{\xi}_q|^2 \equiv \Sigma_{k=1}^{N} (\xi_q^{(k)})^2$ are more likely, $\xi_q^{(1)}$ may be estimated as:

$$\bar{\xi}_q^{(1)} = \operatorname{argmin}_{\xi_q^{(1)}} \left[ (\xi_q^{(1)})^2 + \sum_{k=2}^{N} (\xi_q^{(1)} + z_q^{(k)})^2 \right] = -\frac{1}{N} \sum_{k=2}^{N} z_q^{(k)}$$

from the syndrome measurement outcomes $z_q^{(2)}, \ldots, z_q^{(N)}$. Note that for N=2, this equation reduces to $\bar{\xi}_q^{(1)} = -(z_q^{(1)} + z_q^{(2)})/2$, which is why $\bar{\xi}_q^{(1)}$ may be chosen as an estimate of $\xi_q^{(1)}$. Finally, the decoding procedure may end with an application of the counter displacement operation $\exp[i\hat{p}_1 \bar{\xi}_q^{(1)}]$ 1310 to the data oscillator mode, as shown in the example of FIG. 13.

As a result of the encoding and decoding procedures, a logical additive noise error $\hat{q}_1 \to \hat{q}_1 + \xi_q$ and $\hat{p}_1 \to \hat{p}_1 + \xi_p$ may be present in the data oscillator mode, where the output logical position and momentum quadrature noise are given by $$\xi_q \equiv z_q^{(1)} - \bar{\xi}_q^{(1)} = \frac{1}{N} \sum_{k=1}^{N} \xi_q^{(k)}$$

$$\xi_p \equiv z_p^{(1)} = \sum_{k=1}^{N} \xi_p^{(k)}.$$

Because $(\xi_q^{(1)}, \xi_p^{(1)}, \ldots, \xi_q^{(N)}, \xi_p^{(N)}) \sim_{iid} \mathcal{N}(0, \sigma^2)$, these expressions may be rewritten as:

$$\xi_q = \frac{1}{N} \sum_{k=1}^{N} \xi_q^{(k)} \sim \mathcal{N}\left(0, \sigma^2 \equiv \frac{1}{N}\sigma^2\right)$$

$$\xi_p = \sum_{k=1}^{N} \xi_p^{(k)} \sim \mathcal{N}(0, \sigma_p^2 \equiv N\sigma^2).$$

Thus, the variance of the position quadrature noise is reduced by a factor of N, but the variance of the momentum quadrature noise is increased by the same factor. The latter increase is due to the transfer of ancilla momentum quadrature noise to the data momentum quadrature (see $+\Sigma_{k-1}^{N} \xi_p^{(k)}$ in $z_p^{(1)}$) which is left undetected by the position homodyne measurements. As a result, the product of the noise standard deviations remains unchanged at the end of the error correction procedure (e.g., $\sigma_q \sigma_p = \sigma^2$). This implies that Gaussian-repetition codes can only squeeze the Gaussian quadrature noise but cannot actually correct them. This reaffirms the previous no-go results for correcting Gaussian errors with Gaussian resources.

Appendix B

Here, explicit expressions for the probability density functions of the logical quadrature noise $\xi_q$ and $\xi_p$ for the two-mode GKP-repetition code are provided. Recall that:

$$\xi_q = z_q^{(1)} - \bar{\xi}_q^{(1)} = \xi_q^{(1)} + 1/2 R_{\sqrt{2\pi}}(\xi_q^{(2)} - \xi_q^{(1)}),$$

$$\xi_p = z_p^{(1)} - \bar{\xi}_p^{(2)} = \xi_p^{(1)} + \xi_p^{(2)} - R_{\sqrt{2\pi}}(\xi_p^{(2)}).$$

and note that the logical quadrature noise $\xi_q$ and $\xi_p$ for the two-mode GKP-repetition are given by:

$$\xi_q=\xi_q^{(1)}+1/2R_{\sqrt{2\pi}}(\xi_q^{(2)}-\xi_q^{(1)}),$$

$$\xi_p=\xi_p^{(1)}+\xi_p^{(2)}-R_{\sqrt{2\pi}}(\xi_p^{(2)}),$$

where $(\xi_q^{(1)}, \xi_p^{(1)}, \xi_q^{(2)}, \xi_p^{(2)})\sim_{iid}\mathcal{N}(0, \sigma^2)$, $R_s(z)\equiv z-n^*(z)s$, and $n^*(z)\equiv\text{argmin}\, n_{n\in\mathbb{Z}}|z-ns|$. Let $p_\sigma(z)$ denote the probability density function of a Gaussian distribution with zero mean and variance $\sigma^2$, i.e., $p_\sigma(z)\equiv(1/\sqrt{2\pi\sigma^2})\exp[-z^2/(2\sigma^2)]$. Then, the probability density functions $Q\xi(_q)$ and $P(\xi_p)$ of the logical quadrature noise $\xi_q$ and $\xi_p$ may be given by:

$$Q(\xi_q)\equiv\int_{-\infty}^{\infty}d\xi_q^{(1)}\int_{-\infty}^{\infty}d\xi_q^{(2)}p_\sigma(\xi_q^{(1)})p_\sigma(\xi_q^{(2)})\times \delta(\xi_p-\xi_p^{(1)}-\xi_p^{(2)}+-R_{\sqrt{2\pi}}(\xi_p^{(2)}))$$

where $\delta(x)$ is the Dirac delta function. Note that $R_s(z)$ can be expressed as:

$$R_s(z)\equiv\sum_{n\in\mathbb{Z}}(z-ns)\cdot I\left\{z\in\left[\left(n-\frac{1}{2}\right)s,\left(n+\frac{1}{2}\right)s\right]\right\}$$

where $I\{C\}$ is an indicator function, e.g., $I\{C\}=1$ if C is true $I\{C\}=0$ if C is false. Then, using this expression for $R_s(z)$, $Q(\xi_q)$ and $P(\xi_p)$ can be written in more explicit forms as follows:

$$Q(\xi_q)=\sum_{n_2\in\mathbb{Z}}\int_{-\infty}^{\infty}d\xi_q^{(1)}\int_{-\infty}^{\infty}d\xi_q^{(2)}p_\sigma(\xi_q^{(1)})p_\sigma(\xi_q^{(2)})\delta\left(\xi_q-\xi_q^{(1)}-\frac{1}{2}\left(\xi_q^{(2)}-\xi_q^{(1)}-\sqrt{2\pi}\,n_2\right)\right)\times I\left\{\xi_q^{(2)}-\xi_q^{(1)}\in\left[n_2-\frac{1}{2}\sqrt{2\pi},\left(n_2+\frac{1}{2}\right)\sqrt{2\pi}\right]\right\}=\sum_{n_2\in\mathbb{Z}}\int_{-\sqrt{\frac{\pi}{2}}}^{\sqrt{\frac{\pi}{2}}}d\xi_q^{(2)}p_\sigma\left(\xi_q-\frac{1}{2}\xi_q^{(2)}+\sqrt{2\pi}\,n_2\right)$$

$$P(\xi_p)=\sum_{n_2\in\mathbb{Z}}\int_{-\infty}^{\infty}d\xi_p^{(1)}\int_{-\infty}^{\infty}d\xi_p^{(2)}p_\sigma(\xi_p^{(1)})p_\sigma(\xi_p^{(2)})\delta\left(\xi_p-\xi_p^{(1)}-\sqrt{2\pi}\,n_2\right)\times I\left\{\xi_p^{(2)}\in\left[\left(n_2-\frac{1}{2}\right)\sqrt{2\pi},\left(n_2+\frac{1}{2}\right)\sqrt{2\pi}\right]\right\}=\sum_{n_2\in\mathbb{Z}}\left[\int_{\sqrt{2\pi}(n_2-\frac{1}{2})}^{\sqrt{2\pi}(n_2+\frac{1}{2})}d\xi_p^{(2)}\cdot p_\sigma(\xi_p^{(2)})\right]p_\sigma\left(\xi_p-\sqrt{2\pi}\,n_2\right)$$

FIG. 6 as described herein may be obtained by numerically computing these probability density functions and then evaluating the standard deviations of the obtained numerical probability density functions.

Appendix C

Here, the underlying reasons behind the choice of the estimates $\tilde{z}_q^{(1)}$ and $\tilde{z}_p^{(1)}$ for the GKP-two-mode-squeezing code are explained. Recall that the covariance matrix of the reshaped noise $z=(z_q^{(1)}, z_p^{(1)}, z_q^{(2)}, z_p^{(2)})^T$ is given by $$V_z=\sigma^2\begin{bmatrix} 2G-1)I & -2\sqrt{G(G-1)}\,Z \\ -2\sqrt{G(G-1)}\,Z & (2G-1)I \end{bmatrix}.$$

For now, ignore that $z_p^{(2)}$ and $z_p^{(2)}$ can be measured only modulo $\sqrt{2\pi}$ and instead assume that their exact values may be known. Note that $z_p^{(1)}$ is correlated with $z_q^{(2)}$, whereas $z_p^{(1)}$ is correlated with $z_p^{(2)}$. Consider the estimates of the form $\tilde{z}_q^{(1)}=c_p z_q^{(2)}$ and $\bar{z}_p^{(1)}=c_p z_p^{(2)}$, where $c_q$ and $c_p$ are constants. The values of $c_q$ and $c_p$ may be chosen such that the variances of $z_q^{(1)}-\bar{z}_q^{(1)}$ and $z_p^{(1)}-\bar{z}_p^{(1)}$ are minimized, as $\text{Var}(z_q^{(1)}-\bar{z}_q^{(1)})$ and $\text{Var}(z_p^{(2)}-\bar{z}_p^{(1)})$ are given by $$\text{Var}(z_q^{(1)}-\bar{z}_q^{(1)})=\text{Var}(z_q^{(1)})-2c_q\cdot\text{Cov}(z_q^{(1)},z_q^{(2)})+c_q^2\text{Var}(z_q^{(2)}),$$

$$\text{Var}(z_p^{(1)}-\bar{z}_p^{(1)})=\text{Var}(z_p^{(1)})-2c_p\cdot\text{Cov}(z_p^{(1)},z_p^{(2)})+c_p^2\text{Var}(z_p^{(2)}),$$

they are minimized when $$c_q=\frac{\text{Cov}(z_q^{(1)},z_q^{(2)})}{\text{Var}(z_q^{(2)})}=-\frac{2\sqrt{G(G-1)}}{2G-1},$$

$$c_q=\frac{\text{Cov}(z_p^{(1)},z_p^{(2)})}{\text{Var}(z_p^{(2)})}=-\frac{2\sqrt{G(G-1)}}{2G-1}.$$

Therefore, if both $z_q^{(2)}$ and $z_p^{(2)}$ are precisely known, the estimates of $z_q^{(1)}$ and $z_p^{(1)}$ are given by $$\tilde{z}_q^{(1)}=-\frac{2\sqrt{G(G-1)}}{2G-1}z_q^{(2)},$$

$$\tilde{z}_p^{(1)}=\frac{2\sqrt{G(G-1)}}{2G-1}z_p^{(2)}.$$

However, as $z_q^{(2)}$ and $z_p^{(2)}$ may be measured modulo $\sqrt{2\pi}$, if $z_q^{(2)}$ and $z_p^{(2)}$ are replaced by $\bar{z}_p^{(2)}=R_{\sqrt{2\pi}}(z_q^{(2)})$ and $\bar{z}_p^{(2)}=R_{\sqrt{2\pi}}(z_p^{(2)})$ the estimates $\tilde{z}_q^{(2)}$ and $\tilde{z}_p^{(2)}$ as described herein may be determined.

An explicit expression for the probability density functions of the logical quadrature noise $\xi_q$ and $\xi_p$ for the two-mode GKP-squeezing code is provided herein. Recall that:

$$\xi_q\equiv z_q^{(1)}-\tilde{z}_q^{(1)}=z_q^{(1)}+\frac{2\sqrt{G(G-1)}}{2G-1}R_{\sqrt{2\pi}}(z_q^{(2)}),$$

$$\xi_p\equiv z_p^{(1)}-\tilde{z}_p^{(1)}=z_p^{(1)}+\frac{2\sqrt{G(G-1)}}{2G-1}R_{\sqrt{2\pi}}(z_p^{(2)})$$

where $z=(z_p^{(1)}, z_p^{(1)}, z_q^{(2)}, z_p^{(2)})^T$ follows a Gaussian distribution with zero means and the covariance matrix $V_z$. By using the expression for $R_s(z)$ of Appendix B, the probability density functions of the quadrature noise may be given by $$Q(\xi_q)=\int_{-\infty}^{\infty}dz_q^{(1)}\int_{-\infty}^{\infty}dz_q^{(2)}\frac{1}{2\pi\sigma^2}\exp\left[-\frac{(2G-1)}{2\sigma^2}\left((z_q^{(1)})^2+(z_q^{(2)})^2\right)-\frac{2\sqrt{G(G-1)}}{\sigma^2}z_q^{(1)}z_q^{(2)}\right]\times\delta\left(\xi_q-z_q^{(1)}-\frac{2\sqrt{G(G-1)}}{\sigma^2}R_{\sqrt{2\pi}}(z_q^{(2)})\right)=$$

$$\sum_{n\in\mathbb{Z}}\int_{-\infty}^{\infty}dz_q^{(2)}\frac{1}{2\pi\sigma^2}\exp\left[-\frac{(2G-1)}{2\sigma^2}\left(z_q^{(1)}+\frac{2\sqrt{G(G-1)}}{2G-1}z_q^{(2)}\right)^2-\right.$$

-continued $$\frac{1}{2(2G-1)\sigma^2}(z_q^{(2)})^2\Bigg]\times$$

$$\delta\left(\xi_q - z_q^{(1)} - \frac{2\sqrt{G(G-1)}}{2G-1}\left(z_q^{(2)} - \sqrt{2\pi}\,n\right)\right)I$$

$$\left\{z_q^{(2)} \in \left[\left(n-\frac{1}{2}\right)\sqrt{2\pi},\ \left(n+\frac{1}{2}\right)\sqrt{2\pi}\right]\right\} =$$

$$\sum_{n\in\mathbb{Z}} \int_{(n-\frac{1}{2}\sqrt{2\pi})}^{(n+\frac{1}{2}\sqrt{2\pi})} dz_q^{(2)} \frac{1}{\sqrt{2\pi(2G-1)\sigma^2}}$$

$$\exp\left[-\frac{1}{2(2G-1)\sigma^2}(z_q^{(2)})^2\right]\times\sqrt{\frac{2G-1}{2\pi(2G-1)\sigma^2}}$$

$$\exp\left[-\frac{(2G-1)}{2\sigma^2}\left(\xi_q + \frac{2\sqrt{G(G-1)}}{2G-1}\sqrt{2\pi}\,n\right)^2\right] =$$

$$\sum_{n\in\mathbb{Z}} q_n \cdot p\left[\frac{\sigma}{\sqrt{2G-1}}\right](\xi_q - \mu_n)$$

and similarly $$P(\xi_p) = \int_{-\infty}^{\infty} dz_p^{(1)} \int_{-\infty}^{\infty} dz_p^{(2)} \frac{1}{2\pi\sigma^2}$$

$$\exp\left[-\frac{(2G-1)}{2\sigma^2}\left((z_p^{(1)})^2 + (z_p^{(2)})^2\right) + \frac{2\sqrt{G(G-1)}}{\sigma^2} z_p^{(1)} z_p^{(2)}\right]\times$$

$$\delta\left(\xi_p - z_p^{(1)} + \frac{2\sqrt{G(G-1)}}{2G-1} R_{\sqrt{2\pi}}(z_p^{(2)})\right) =$$

$$\sum_{n\in\mathbb{Z}} q_n \cdot p\left[\frac{\sigma}{\sqrt{2G-1}}\right](\xi_q - \mu_n)$$

where $q_n(=q_{-n})$ and $\mu_n$ are defined as $$q_n = \int_{(n-\frac{1}{2})\sqrt{2\pi}}^{(n+\frac{1}{2})\sqrt{2\pi}} dz p\left[\sqrt{2G-1}\,\sigma\right](z),$$

$$\mu_n = \frac{2\sqrt{G(G-1)}}{2G-1}\sqrt{2\pi}\,n.$$

Finally, the asymptotic expressions for the gain G* and the standard deviation $\sigma^*_L$ are derived. Recall that assuming $\sqrt{2G-1}\sigma \ll 1$ gives:

$$\sigma_L \simeq \frac{\sigma^2}{2G-1} + \frac{8\pi\sqrt{G(G-1)}}{(2G-1)^2}\operatorname{erfc}\left(\frac{\sqrt{\pi}}{2\sqrt{2G-1}\,\sigma}\right)$$

Assuming further that $G \gg 1$ (which is relevant when $\sigma \ll 1$) and using the asymptotic formula for the complementary error function, e.g., $$\operatorname{erfc}(x) \xrightarrow{x\to\infty} \frac{1}{x\sqrt{\pi}}\exp[-x^2],$$

the above expression for $\sigma_L$ may be simplified as $$(\sigma_L)^2 \simeq \sigma^2 + \frac{4\sigma}{\sqrt{\pi}}\exp\left[-\frac{\pi}{4\sigma^2}x\right] \equiv f(x),$$

where $x \equiv 1/(2G-1)$. The optimum x* can be found by solving $f'(x^*)=0$. Note that $f'(x^*)$ is given by $$f'(x^*) = \sigma^2 - \left(\frac{\pi}{\sigma\sqrt{x}} + \frac{2\sigma}{\sqrt{x^3}}\right)\exp\left[-\frac{\pi}{4\sigma^2}x\right].$$

Thus, x* should satisfy $$x^* = \frac{4\sigma^2}{\pi}\log_e\left(\frac{\pi}{\sigma^3\sqrt{x^*}} + \frac{2}{\sigma\sqrt{(x^*)^3}}\right) =$$

$$\frac{4\sigma^2}{\pi}\log_e\left(\frac{\pi^{\frac{3}{2}}}{2\sigma^4\sqrt{\log_e(\ldots)}} + \frac{\pi^{\frac{3}{2}}}{4\sigma^4\sqrt{(\log_e(\ldots))^3}}\right)$$

where the first equation has been iteratively entered into itself to arrive at the second equation. Since $\log_e(\ldots.)\gg 1$, the second term in the second line may be disregarded. By further neglecting the logarithmic factor $\sqrt{\log_e(\ldots)}$, x* may be given by $$x^* \simeq \frac{4\sigma^2}{\pi}\log_e\left(\frac{\pi^{\frac{3}{2}}}{2\sigma^4}\right).$$

Since $$G^* = \frac{1}{2x^*} + \frac{1}{2},$$

the following equation follows:

$$G^* \xrightarrow{\sigma\ll 1} \frac{\pi}{8\sigma^2}\left(\log_e\left[\frac{\pi^{3/2}}{2\sigma^4}\right]\right)^{-1} + \frac{1}{2}.$$

The value $(\sigma^*_L)^2 = f(x^*)$ is then approximately given by $$(\sigma_L^*)^2 \simeq \frac{4\sigma^2}{\pi}\log_e\left(\frac{\pi^{\frac{3}{2}}}{2\sigma^4}\right) + \frac{4\sigma^4}{\pi}$$

Since $$\log_e\left(\pi^{\frac{3}{2}} / (2\sigma^4)\right) \gg 1,$$

the second term may be disregarded to obtain:

$$\sigma_L^* \xrightarrow{\sigma \ll 1} \frac{2\sigma^2}{\sqrt{\pi}}\left(\log_e\left[\frac{\pi^{\frac{3}{2}}}{2\sigma^4}\right]\right)^{\frac{1}{2}}.$$

Now consider the case with noisy GKP states (see FIG. 11 and related description herein). Then, $$\xi_q \equiv z_q^{(1)} + \frac{2\sqrt{G(G-1)}\,\sigma^2}{(2G-1)\sigma^2 + 2\sigma_{gkp}^2} R_{2\pi}(z_q^{(2)} + \xi_q^{(gkp)}),$$

where the GKP noise $\xi_q^{(gkp)}$ is independent of $z_q^{(1)}$ and $z_q^{(2)}$ and follows $\xi_q^{(gkp)} \sim \mathcal{N}(0, 2\sigma_{gkp}^2)$. Then, the probability density function $Q(\xi_q)$ is given by $$Q(\xi_q) \equiv \int_{\mathbb{R}^3} dz_q^{(1)} dz_q^{(2)} d\xi_q^{(gkp)} \frac{1}{\sqrt{16\pi^3\sigma^4\sigma_{gkp}^2}} \exp\left[-\frac{2G-1}{2\sigma^2}\left((z_q^{(1)})^2 + (z_q^{(2)})^2\right) - \frac{2\sqrt{G(G-1)}}{\sigma^2} z_q^{(1)} z_q^{(2)}\right] \times \exp\left[-\frac{1}{4\sigma_{gkp}^2}(\xi_q^{(gkp)})^2\right] \delta\left(\xi_q - z_q^{(1)} - \frac{2\sqrt{G(G-1)}\,\sigma^2}{(2G-1)\sigma^2 + 2\sigma_{gkp}^2} R_{\sqrt{2\pi}}(z_q^{(2)} + \xi_q^{(gkp)})\right) =$$

$$\sum_{n\in\mathbb{Z}} \int_{\mathbb{R}^3} dz_q^{(1)} dz_q^{(2)} d\xi_q^{(gkp)} \frac{1}{\sqrt{16\pi^3\sigma^4\sigma_{gkp}^2}} \exp\left[-\frac{(2G-1)}{2\sigma^2}\left(z_q^{(1)} + \frac{2\sqrt{G(G-1)}}{2G-1} z_q^{(2)}\right)^2 - \frac{1}{2(2G-1)\sigma^2}(z_q^{(2)})^2\right] \times \exp\left[-\frac{1}{4\sigma_{gkp}^2}(\xi_q^{(gkp)})^2\right] \delta\left(\xi_q - z_q^{(1)} - \frac{2\sqrt{G(G-1)}\,\sigma^2}{(2G-1)\sigma^2 + 2\sigma_{gkp}^2}\left(z_q^{(2)} + \xi_q^{(gkp)} - \sqrt{2\pi}\,n\right)\right) \times I\left\{z_q^{(2)} + \xi_q^{(gkp)} \in \left[\left(n - \frac{1}{2}\right)\sqrt{2\pi}, \left(n + \frac{1}{2}\right)\sqrt{2\pi}\right]\right\} =$$

$$\sum_{n\in\mathbb{Z}} \int_{\mathbb{R}^2} dz_q^{(2)} d\xi_q^{(gkp)} \frac{1}{\sqrt{16\pi^3\sigma^4\sigma_{gkp}^2}} \exp\left[-\frac{1}{2(2G-1)\sigma^2}(z_q^{(2)})^2\right] \exp\left[-\frac{1}{4\sigma_{gkp}^2}(\xi_q^{(gkp)})^2\right] \times \exp\left[-\frac{(2G-1)}{2\sigma^2}\left(\xi_q - \frac{2\sqrt{G(G-1)}\,\sigma^2}{(2G-1)\sigma^2 + 2\sigma_{gkp}^2}\left(\xi_q^{(gkp)} - \sqrt{2\pi}\,n\right) + \frac{2\sqrt{G(G-1)}\,\sigma_{gkp}^2}{2(2G-1)\sigma^2 + 2\sigma_{gkp}^2} z_q^{(2)}\right)^2\right] \times I\left\{z_q^{(2)} + \xi_q^{(gkp)} \in \left[\left(n - \frac{1}{2}\right)\sqrt{2\pi}, \left(n + \frac{1}{2}\right)\sqrt{2\pi}\right]\right\}$$

Thus, the variance of the output logical quadrature noise $(\sigma_L)^2 = \mathrm{Var}[\xi_q] = \mathbb{E}[\xi_q)^2]$ is given by:

$$(\sigma_L)^2 = \sum_{n\in\mathbb{Z}} \int_{\mathbb{R}^3} dz_q^{(2)} d\xi_q^{(gkp)} d\xi_q \frac{1}{\sqrt{16\pi^3\sigma^4\sigma_{gkp}^2}} \exp\left[-\frac{1}{2(2G-1)\sigma^2}(z_q^{(2)})^2\right] \exp\left[-\frac{1}{4\sigma_{gkp}^2}(\xi_q^{(gkp)})^2\right] \times (\xi_q)^2 \exp\left[-\frac{(2G-1)}{2\sigma^2}\left(\xi_q - \frac{2\sqrt{G(G-1)}\,\sigma^2}{(2G-1)\sigma^2 + 2\sigma_{gkp}^2}\left(\xi_q^{(gkp)} - \sqrt{2\pi}\,n\right) + \frac{2\sqrt{G(G-1)}\,\sigma_{gkp}^2}{(2G-1)((2G-1)\sigma^2 + 2\sigma_{gkp}^2)} z_q^{(2)}\right)^2\right] \times I\left\{z_q^{(2)} + \xi_q^{(gkp)} \in \left[\left(n - \frac{1}{2}\right)\sqrt{2\pi}, \left(n + \frac{1}{2}\right)\sqrt{2\pi}\right]\right\} =$$

$$\sum_{n\in\mathbb{Z}} \int_{\mathbb{R}^2} dz_q^{(2)} d\xi_q^{(gkp)} p\left[\sqrt{2G-1}\,\sigma\right](z_q^{(2)}) \cdot p\left[\sqrt{2}\,\sigma_{gkp}\right](\xi_q^{(gkp)}) \times \left[\frac{\sigma^2}{2G-1} + \left(\frac{2\sqrt{G(G-1)}\,\sigma^2}{(2G-1)\sigma^2 + 2\sigma_{gkp}^2}\left(\xi_q^{(gkp)} - \sqrt{2\pi}\,n\right) - \frac{2\sqrt{G(G-1)}\,\sigma_{gkp}^2}{(2G-1)((2G-1)\sigma^2 + 2\sigma_{gkp}^2)} z_q^{(2)}\right)^2\right] \times I \left\{z_q^{(2)} + \xi_q^{(gkp)} \in \left[\left(n - \frac{1}{2}\right)\sqrt{2\pi}, \left(n + \frac{1}{2}\right)\sqrt{2\pi}\right]\right\}.$$

Appendix D

A family of GKP-stabilizer codes, called GKP-squeezed-repetition codes herein, are introduced in this section. These N-mode GKP-squeezed-repetition codes can suppress additive Gaussian noise errors to the $N^{th}$ order, e.g., $\sigma_q, \sigma_p \propto \sigma^N$, where $\sigma$ is the standard deviation of the input additive Gaussian noise and $\sigma_q$ and $\sigma_p$ are the standard deviations of the output logical position and momentum quadrature noise, respectively.

Figure 14A:
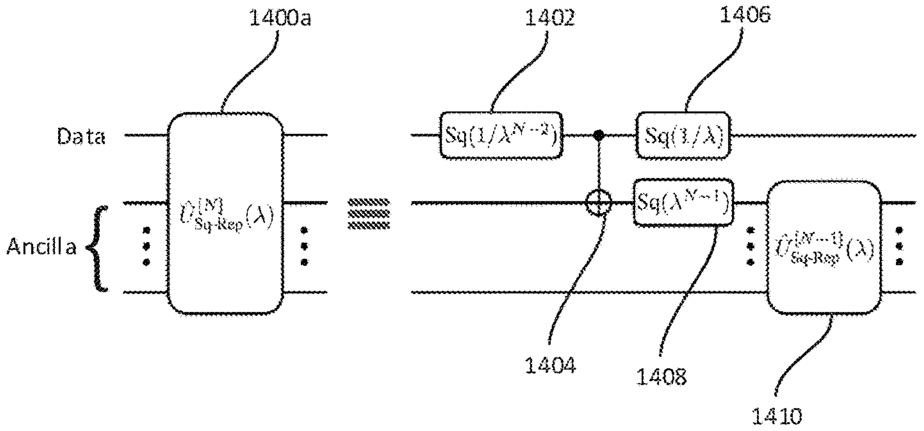
FIGS. 14A, 14B, and 14C illustrate examples of N-mode bosonic systems 1400*a*, 1400*b*, and 1400*c* for N≥3, N=2, and N=3, respectively, in accordance with some embodiments described herein.

Let $|\psi\rangle = \int dq\psi(q)|\hat{q}_1 = q\rangle$ be an arbitrary one-mode bosonic state. The encoded logical state $|\psi_L\rangle$ of the N-mode GKP-squeezed-repetition code can be defined as:

$$|\psi_L\rangle \equiv \hat{U}_{Sq\text{-}Rep}{}^{[N]}|\psi\rangle \otimes |GKP\rangle^{\otimes N-1}$$

where the encoding Gaussian circuit $\hat{U}_{Sq\text{-}Rep}{}^{[N]}$ is recursively defined as:

$$\hat{U}_{Sq-Rep}^{[N]} \equiv Sq_1\left(\frac{1}{\lambda^{N-2}}\right) SUM_{1\to 2} Sq_1\left(\frac{1}{\lambda}\right) Sq_2(\lambda^{N-1}) \times \left(\hat{I}_1 \otimes \hat{U}_{Sq-Rep}^{[N-1]}\right)$$

for N≥3. FIG. 14A illustrates an example of such an N-mode GKP-squeezed repetition code 1400*a* for N≥3, in accordance with some embodiments described herein. The N-mode GKP-squeezed repetition code 1400*a* may be performed by a system with a data state and a number of ancilla states (e.g., N−1 ancilla states). The N-mode GKP-squeezed repetition code 1400*a* may be broken into several operations, 1402 through 1410. These operations include several symplectic matrices 1402, 1406, and 1408, a SUM gate 1404, and a further squeezing operation 1410 applied to the ancilla states only.

Figure 14B:
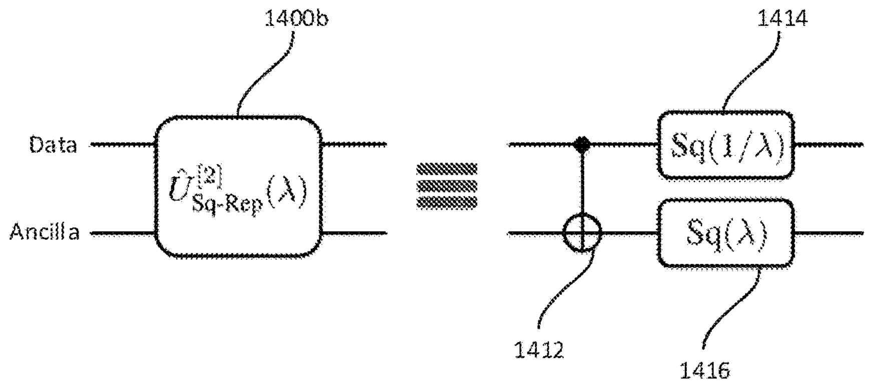

FIG. 14B illustrates an example of an N-mode GKP-squeezed repetition code 1400*b* for the base case N=2, in accordance with some embodiments described herein. The N-mode GKP-squeezed repetition code 1400*b* may be performed by a system with one data state and one ancilla state, and may be broken down into a SUM gate 1412 and two symplectic matrices 1414 and 1416. For this N-mode GKP-squeezed repetition code 1400b, $\hat{U}_{Sq\text{-}Rep}^{[2]}$ is given by:

$$\hat{U}_{Sq\text{-}Rep}^{[2]} \equiv Sq_1(1/\lambda)Sp_2(\lambda)\text{SUM}_{1\to 2}$$

and the symplectic matrix $S_{Sq\text{-}Rep}^{[2]}$ associated with the encoding Gaussian circuit $\hat{U}_{Sq\text{-}Rep}^{[2]}$ is given by:

$$S_{Sq\text{-}Rep}^{[2]} = \begin{bmatrix} \frac{1}{\lambda} & 0 & 0 & 0 \\ 0 & \lambda & 0 & -\lambda \\ \lambda & 0 & \lambda & 0 \\ 0 & 0 & 0 & \frac{1}{\lambda} \end{bmatrix}.$$

Figure 14C:
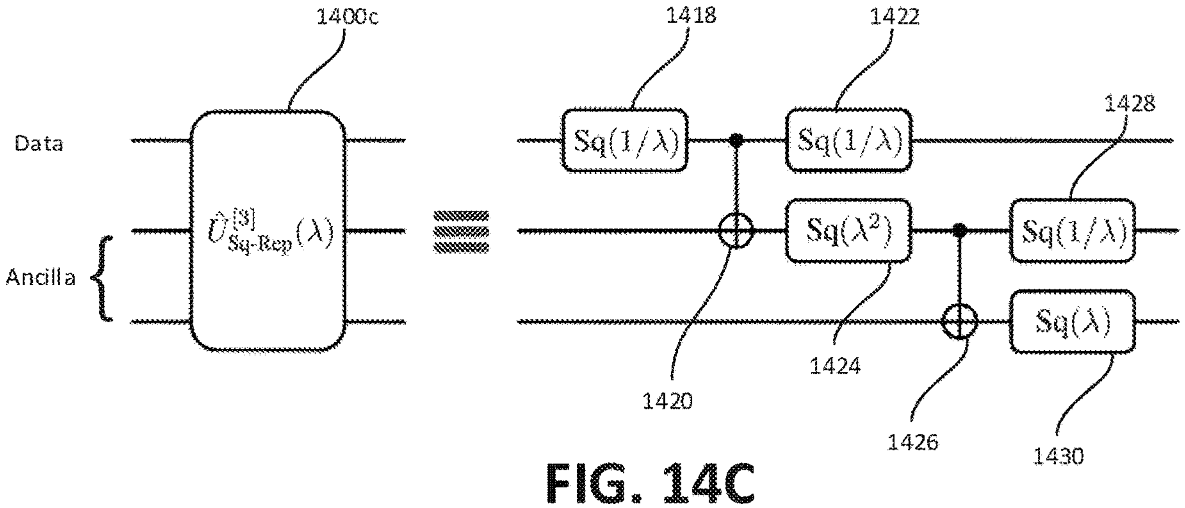

FIG. 14C illustrates an example of an N-mode GKP-squeezed repetition code 1400c for the case where N=3, in accordance with some embodiments described herein. The N-mode GKP-squeezed repetition code 1400c may be performed by a system with one data state and two ancilla states, and may be broken down into SUM gates 1420 and 1426 and symplectic matrices 1418, 1422, 1424, 1428, and 1430. For this case, the symplectic matrix $S_{Sq\text{-}Rep}^{[3]}$ with the encoding Gaussian circuit $\hat{U}_{Sq\text{-}Rep}^{[3]}$ is explicitly given by:

$$S_{Sq\text{-}Rep}^{[3]} = \begin{bmatrix} \frac{1}{\lambda^2} & 0 & 0 & 0 & 0 & 0 \\ 0 & \lambda^2 & 0 & -\lambda & 0 & 0 \\ 1 & 0 & \lambda & 0 & 0 & 0 \\ 0 & 0 & 0 & \frac{1}{\lambda} & 0 & -\lambda \\ \lambda^2 & 0 & \lambda^3 & 0 & \lambda & 0 \\ 0 & 0 & 0 & 0 & 0 & \frac{1}{\lambda} \end{bmatrix}.$$

Thus, the reshaped quadrature noise vector $z=(S_{Sq\text{-}Rep}^{[3]})^{-1}\xi$ is given by $$z = \begin{bmatrix} \lambda^2 \xi_q^{(1)} \\ \frac{\xi_p^{(1)}}{\lambda^2} + \xi_p^{(2)} + \lambda^2 \xi_p^{(3)} \\ -\lambda \xi_q^{(1)} + \frac{\xi_q^{(2)}}{\lambda} \\ \lambda \xi_p^{(2)} + \lambda^3 \xi_p^{(3)} \\ -\lambda \xi_q^{(2)} + \frac{\xi_q^{(3)}}{\lambda} \\ \lambda \xi_p^{(3)} \end{bmatrix} \equiv \begin{bmatrix} z_q^{(1)} \\ z_p^{(1)} \\ z_q^{(2)} \\ z_p^{(2)} \\ z_q^{(3)} \\ z_p^{(3)} \end{bmatrix}$$

where $\xi \equiv (\xi_q^{(1)}, \xi_p^{(1)}, \xi_q^{(2)}, \xi_p^{(2)}, \xi_q^{(3)}, \xi_q^{(4)})^T$ is the original quadrature noise vector whose elements follow independent and identically distributed Gaussian random distributions with variance $\sigma^2$.

Through the noise reshaping, the data position quadrature noise is amplified by a factor of $\lambda^2$ (i.e., $z_q^{(1)}=\lambda^2 \xi_q^{(1)}$). Note that, by choosing $\lambda=\sqrt{2\pi}c/\sigma$ with a small constant $c\ll 1$, the ancilla position quadrature noise $z_q^{(2)}$ and $z_q^{(3)}$ can be contained within the unambiguously distinguishable range $[-\sqrt{\pi/2}, \sqrt{\pi/2}]$ with a very high probability. Then, by measuring the reshaped ancilla position quadrature noise of the second mode $z_q^{(2)}=-\lambda \xi_q^{(1)}+\xi_q^{(2)}/\lambda$, (modulo $\sqrt{2\pi}$) the amplified position quadrature noise $z_q^{(1)}=\lambda^2\xi_q^{(1)}$ can be determined up to an error of $\xi_q^{(2)}$. Then, by further measuring the ancilla position quadrature noise of the third mode, $z_q^{(3)}=-\lambda\xi_q^{(2)}+\xi_q^{(3)}/\lambda$, (modulo $\sqrt{2\pi}$) the residual error $\xi_q^{(2)}$ can be determined up to an even smaller error of $\xi_q^{(3)}/\lambda^2$. As a result, the position quadrature noise of the data mode may be reduced by a factor of $\lambda^2$ despite the temporary increase by the same factor before the correction. Since $\lambda \propto 1/\sigma$, this implies that the standard deviation of the position quadrature noise $\sigma_q$ may be suppressed cubically, i.e., $\sigma_q=\sigma/\lambda^2 \propto \sigma^3$.

Additionally, through the noise reshaping, the data momentum quadrature noise may be immediately reduced by a factor of $\lambda^2$ (see $\xi_p^{(1)}/\lambda^2$ in $z_p^{(1)}$) but there may be transferred ancilla momentum quadrature noise (see $+\xi_p^{(2)}$ and $+\lambda^2 \xi_p^{(3)}$ in $z_p^{(1)}$). Note that by measuring the ancilla momentum quadrature noise of the third mode, $z_p^{(3)}=\lambda\xi_p^{(3)}$ (which is contained within the range $[-\sqrt{\pi/2}, \sqrt{\pi/2}]$ with a very high probability), the value of $\xi_p^{(3)}$ may be extracted so that the transferred ancilla momentum quadrature noise $+\lambda^2\xi_p^{(3)}$ in $z_p^{(1)}$ and also $+\lambda^3\xi_p^{(3)}$ in $z_p^{(2)}$ may be eliminated. Then, by further measuring the reshaped ancilla momentum quadrature noise of the second mode (after eliminating $\lambda^3\xi_p^{(2)}$), the value of $z_p^{(2)}-\lambda^3\xi_p^{(3)}=\lambda\xi_p^{(2)}$ may be extracted in order to eliminate the transferred ancilla momentum quadrature noise $+\xi_p^{(2)}$ in $z_p^{(1)}$. As a result, the reduced date momentum quadrature noise $\xi_p^{(1)}/\lambda^2$ is provided without any transferred ancilla momentum quadrature noise. Similarly as above, since $\lambda \propto 1/\sigma$, the momentum quadrature noise may be suppressed cubically, i.e., $\sigma_p=\sigma/\lambda^2 \propto \sigma^3$.

Generalizing these arguments, the N-mode GKP-squeezed-repetition code may be shown inductively to be able to suppress additive quadrature noise errors to the $N^{th}$ order, e.g., $\sigma_q$, $\sigma_p=\sigma/\lambda^{N-1} \propto \sigma^N$ for any $N \geq 2$. These codes, however, may be susceptible to the realistic noise in GKP states (except for the N=2 case), because the GKP noise can be amplified by large squeezing operations. For example, in the case of the three-mode GKP-squeezed-repetition code 1400c discussed above, a factor of $\lambda$ may be multiplied into the obtained measurement outcome of $z_p^{(3)}=\lambda\xi_p^{(3)}$ to eliminate the transferred noise $+\lambda^2\xi_p^{(3)}$ in the reshaped data momentum quadrature noise $z_p^{(1)}$, Therefore, the GKP noise that corrupts the measurement outcome of $z_p^{(3)}$ may be amplified by a large squeezing parameter $$\lambda = \sqrt{2\pi}c/\sigma \xrightarrow{\sigma \to 0} \infty$$

when the GKP noise is propagated to the data mode via miscalibrated counter displacement operations.

Appendix E

Any passive beam splitter interactions are shown herein to commute with iid additive Gaussian noise errors. Consider n bosonic modes described by bosonic annihilation operators $\hat{a}_1, \ldots, \hat{a}_n$. A general passive beam splitter interaction among these n modes is generated by a Hamiltonian of the following form:

$$\hat{H}_{BS} = \sum_{k,l=1}^{n} g_{kl} \hat{a}_k^\dagger \hat{a}_l$$

where $g_{kl}=g^*_{lk}$ for all k, $l \in \{1, \ldots, n\}$. Note that the total excitation number is conserved under a general beam splitter interaction: $[\hat{H}_{BS}, \Sigma_{j=1}^{n}\hat{a}_{j}^{\dagger}\hat{a}_{j}]=0$. Also, iid additive Gaussian noise errors are generated by the Lindbladian:

$$\mathcal{L} \equiv \sum_{j=1}^{n}(\mathcal{D}[\hat{a}_j] + \mathcal{D}[\hat{a}_j^{\dagger}])$$

where $\mathcal{D}[\hat{A}](\hat{p}) \equiv \hat{A}\hat{p}\hat{A}^{\dagger} - 1/2\{\hat{A}^{\dagger}\hat{A}, \hat{p}\}$. Specifically, the Lindbladian generator $\mathcal{L}$ is related to the additive Gaussian noise error $\mathcal{N}[\sigma]$ by the relation:

$$\exp[Dt \cdot \mathcal{L}] =_{k=1}^{n} \otimes \mathcal{N}^{(k)}[\sigma = \sqrt{Dt}]$$

where D is the diffusion rate and t is the time elapsed.

Having introduced the generators of the beam splitter interactions and iid additive Gaussian noise errors, the following commutation relation can be proven:

$$[\mathcal{V}_{BS}, \mathcal{L}] = 0$$

where $\mathcal{V}_{BS}(\hat{p}) \equiv -i[\hat{H}_{BS}, \hat{p}]$ is the Lindbladian superoperator associated with a beam splitter Hamiltonian $\hat{H}_{BS} = \Sigma_{k,l=1}^{n} g_{kl}\hat{a}_k^{\dagger}\hat{a}_l$. Note that for a general $\mathcal{V} = -[\hat{H}, \bullet]$ and $\mathcal{D}[\hat{A}]$ that:

$$\mathcal{V} \cdot \mathcal{D}[\hat{A}](\hat{p}) = -i\left[\hat{H}, \hat{A}\hat{p}\hat{A}^{\dagger} - \frac{1}{2}\hat{A}^{\dagger}\hat{A}\hat{p} - \frac{1}{2}\hat{p}\hat{A}^{\dagger}\hat{A}\right] =$$

$$-i\hat{H}\hat{A}\hat{p}\hat{A}^{\dagger} + \frac{i}{2}\hat{H}\hat{A}^{\dagger}\hat{A}\hat{p} + \frac{i}{2}\hat{H}\hat{p}\hat{A} + i\hat{A}\hat{p}\hat{A}^{\dagger}\hat{H} - \frac{i}{2}\hat{A}^{\dagger}\hat{A}\hat{p}\hat{H} - \frac{i}{2}\hat{p}\hat{A}^{\dagger}\hat{A}\hat{H}$$

and similarly:

$$\mathcal{D}[\hat{A}] \cdot \mathcal{V}(\hat{p}) = \mathcal{D}[\hat{A}](-i[\hat{H}, \hat{p}]) =$$

$$-i\hat{A}\hat{H}\hat{p}\hat{A}^{\dagger} + \frac{i}{2}\hat{A}^{\dagger}\hat{A}\hat{H}\hat{p} + \frac{i}{2}\hat{H}\hat{p}\hat{A}^{\dagger}\hat{A} + i\hat{A}\hat{p}\hat{H}\hat{A}^{\dagger} - \frac{i}{2}\hat{A}^{\dagger}\hat{A}\hat{p}\hat{H} - \frac{i}{2}\hat{p}\hat{H}\hat{A}^{\dagger}\hat{A}$$

Therefore:

$$[\mathcal{V}, \mathcal{D}[\hat{A}]](\hat{p}) = -i[\hat{H}, \hat{A}]\hat{p}\hat{A}^{\dagger} + i\hat{A}\hat{p}[\hat{A}^{\dagger}, \hat{H}] + \frac{i}{2}[\hat{H}, \hat{A}^{\dagger}\hat{A}]\hat{p} - \frac{i}{2}\hat{p}[\hat{A}^{\dagger}\hat{A}, \hat{H}]$$

Using this general relation, one may find that:

$$\left[\mathcal{V}_{BS}, \sum_{j=1}^{n}\mathcal{D}[\hat{a}_j]\right]\hat{p} =$$

$$\sum_{j=1}^{n} -i\left[\hat{H}_{BS}, [\hat{a}_j]\hat{p}\hat{a}_j^{\dagger} + i\hat{a}_j\hat{p}[\hat{a}_j^{\dagger}, \hat{H}_{BS}] + \frac{i}{2}[\hat{H}_{BS}, \hat{a}_j^{\dagger}\hat{a}_j]\hat{p} - \right.$$

$$\left. \frac{i}{2}\hat{p}[\hat{a}_j^{\dagger}\hat{a}_j, \hat{H}_{BS}]\right] =$$

$$\sum_{j,k,l=1}^{n} g_{kl}\left[i\delta_{jk}\hat{a}_l\hat{p}\hat{a}_j^{\dagger} - i\delta_{jl}\hat{a}_j\hat{p}\hat{a}_k^{\dagger}\right] = i\sum_{k,l=1}^{n} g_{kl}\hat{a}_l\hat{p}\hat{a}_k^{\dagger} - i\sum_{k,l=1}^{n} g_{kl}\hat{a}_l\hat{p}\hat{a}_k^{\dagger} = 0$$

Similarly:

$$\left[\mathcal{V}_{BS}, \sum_{j=1}^{n}\mathcal{D}[\hat{a}_j^{\dagger}]\right]\hat{p} = \sum_{j=1}^{n}\left[-i[\hat{H}_{BS}, \hat{a}_j^{\dagger}]\hat{p}\hat{a}_j + \right.$$

-continued $$i\hat{a}_j^{\dagger}\hat{p}[\hat{a}_j, \hat{H}_{BS}] + \frac{i}{2}[\hat{H}_{BS}, \hat{a}_j\hat{a}_j^{\dagger}]\hat{p} - \frac{i}{2}\hat{p}[\hat{a}_j\hat{a}_j^{\dagger}, \hat{H}_{BS}]\bigg] =$$

$$\sum_{j,k,l=1}^{n} g_{kl}\left[-i\delta_{jl}\hat{a}_k^{\dagger}\hat{p}\hat{a}_j + i\delta_{jk}\hat{a}_j^{\dagger}\hat{p}\hat{a}_j\right] = -i\sum_{k,l=1}^{n} g_{kl}\hat{a}_k^{\dagger}\hat{p}\hat{a}_l + i\sum_{k,l=1}^{n} g_{kl}\hat{a}_k^{\dagger}\hat{p}\hat{a}_l = 0$$

Then, since $\mathcal{L} = \Sigma_{j=1}^{n}(\mathcal{D}[\hat{a}_j] + \mathcal{D}[\hat{a}_j^{\dagger}])$, $[\mathcal{V}_{BS}, \mathcal{L}] = 0$ follows:

$$[\mathcal{V}_{BS}, \mathcal{L}] = \sum_{j=1}^{n}\left[\mathcal{V}_{BS}, \mathcal{D}[\hat{a}_j] + \mathcal{D}[\hat{a}_j^{\dagger}]\right] = 0.$$

Since the generators of a beam splitter interaction and an iid additive Gaussian noise error commute with each other at the superoperator level, the result is:

$$\exp[t(\mathcal{V}_{BS}+D\cdot\mathcal{L})] = \exp[Dt\cdot\mathcal{L}]\cdot\exp[t\cdot\mathcal{V}_{BS}] =_{k=1}^{n} \otimes \mathcal{N}^{(k)}[\sigma]\cdot\mathcal{U}_{BS}$$

where $\sigma^2 = Dt$ and $\mathcal{U}_{BS} \equiv \hat{U}_{BS} \bullet \hat{U}_{BS}^{\dagger}$ and $\hat{U}_{BS} = \exp[-i\hat{H}_{BS}t]$ is the desired n-mode beam splitter unitary operation. This implies that the noisy beam splitter interaction continuously corrupted by iid additive noise errors can be understood as the desired noiseless beam splitter interaction followed by an iid additive Gaussian noise channel with variance $\sigma^2 = Dt$, where D is the diffusion rate and t is the time needed to complete the beam splitter interaction.

Having thus described several aspects of at least one embodiment of this technology, it is to be appreciated that various alterations, modifications, and improvements will readily occur to those skilled in the art.

Various aspects of the present technology may be used alone, in combination, or in a variety of arrangements not specifically discussed in the embodiments described in the foregoing and is therefore not limited in its applications to the details and arrangement of components set forth in the foregoing description or illustrated in the drawings. For example, aspects described in one embodiment may be combined in any manner with aspects described in other embodiments.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The term "approximately" may be used to mean within ±20% of a target value in some embodiments, within ±10% of a target value in some embodiments, within ±5% of a target value in some embodiments, within ±2% of a target value in some embodiments. The term "approximately" may include the target value.

What is claimed is:

1. A quantum information device, comprising:

a plurality of quantum mechanical oscillators, comprising:

a first data quantum mechanical oscillator configured to store information representing a first data state; and a first ancilla quantum mechanical oscillator coupled to the first data quantum mechanical oscillator, the first ancilla quantum mechanical oscillator configured to store information representing a first ancilla state, wherein the first ancilla state is initialized as a first Gottesman-Kitaev-Preskill (GKP) state;

at least one electromagnetic radiation source coupled to the plurality of quantum mechanical oscillators and configured to entangle and/or disentangle the information stored in the first data quantum mechanical oscillator and the information stored in the first ancilla quantum mechanical oscillator by applying one or more drive waveforms to one or more quantum mechanical oscillators of the plurality of quantum mechanical oscillators; and at least one measurement device coupled to the first ancilla quantum mechanical oscillator, the at least one measurement device configured to measure a position quadrature operator and/or a momentum quadrature operator of the first ancilla quantum mechanical oscillator.

2. The quantum information device of claim 1, wherein at least one of the plurality of quantum mechanical oscillators comprises a cavity resonator or a trapped ion oscillator.

3. The quantum information device of claim 1, wherein the at least one measurement device comprises at least one homodyne detector.

4. The quantum information device of claim 1, further comprising a stripline resonator coupled to the first data quantum mechanical oscillator.

5. The quantum information device of claim 1, wherein the at least one electromagnetic radiation source is further configured to initialize at least one GKP state in the first ancilla quantum mechanical oscillator.

6. The quantum information device of claim 1, wherein the at least one electromagnetic radiation source is configured to entangle and/or disentangle the information stored in the first data quantum mechanical oscillator and the information stored in the first ancilla quantum mechanical oscillator by applying one or more drive waveforms configured to apply a SUM gate or an inverse SUM gate.

7. The quantum information device of claim 1, wherein the at least one electromagnetic radiation source is configured to entangle and/or disentangle the information stored in the first data quantum mechanical oscillator and the information stored in the first ancilla quantum mechanical oscillator by applying one or more drive waveforms configured to apply a squeezing operation or an inverse squeezing operation.

8. The quantum information device of claim 1, wherein the plurality of quantum mechanical oscillators further comprises a second ancilla quantum mechanical oscillator, the second ancilla quantum mechanical oscillator configured to store information representing a second ancilla state, wherein the second ancilla state is initialized as a second GKP state.

9. The quantum information device of claim 8, wherein the at least one electromagnetic radiation source is further configured to entangle and/or disentangle the information stored in the first data quantum mechanical oscillator and the information stored in the second ancilla quantum mechanical oscillator.

10. The quantum information device of claim 8, wherein the plurality of quantum mechanical oscillators further comprises a second data quantum mechanical oscillator coupled to the second ancilla quantum mechanical oscillator, the second data quantum mechanical oscillator configured to store information representing a second data state.

11. The quantum information device of claim 10, wherein the at least one electromagnetic radiation source is further configured to entangle and/or disentangle the information stored in the second data quantum mechanical oscillator and the information stored in the second ancilla quantum mechanical oscillator.

12. A method of performing quantum error correction, the method comprising:
- initializing a first Gottesman-Kitaev-Preskill (GKP) state in a first ancilla quantum mechanical oscillator;
- entangling information stored in a first data quantum mechanical oscillator with information stored in the first ancilla quantum mechanical oscillator;
- disentangling the information stored in the first data quantum mechanical oscillator and the information stored in the first ancilla quantum mechanical oscillator;
- measuring position and momentum quadrature operators of the first ancilla quantum mechanical oscillator; and
- using the measured position and momentum quadrature operators to correct for an error in the information stored in the first data quantum mechanical oscillator.

13. The method of claim 12, wherein measuring the position and momentum quadrature operators of the first ancilla quantum mechanical oscillator comprises measuring the position and momentum quadrature operators modulo $\sqrt{2\pi}$.

14. The method of claim 12, wherein entangling information stored in the first data quantum mechanical oscillator with information stored in the first ancilla quantum mechanical oscillator comprises using a SUM gate.

15. The method of claim 12, wherein disentangling the information stored in the first data quantum mechanical oscillator and the information stored in the first ancilla quantum mechanical oscillator comprises using an inverse SUM gate.

16. The method of claim 12, wherein entangling information stored in the first data quantum mechanical oscillator with information stored in the first ancilla quantum mechanical oscillator comprises using a squeezing operation.

17. The method of claim 12, wherein disentangling the information stored in the first data quantum mechanical oscillator and the information stored in the first ancilla quantum mechanical oscillator comprises using an inverse squeezing operation.

18. The method of claim 12, further comprising:
- initializing a second GKP state in a second ancilla quantum mechanical oscillator;
- entangling information stored in a second data quantum mechanical oscillator with information stored in a second ancilla quantum mechanical oscillator;
- disentangling the information stored in the second data quantum mechanical oscillator and the information stored in the second ancilla quantum mechanical oscillator;
- measuring position and momentum quadrature operators of the second ancilla quantum mechanical oscillator; and
- using the measured position and momentum quadrature operators to correct for an error in the information stored in the second data quantum mechanical oscillator.

19. The method of claim 12, wherein using the measured position and momentum quadrature operators to correct for an error in the information stored in the first data quantum mechanical oscillator comprises:
- applying one or more counter displacement operations to the information stored in the first data quantum mechanical oscillator.

20. The method of claim 12, wherein measuring position and momentum quadrature operators of the first ancilla quantum mechanical oscillator comprises performing one or more homodyne detection measurements.

* * * * *